US009547635B2

(12) United States Patent
Bailor et al.

(10) Patent No.: US 9,547,635 B2
(45) Date of Patent: Jan. 17, 2017

(54) COLLABORATIVE AUTHORING

(71) Applicant: Microsoft Technology Licensing, LLC, Redmond, WA (US)

(72) Inventors: Jonathan Beckett Bailor, Bellevue, WA (US); Ethan Joseph Bernstein, Mercer Island, WA (US); Mark Rolland Knight, Bellevue, WA (US); Christopher James Antos, Bellevue, WA (US); Andrew Richard Simonds, Newcastle, WA (US); Brian Michael Jones, Redmond, WA (US); Simon Peter Clarke, Seattle, WA (US); Edgar Mark Sunderland, Seattle, WA (US); David Benjamin Robins, Duvall, WA (US); Miko Arnab Sakhya Singha Bose, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/534,384

(22) Filed: Nov. 6, 2014

(65) Prior Publication Data

US 2015/0067467 A1 Mar. 5, 2015

Related U.S. Application Data

(63) Continuation of application No. 13/539,473, filed on Jul. 1, 2012, now Pat. No. 8,990,150, which is a
(Continued)

(51) Int. Cl.
*G06F 17/00* (2006.01)
*G06F 7/00* (2006.01)
(Continued)

(52) U.S. Cl.
CPC ............. *G06F 17/24* (2013.01); *G06F 17/241* (2013.01); *G06Q 10/10* (2013.01); *H04L 12/1813* (2013.01)

(58) Field of Classification Search
CPC ....................................... G06F 17/24
(Continued)

(56) References Cited

U.S. PATENT DOCUMENTS 4,855,580 A    8/1989   Van Maanen, Jr.
5,107,443 A *   4/1992   Smith .................... G06Q 10/10
                                                                                                  713/166
(Continued)

FOREIGN PATENT DOCUMENTS

CN        1276568 A     12/2000
CN        1489075       4/2004
(Continued)

OTHER PUBLICATIONS

"Apple Introduces iWork'08", obtained online at: https://www.apple.com/pr/library/2007/08/07Apple-Introduces-iWork-08.html, published Aug. 7, 2007, 2 pgs.
(Continued)

*Primary Examiner* — Pavan Mamillapalli
(74) *Attorney, Agent, or Firm* — Tom Wong; Jessica Meyers; Micky Minhas

(57) ABSTRACT

A collaborative authoring application provides an authoring environment in which two or more users can edit a document concurrently. Each user edits a copy of the document, sends updates to a master copy of the document, and receives updates from the master copy of the document. The authoring environment generally inhibits the users from providing conflicting editing instructions to the master copy of the document. For example, each user can generate a content lock about one or more data units within the document. The
(Continued)

authoring environment may synchronize content locks automatically and content only at the request of the user.

21 Claims, 31 Drawing Sheets

Related U.S. Application Data continuation of application No. 13/079,605, filed on Apr. 4, 2011, now Pat. No. 8,352,418, which is a continuation of application No. 11/938,082, filed on Nov. 9, 2007, now Pat. No. 7,941,399.

(51) Int. Cl.
  G06F 17/24 (2006.01)
  G06Q 10/10 (2012.01)
  H04L 12/18 (2006.01)

(58) Field of Classification Search
  USPC .............................................. 707/608
  See application file for complete search history.

(56) References Cited

U.S. PATENT DOCUMENTS

| | | | |
|---|---|---|---|
| 5,142,619 A | 8/1992 | Webster, III | |
| 5,313,394 A | 5/1994 | Clapp | |
| 5,339,389 A | 8/1994 | Bates | |
| 5,446,842 A | 8/1995 | Schaeffer | |
| 5,486,686 A | 1/1996 | Zdybel | |
| 5,535,332 A | 7/1996 | Ishida | |
| 5,568,640 A | 10/1996 | Nishiyama | |
| 5,623,659 A | 4/1997 | Shi et al. | |
| 5,630,138 A | 5/1997 | Raman | |
| 5,664,186 A | 9/1997 | Bennett | |
| 5,671,428 A * | 9/1997 | Muranaga | G06Q 10/10 715/201 |
| 5,692,178 A | 11/1997 | Shaughnessy | |
| 5,729,734 A | 3/1998 | Parker | |
| 5,751,958 A | 5/1998 | Zweben | |
| 5,758,079 A | 5/1998 | Ludwig et al. | |
| 5,781,732 A | 7/1998 | Adams | |
| 5,781,908 A | 7/1998 | Williams | |
| 5,787,262 A | 7/1998 | Shakib | |
| 5,835,950 A | 11/1998 | Cho et al. | |
| 5,893,126 A | 4/1999 | Drews et al. | |
| 5,920,694 A * | 7/1999 | Carleton | G06F 3/0481 348/E7.083 |
| 5,963,931 A | 10/1999 | Fagg | |
| 5,966,512 A * | 10/1999 | Bates | G06F 17/2288 709/201 |
| 5,999,208 A | 12/1999 | McNerney et al. | |
| 6,000,945 A | 12/1999 | Sanchez-Lazer | |
| 6,006,239 A | 12/1999 | Bhansali | |
| 6,026,461 A | 2/2000 | Baxter et al. | |
| 6,049,334 A * | 4/2000 | Bates | G06F 3/0481 715/745 |
| 6,055,546 A | 4/2000 | Pongracz | |
| 6,065,026 A | 5/2000 | Cornelia | |
| 6,067,551 A | 5/2000 | Brown | |
| 6,073,161 A | 6/2000 | DeBoskey | |
| 6,088,702 A | 7/2000 | Plantz | |
| 6,202,085 B1 | 3/2001 | Benson | |
| 6,209,010 B1 | 3/2001 | Gauthier | |
| 6,209,128 B1 | 3/2001 | Gerard | |
| 6,240,414 B1 | 5/2001 | Beizer et al. | |
| 6,244,575 B1 | 6/2001 | Vaartstra et al. | |
| 6,275,935 B1 | 8/2001 | Barlow | |
| 6,317,777 B1 | 11/2001 | Skarbo | |
| 6,324,544 B1 | 11/2001 | Alam et al. | |
| 6,327,584 B1 | 12/2001 | Xian | |
| 6,327,611 B1 | 12/2001 | Everingham | |
| 6,341,291 B1 | 1/2002 | Bentley | |
| 6,342,906 B1 | 1/2002 | Kumar | |
| 6,351,271 B1 | 2/2002 | Mainwaring et al. | |
| 6,363,352 B1 | 3/2002 | Dailey | |
| 6,411,965 B2 | 6/2002 | Klug | |
| 6,430,576 B1 | 8/2002 | Gates et al. | |
| 6,437,778 B1 | 8/2002 | Matsui et al. | |
| 6,438,548 B1 | 8/2002 | Grim, III | |
| 6,438,563 B1 | 8/2002 | Kawagoe | |
| 6,438,564 B1 | 8/2002 | Morton et al. | |
| 6,446,093 B2 | 9/2002 | Tabuchi | |
| 6,502,113 B1 | 12/2002 | Crawford et al. | |
| 6,507,865 B1 * | 1/2003 | Hanson | G06Q 10/10 705/36 R |
| 6,526,434 B1 | 2/2003 | Carlson et al. | |
| 6,529,905 B1 | 3/2003 | Bray | |
| 6,560,614 B1 | 5/2003 | Barboy | |
| 6,560,620 B1 | 5/2003 | Ching | |
| 6,564,246 B1 | 5/2003 | Varma et al. | |
| 6,574,377 B1 | 6/2003 | Cahill | |
| 6,587,870 B2 | 7/2003 | Takagi et al. | |
| 6,594,664 B1 | 7/2003 | Estrada et al. | |
| 6,610,104 B1 | 8/2003 | Lin | |
| 6,629,129 B1 | 9/2003 | Brookspan et al. | |
| 6,662,209 B2 | 12/2003 | Potts, Jr. | |
| 6,678,882 B1 | 1/2004 | Hurley et al. | |
| 6,681,371 B1 | 1/2004 | Devanbu | |
| 6,681,382 B1 | 1/2004 | Kakumani | |
| 6,687,878 B1 | 2/2004 | Eintracht | |
| 6,711,718 B2 | 3/2004 | Pfeil | |
| 6,751,618 B1 | 6/2004 | Germscheid | |
| 6,757,678 B2 | 6/2004 | Myllymaki | |
| 6,757,696 B2 | 6/2004 | Multer et al. | |
| 6,757,767 B1 | 6/2004 | Kelleher | |
| 6,757,871 B1 | 6/2004 | Sato | |
| 6,760,840 B1 | 7/2004 | Shimbo | |
| 6,772,165 B2 | 8/2004 | O'Carroll | |
| 6,842,768 B1 | 1/2005 | Shaffer et al. | |
| 6,854,087 B1 * | 2/2005 | Takeo | G06F 17/24 707/999.102 |
| 6,925,476 B1 | 8/2005 | Multer | |
| 6,976,213 B1 | 12/2005 | Letourneau et al. | |
| 6,983,416 B1 | 1/2006 | Bae | |
| 6,993,522 B2 | 1/2006 | Chen et al. | |
| 7,007,235 B1 * | 2/2006 | Hussein | G06Q 10/10 715/751 |
| 7,024,429 B2 | 4/2006 | Ngo et al. | |
| 7,024,430 B1 | 4/2006 | Ingraham et al. | |
| 7,035,839 B1 | 4/2006 | Gillespie et al. | |
| 7,039,679 B2 | 5/2006 | Mendez | |
| 7,047,407 B2 | 5/2006 | Itoh et al. | |
| 7,053,839 B2 | 5/2006 | Cassel et al. | |
| 7,058,663 B2 | 6/2006 | Johnson | |
| 7,065,633 B1 | 6/2006 | Yates et al. | |
| 7,069,505 B2 | 6/2006 | Tamano | |
| 7,086,005 B1 | 8/2006 | Matsuda | |
| 7,089,278 B1 | 8/2006 | Churchill et al. | |
| 7,099,919 B2 | 8/2006 | Kusumoto et al. | |
| 7,110,936 B2 | 9/2006 | Hiew | |
| 7,111,237 B2 | 9/2006 | Chan | |
| 7,117,278 B2 | 10/2006 | Avery | |
| 7,124,151 B1 | 10/2006 | Choi | |
| 7,124,164 B1 * | 10/2006 | Chemtob | G06Q 10/10 709/204 |
| 7,124,362 B2 | 10/2006 | Tischer | |
| 7,127,501 B1 | 10/2006 | Beir | |
| 7,149,776 B1 | 12/2006 | Roy | |
| 7,155,465 B2 | 12/2006 | Lee et al. | |
| 7,185,277 B1 | 2/2007 | Bernstein | |
| 7,200,668 B2 * | 4/2007 | Mak | G06F 17/30569 707/E17.006 |
| 7,203,708 B2 | 4/2007 | Liu et al. | |
| 7,209,948 B2 | 4/2007 | Srinivasa | |
| 7,225,189 B1 | 5/2007 | McCormack | |
| 7,237,006 B2 * | 6/2007 | Prell | 709/205 |
| 7,240,091 B1 | 7/2007 | Hopmann et al. | |
| 7,242,389 B1 | 7/2007 | Stern | |
| 7,249,314 B2 | 7/2007 | Walker et al. | |
| 7,293,049 B2 | 11/2007 | Kadyk et al. | |
| 7,310,657 B2 | 12/2007 | Nakamura | |
| 7,315,978 B2 | 1/2008 | Giles et al. | |

(56) References Cited

U.S. PATENT DOCUMENTS

| | | | |
|---|---|---|---|
| 7,328,243 | B2 | 2/2008 | Yeager |
| 7,346,705 | B2 | 3/2008 | Hullot et al. |
| 7,401,291 | B2 | 7/2008 | Ramaley |
| 7,478,129 | B1 | 1/2009 | Chemtob |
| 7,487,471 | B2 | 2/2009 | Wu |
| 7,496,577 | B2 | 2/2009 | Williamson |
| 7,529,780 | B1 | 5/2009 | Braginsky et al. |
| 7,536,641 | B2 | 5/2009 | Rosenstein et al. |
| 7,565,603 | B1 | 7/2009 | Jones et al. |
| 7,577,906 | B2 | 8/2009 | Friedrichowitz |
| 7,594,163 | B2 | 9/2009 | Slack-Smith |
| 7,603,357 | B1 | 10/2009 | Gourdol |
| 7,610,287 | B1 | 10/2009 | Dean et al. |
| 7,647,292 | B2 | 1/2010 | Hayashi |
| 7,650,336 | B1 | 1/2010 | Herrmann |
| 7,664,750 | B2 | 2/2010 | Frees |
| 7,694,217 | B2 | 4/2010 | Croft |
| 7,698,660 | B2 | 4/2010 | Sanchez et al. |
| 7,714,222 | B2 | 5/2010 | Taub |
| 7,761,784 | B2 | 7/2010 | Parks |
| 7,769,810 | B1* | 8/2010 | Kaufman ............ 709/205 |
| 7,779,347 | B2 | 8/2010 | Christiansen et al. |
| 7,788,326 | B2 | 8/2010 | Buchheit et al. |
| 7,792,788 | B2 | 9/2010 | Melmon |
| 7,797,274 | B2 | 9/2010 | Strathearn et al. |
| 7,801,951 | B2 | 9/2010 | Fishkin et al. |
| 7,818,678 | B2 | 10/2010 | Massand |
| 7,831,679 | B2 | 11/2010 | Apacible et al. |
| 7,839,532 | B2 | 11/2010 | Brawn |
| 7,912,811 | B2 | 3/2011 | Hodel-Widmer |
| 7,933,952 | B2 | 4/2011 | Parker et al. |
| 7,941,399 | B2 | 5/2011 | Bailor |
| 7,962,853 | B2 | 6/2011 | Bedi et al. |
| 7,966,556 | B1 | 6/2011 | Bourdev |
| 8,019,780 | B1 | 9/2011 | Pinkerton et al. |
| 8,028,229 | B2 | 9/2011 | Bailor et al. |
| 8,082,277 | B1 | 12/2011 | O'Brien et al. |
| 8,122,341 | B1* | 2/2012 | Dayan ............ G06Q 10/101 |
| | | | 701/532 |
| 8,453,052 | B1* | 5/2013 | Newman et al. ........... 715/255 |
| 9,071,615 | B2 | 6/2015 | Sanchez et al. |
| 2001/0018697 | A1 | 8/2001 | Kunitake |
| 2001/0042075 | A1 | 11/2001 | Tabuchi |
| 2002/0007287 | A1 | 1/2002 | Straube |
| 2002/0022122 | A1 | 2/2002 | Hirata |
| 2002/0059325 | A1 | 5/2002 | Beizer et al. |
| 2002/0065848 | A1 | 5/2002 | Walker |
| 2002/0069192 | A1 | 6/2002 | Aegerter |
| 2002/0188598 | A1 | 12/2002 | Myllymaki |
| 2003/0028600 | A1 | 2/2003 | Parker |
| 2003/0093760 | A1 | 5/2003 | Suzuki |
| 2003/0097410 | A1 | 5/2003 | Atkins |
| 2003/0097638 | A1 | 5/2003 | Tamano |
| 2003/0105979 | A1 | 6/2003 | Itoh et al. |
| 2003/0115481 | A1 | 6/2003 | Baird |
| 2003/0140067 | A1 | 7/2003 | Sesek et al. |
| 2003/0159105 | A1 | 8/2003 | Hiebert |
| 2003/0167281 | A1 | 9/2003 | Cohen et al. |
| 2003/0172113 | A1 | 9/2003 | Cameron |
| 2003/0172168 | A1 | 9/2003 | Mak et al. |
| 2003/0208534 | A1 | 11/2003 | Carmichael |
| 2004/0003090 | A1 | 1/2004 | Deeds |
| 2004/0039829 | A1 | 2/2004 | Bucher |
| 2004/0068505 | A1 | 4/2004 | Lee |
| 2004/0085354 | A1* | 5/2004 | Massand ............ G06F 17/2229 |
| | | | 715/751 |
| 2004/0107224 | A1 | 6/2004 | Bera |
| 2004/0122870 | A1 | 6/2004 | Park et al. |
| 2004/0122898 | A1 | 6/2004 | Srinivasa |
| 2004/0122912 | A1 | 6/2004 | Kim et al. |
| 2004/0133858 | A1 | 7/2004 | Barnett |
| 2004/0143630 | A1 | 7/2004 | Kaufmann et al. |
| 2004/0161150 | A1 | 8/2004 | Cukierman et al. |
| 2004/0172395 | A1 | 9/2004 | Edelstein |
| 2004/0177343 | A1 | 9/2004 | McVoy et al. |
| 2004/0199550 | A1 | 10/2004 | Ito |
| 2004/0205539 | A1 | 10/2004 | Mak |
| 2004/0205653 | A1 | 10/2004 | Hadfield |
| 2004/0230903 | A1 | 11/2004 | Elza |
| 2004/0237033 | A1 | 11/2004 | Woolf et al. |
| 2004/0239700 | A1 | 12/2004 | Baschy |
| 2004/0243644 | A1 | 12/2004 | Steere et al. |
| 2004/0250201 | A1 | 12/2004 | Caspi |
| 2005/0004985 | A1 | 1/2005 | Stochosky |
| 2005/0004990 | A1 | 1/2005 | Durazo |
| 2005/0022122 | A1 | 1/2005 | Barrus et al. |
| 2005/0033811 | A1 | 2/2005 | Bhogal et al. |
| 2005/0033813 | A1* | 2/2005 | Bhogal et al. ............ 709/206 |
| 2005/0039116 | A1 | 2/2005 | Slack-Smith |
| 2005/0044492 | A1 | 2/2005 | Ramaley et al. |
| 2005/0064858 | A1 | 3/2005 | Makela et al. |
| 2005/0071386 | A1 | 3/2005 | Wolfgang et al. |
| 2005/0083907 | A1 | 4/2005 | Fishler |
| 2005/0097440 | A1* | 5/2005 | Lusk ................ G06Q 10/10 |
| | | | 715/758 |
| 2005/0132288 | A1 | 6/2005 | Kim et al. |
| 2005/0177617 | A1 | 8/2005 | Banginwar et al. |
| 2005/0198132 | A1 | 9/2005 | Vellante et al. |
| 2005/0203962 | A1 | 9/2005 | Zhou et al. |
| 2005/0210392 | A1 | 9/2005 | Koide |
| 2005/0216524 | A1 | 9/2005 | Gomes et al. |
| 2005/0223066 | A1 | 10/2005 | Buchheit et al. |
| 2005/0234943 | A1 | 10/2005 | Clarke |
| 2005/0240858 | A1 | 10/2005 | Croft |
| 2005/0251738 | A1 | 11/2005 | Hirano et al. |
| 2005/0256907 | A1 | 11/2005 | Novik et al. |
| 2005/0262203 | A1 | 11/2005 | Buchheit et al. |
| 2005/0289512 | A1 | 12/2005 | Matsusaka |
| 2006/0010240 | A1 | 1/2006 | Chuah |
| 2006/0015539 | A1 | 1/2006 | Wolf et al. |
| 2006/0015811 | A1 | 1/2006 | Tanaka et al. |
| 2006/0020360 | A1 | 1/2006 | Wu |
| 2006/0031264 | A1 | 2/2006 | Bosworth et al. |
| 2006/0041579 | A1 | 2/2006 | Miyashita et al. |
| 2006/0041596 | A1 | 2/2006 | Stirbu et al. |
| 2006/0047656 | A1 | 3/2006 | Dehlinger et al. |
| 2006/0053194 | A1 | 3/2006 | Schneider |
| 2006/0053195 | A1* | 3/2006 | Schneider ........... H04L 12/1827 |
| | | | 709/204 |
| 2006/0080432 | A1 | 4/2006 | Spataro |
| 2006/0085402 | A1 | 4/2006 | Brown |
| 2006/0095514 | A1 | 5/2006 | Wang et al. |
| 2006/0101328 | A1 | 5/2006 | Albornoz |
| 2006/0106879 | A1 | 5/2006 | Zondervan et al. |
| 2006/0112343 | A1 | 5/2006 | Ducheneaut et al. |
| 2006/0123033 | A1 | 6/2006 | Livshits |
| 2006/0136511 | A1 | 6/2006 | Ngo et al. |
| 2006/0136809 | A1 | 6/2006 | Fernstrom |
| 2006/0174207 | A1 | 8/2006 | Deshpande |
| 2006/0200755 | A1* | 9/2006 | Melmon et al. ............ 715/511 |
| 2006/0218476 | A1 | 9/2006 | Gombert |
| 2006/0242549 | A1 | 10/2006 | Schwier |
| 2006/0248038 | A1 | 11/2006 | Kaplan |
| 2006/0259524 | A1 | 11/2006 | Horton |
| 2006/0265377 | A1 | 11/2006 | Raman et al. |
| 2007/0016650 | A1 | 1/2007 | Gilbert et al. |
| 2007/0066293 | A1 | 3/2007 | Peng |
| 2007/0073809 | A1* | 3/2007 | Sangem et al. ............ 709/205 |
| 2007/0118598 | A1 | 5/2007 | Bedi |
| 2007/0118794 | A1 | 5/2007 | Hollander et al. |
| 2007/0130334 | A1 | 6/2007 | Carley |
| 2007/0156672 | A1 | 7/2007 | Wolff et al. |
| 2007/0186157 | A1* | 8/2007 | Walker et al. ............ 715/530 |
| 2007/0186171 | A1 | 8/2007 | Junuzovic |
| 2007/0198952 | A1 | 8/2007 | Pittenger |
| 2007/0203917 | A1 | 8/2007 | Du |
| 2007/0226320 | A1 | 9/2007 | Hager |
| 2007/0226604 | A1 | 9/2007 | Chalasani |
| 2007/0271502 | A1 | 11/2007 | Bedi |
| 2007/0283321 | A1 | 12/2007 | Hegde |
| 2008/0028300 | A1 | 1/2008 | Krieger |
| 2008/0052634 | A1 | 2/2008 | Fishkin et al. |
| 2008/0059187 | A1 | 3/2008 | Roitblat et al. |

(56) References Cited

U.S. PATENT DOCUMENTS

| | | |
|---|---|---|
| 2008/0059539 A1* | 3/2008 | Chin .................. G06Q 10/10 707/999.203 |
| 2008/0072141 A1 | 3/2008 | Hodel-Widmer |
| 2008/0086718 A1 | 4/2008 | Bostic |
| 2008/0097993 A1 | 4/2008 | Nanba |
| 2008/0098294 A1 | 4/2008 | Le |
| 2008/0114740 A1 | 5/2008 | Vergottini |
| 2008/0114844 A1 | 5/2008 | Sanchez et al. |
| 2008/0126953 A1 | 5/2008 | Davidson et al. |
| 2008/0147590 A1 | 6/2008 | Bechtel |
| 2008/0177782 A1 | 7/2008 | Poston |
| 2008/0180740 A1 | 7/2008 | Kimura et al. |
| 2008/0195800 A1 | 8/2008 | Lee |
| 2008/0222159 A1 | 9/2008 | Aranha et al. |
| 2008/0235579 A1 | 9/2008 | Champion et al. |
| 2008/0256113 A1 | 10/2008 | Rasmussen et al. |
| 2008/0256114 A1 | 10/2008 | Rasmussen et al. |
| 2008/0263032 A1 | 10/2008 | Vailaya et al. |
| 2008/0270386 A1 | 10/2008 | Ohi et al. |
| 2008/0294895 A1 | 11/2008 | Bodner |
| 2008/0320384 A1 | 12/2008 | Nagaranjan |
| 2009/0006936 A1 | 1/2009 | Parker |
| 2009/0006946 A1 | 1/2009 | Hanson |
| 2009/0006948 A1 | 1/2009 | Parker |
| 2009/0063489 A1 | 3/2009 | Neumann |
| 2009/0094231 A1 | 4/2009 | Marvit et al. |
| 2009/0094242 A1 | 4/2009 | Lo et al. |
| 2009/0125518 A1 | 5/2009 | Bailor et al. |
| 2009/0157811 A1 | 6/2009 | Bailor et al. |
| 2009/0171987 A1 | 7/2009 | Coppinger et al. |
| 2009/0193331 A1 | 7/2009 | Croft |
| 2009/0228473 A1 | 9/2009 | Kannan et al. |
| 2009/0235158 A1* | 9/2009 | Rosenstein ............. G06F 17/24 715/234 |
| 2009/0249224 A1 | 10/2009 | Davis et al. |
| 2009/0254572 A1 | 10/2009 | Redlich et al. |
| 2009/0271696 A1 | 10/2009 | Bailor et al. |
| 2009/0282041 A1 | 11/2009 | Skaria et al. |
| 2009/0282462 A1 | 11/2009 | Skaria |
| 2009/0327294 A1 | 12/2009 | Bailor |
| 2010/0023562 A1 | 1/2010 | Kreuch et al. |
| 2010/0070464 A1* | 3/2010 | Aymeloglu ......... G06F 17/2288 707/608 |
| 2010/0088676 A1 | 4/2010 | Yuan |
| 2010/0095198 A1 | 4/2010 | Bultrowicz et al. |
| 2010/0131836 A1 | 5/2010 | Dukhon et al. |
| 2010/0153857 A1 | 6/2010 | Sanchez et al. |
| 2010/0278453 A1 | 11/2010 | King |
| 2010/0281074 A1 | 11/2010 | Bailor et al. |
| 2011/0055702 A1 | 3/2011 | Jakobson |
| 2011/0184906 A1 | 7/2011 | Bailor et al. |
| 2011/0209052 A1 | 8/2011 | Parker et al. |
| 2012/0254315 A1 | 10/2012 | Skaria et al. |
| 2012/0278276 A1 | 11/2012 | Bailor et al. |
| 2013/0013997 A1 | 1/2013 | Bailor et al. |
| 2013/0151466 A1 | 6/2013 | Skaria et al. |
| 2013/0297559 A1 | 11/2013 | Bailor et al. |
| 2014/0373108 A1 | 12/2014 | Bailor et al. |
| 2015/0212996 A1 | 7/2015 | Plante et al. |
| 2015/0256574 A1 | 9/2015 | Sanchez et al. |

FOREIGN PATENT DOCUMENTS

| | | |
|---|---|---|
| CN | 1804836 | 7/2006 |
| CN | 101042702 | 9/2007 |
| DE | 19844071 A1 | 4/1999 |
| EP | 1132847 A2 | 9/2001 |
| EP | 1290575 B1 | 6/2005 |
| EP | 1657649 A2 | 5/2006 |
| EP | 1681652 A2 | 7/2006 |
| EP | 1681652 A3 | 7/2006 |
| JP | Hei 1-113849 | 5/1989 |
| JP | 07085020 | 3/1995 |
| JP | Hei 0785020 | 3/1995 |
| JP | 11-161535 | 6/1999 |
| JP | 2000-076109 | 3/2000 |
| JP | 2000259623 | 9/2000 |
| JP | 2001265704 | 9/2001 |
| JP | 2001-290690 | 10/2001 |
| JP | 2002288029 | 10/2002 |
| JP | 2003-233520 | 8/2003 |
| JP | 2004-078535 | 3/2004 |
| JP | 2004265193 | 9/2004 |
| JP | 2004-326176 | 11/2004 |
| JP | 2005-74724 | 3/2005 |
| JP | 2005267021 | 9/2005 |
| JP | 2005-301838 | 10/2005 |
| JP | 2005310158 A | 11/2005 |
| JP | 2006-195972 | 7/2006 |
| JP | 2006236350 | 9/2006 |
| JP | 2007115131 | 5/2007 |
| JP | 2007 518146 | 7/2007 |
| JP | 2007518330 A | 7/2007 |
| JP | 2007257629 | 10/2007 |
| JP | 2008210192 | 9/2008 |
| JP | 2009-009410 | 1/2009 |
| KR | 10-0331685 B1 | 4/2002 |
| KR | 1020060026409 | 3/2006 |
| KR | 10-2006-0047218 A | 5/2006 |
| KR | 1020070023640 A | 2/2007 |
| KR | 1020080014747 A | 2/2008 |
| RU | 2250492 C2 | 4/2005 |
| RU | 50695 U1 | 1/2006 |
| RU | 2272316 C2 | 3/2006 |
| RU | 2005135951 A | 5/2007 |
| RU | 2304803 C2 | 8/2007 |
| RU | 2327206 C1 | 6/2008 |
| RU | 2344468 C2 | 1/2009 |
| RU | 2359321 C2 | 6/2009 |
| TW | 200424868 A | 11/2004 |
| TW | I248002 | 1/2006 |
| TW | 200627221 A | 8/2006 |
| TW | 200627259 A | 8/2006 |
| TW | 200627274 | 8/2006 |
| TW | I276325 | 3/2007 |
| TW | 200817998 | 4/2008 |
| TW | 200910880 | 3/2009 |
| WO | WO 01/25986 | 4/2001 |
| WO | WO 01/33362 A1 | 5/2001 |
| WO | WO 01/88750 | 11/2001 |
| WO | WO 02/33575 | 4/2002 |
| WO | WO 03/058374 | 7/2003 |
| WO | WO 2005/114467 A2 | 12/2005 |
| WO | WO 2007/034858 A1 | 3/2007 |
| WO | WO 2007/062949 | 6/2007 |
| WO | WO 2007/064480 | 6/2007 |
| WO | WO 2008/063833 A1 | 5/2008 |
| WO | WO 2009/005922 | 1/2009 |
| WO | WO 2009/061638 | 5/2009 |
| WO | WO 2009/076010 | 6/2009 |
| WO | WO 2009/079116 | 6/2009 |

OTHER PUBLICATIONS

"Codeville," http://codeville.org/, Date Retrieved Oct. 9, 2007, 2 pgs.

"Emerging from a Highly Praised Private Beta, Zoho Notebook is a One-Stop Destination for Accessing and Sharing Content—Creation, Aggregation and Collaboration", obtained online at: http://www.zoho.com/news/zoho_notebook_public_beta.html, published May 22, 2007, 3 pgs.

"File Locks-GNU Emacs Lisp Reference Manual"; www.gnu.org/software/emacs/elisp/html_node/File-Locks.html; Mar. 28, 2006; 2 pages.

"Google, Google Docs & Spreadsheets Tour" downloaded from http://www.google.com/google-d-s/intl/en/tour2.html on Nov. 9, 2007, 1 page.

"Status of Software Reuse 577," http://www.plex86.org/Computer_Folklore/Status-of-Software-Reuse-577.html, Date Retrieved Oct. 9, 2007, 2 pgs.

"How to Track and Manage Changes in a Word 2002 and a Word 2003 Document," Microsoft Corporation, Mar. 8, 2007, 4 pages.

(56) References Cited

OTHER PUBLICATIONS

"Perforce software Delivers Improved Performance to its Fast Software Configuration Management System," Perforce Software, Jul. 9, 2007, 2 pages.
"Technical Overview," Apache CouchDB, The Apache Software Foundation, © 2008, 7 pages.
"Track Changes in Word 2007 Tutorial," Florida Gulf Coast University, copyright 2007, 2 pages.
Adkins et al., "GSS Collaboration in Document Development: Using Group Writer to Improve the Process", Proceedings of the 32nd Hawaii International Conference on System Sciences, 1999, 11 pages.
Adler et al., "Evaluating and Implementing a Collaborative Office Document System," 2005, http://www.sce.carleton.ca/faculty/adler/publications/2005/adler-nash-noel-2005-Collab-Office.pdf, pp. 1-18.
Appleton, Brad, "ClearView: Associating Attributes and Notes With a View", ClearCase International User's Group Conference, Sep. 1996, 16 pgs.
Australian First Office Action in Application 2009241535, mailed Mar. 13, 2014, 4 pgs.
Australian First Office Action in Application 2009262859, mailed Mar. 7, 2014, 3 pgs.
Australian First Office Action in Application 2009318022, mailed Mar. 11, 2014, 3 pgs.
Australian Notice of Acceptance in Application 2008324973, mailed Aug. 22, 2012. 3 pgs.
Australian Notice of Acceptance in Application 2009262859, mailed May 1, 2014, 2 pgs.
Australian Notice of Acceptance in Application 2010241814, mailed May 21, 2014, 2 pgs.
Australian Notice of Allowance in Application 2008335565, mailed Sep. 18, 2012, 3 pgs.
Australian Notice of Allowance in Application 2008338826, mailed Dec. 5, 2012, 2 pgs.
Australian Office Action in Application 2008335565, mailed Aug. 30, 2012, 3 pgs.
Australian Office Action in Application 2008338826, mailed Oct. 24, 2012, 3 pgs.
Australian Office Action in Application 2010241814, mailed Apr. 11, 2014, 4 pgs.
Badouel, Eric et al., "Merging Hierarchically-Structured Documents in Workflow Systems", Electronic Notes in Theoretical Computer Science 203, (2008), 3-24.
Bellagio, David et al., "Software Configuration Management Strategies and IBM Rational ClearCase A Practical Introduction, Second Edition" In: "Software Configuration Management Strategies and IBM Rational ClearCase A Practical Introduction, Second Edition", May 23, 2005, IBM Press, XP55009093, ISBN: 978-0-32-120019-8 pp. 173-178.
Byfield, Bruce, "Ooo Off the Wall: That's Your Version—Document Control in Ooo Writer", published on Linux Journal, Mar. 7, 2006, 6 pgs.
Chinese 1st Office Action in Application 200880121295.0, mailed Jan. 18, 2012, 6 pgs.
Chinese 1st Office Action in Application 200980115758.7, mailed Mar. 28, 2012, 10 pgs.
Chinese 1st Office Action in Application 200980116872.1, mailed Oct. 9, 2012, 14 pgs.
Chinese 1st Office Action in Application 200980124935.8, mailed Oct. 30, 2012, 10 pgs.
Chinese 1st Office Action in Application 200980147769.3, mailed Jan. 29, 2012, 12 pgs.
Chinese 1st Office Action in Application 201080019470.2, mailed Aug. 31, 2012, 8 pgs.
Chinese 2nd Office Action in Application 200880115943.1, mailed Jun. 1, 2012, 7 pgs.
Chinese 2nd Office Action in Application 200880119647.9, mailed Aug. 13, 2012, 6 pgs.
Chinese 2nd Office Action in Application 200880121295.0, mailed Oct. 23, 2012, 10 pgs.
Chinese 2nd Office Action in Application 200980115758.7, mailed Dec. 5, 2012, 7 pgs.
Chinese 2nd Office Action in Application 200980116872.1, mailed Jun. 18, 2013, 6 pgs.
Chinese 2nd Office Action in Application 200980124935.8, mailed Jun. 19, 2013, 7 pgs.
Chinese 2nd Office Action in Application 200980147769.3, mailed Jun. 7, 2013, 10 pgs.
Chinese 3rd Office Action in Application 200880115943.1, mailed Aug. 30, 2012, 6 pgs.
Chinese 3rd Office Action in Application 200880121295.0, mailed Apr. 9, 2013, 9 pgs.
Chinese 3rd Office Action in Application 201080019470.2, mailed May 31, 2013, 6 pgs.
Chinese Decision on Rejection in Application 200980147769.3, mailed Nov. 7, 2013, 9 pgs.
Chinese Notice of Allowance in Application 200880115943.1, mailed Jan. 15, 2013, 4 pgs.
Chinese Notice of Allowance in Application 200880119647.9, mailed Feb. 28, 2013, 4 pgs.
Chinese Notice of Allowance in Application 2008801212195.0, mailed Sep. 5, 2013, 4 pgs.
Chinese Notice of Allowance in Application 200980115758.7, mailed Jun. 6, 2013, 4 pgs.
Chinese Notice of Allowance in Application 200980116872.1, mailed Dec. 26, 2013, 4 pgs.
Chinese Notice of Allowance in Application 200980124935.8, mailed Nov. 11, 2013, 4 pgs.
Chinese Notice of Allowance in Application 201080019470.2, mailed Aug. 7, 2013, 4 pgs.
Chinese Notice on the Second Office Action mailed Mar. 1, 2013, in Application No. 201080019470.2, 6 pages.
Chinese Office Action in Application 200880115943.1, mailed Oct. 25, 2011, 13 pgs.
Chinese Office Action in Application 200880119647.9, mailed Nov. 24, 2011, 7 pgs.
Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, http://www.crpit.com/confpapers/CRPITV62Citro.pdf, pp. 1-10.
Dekeyser, Stijin, et al., "Path Locks for XML Document Collaboration", University of Antwerp, Dec. 12, 2002, pp. 105-114.
Ellis et al., "Groupware—Some Issues and Experiences", vol. 34, No. 1, Jan. 1, 1991, pp. 38-58.
European Decision to Refuse and Minutes of the Oral Hearing in EP Application 09739350.8, mailed Dec. 4, 2013, 36 pgs.
European Examination Report in Application 09739350.8, mailed Sep. 25, 2012, 7 pgs.
European Extended Search Report in Application 10770166.6, mailed Jun. 30, 2014, 7 pgs.
European Extended Search Report in EP Application 09739350.8, mailed Nov. 9, 2011, 10 pgs.
European Extended Search Report in EP Application 09767155.6, mailed Mar. 26, 2012, 10 pgs.
European Notice of Appeal in Application 09739350.8, filed Feb. 14, 2014, 2 pgs.
European Oral Hearing Summons in Application 09739350.8, mailed Jun. 27, 2013, 6 pgs.
European Submission of Grounds of Appeal in Application 09739350.8, filed Apr. 14, 2014, 4 pgs.
Feise, Joachim; "A Survey of Distributed Hypermedia Systems," ISR Institute for Software Research, University of California, Irvine, Apr. 2005, 39 pages.
Galli, R., "Journal File Systems in Linux," http://bulma.net/impresion.phtml?nldNoticia=1154, Jan. 24, 2002, 15 pgs.
Google, "Share and Collaborate in Real Time," 2008, http://www.google.com/google-d-s/intl/en/tour2.html, 1 pg.
Green, Bob, "Converting Qedit to the Client/Server Model", http://www.robelle.com/library/papers/client-server/, Copyright 2004, 14 pages.

(56) References Cited

OTHER PUBLICATIONS

Grover, Chris, "Word 2007: The Missing Manual", Pogue Press, Copyright 2007, pp. 380-388, 11 pgs in entirety.
Haake et al., "Collaborative Authoring of Hypermedia Documents," 1993, http://www/pi6.fernuni-hagen.de/publ/MT-93.pdf, pp. 41-58.
Hebsgarrd, Poul J; Process Driven Document Management™, Version 6.1, Feb. 2007, http://www.brain-technology.com/upload/file_vk306c6tr779p9gntgho_16467.pdf, pp. 1-13.
Heckel, Paul; "A Technique for Isolating Differences between Files" copyright 1978, 5 pages.
Ignat et al., "Extending Real-Time Collaborative Editing Systems with Asynchronous Communication," Institute for Information Systems, ETH Zurich, (at least as early as Oct. 4, 2007), http://www.inf.ethz.ch/personal/ignat/Publications/cscwd_04.pdf, pp. 1-6.
Immedius, Inc., "S1000Dmanager v 3.0", Comprehensive S1000D Project Setup and Management Support, found online on Aug. 22, 2008 at: http://www.immediuss1000d.com/c_manager/S1Dmanager_overview.html, 6 pgs.
International Preliminary Report and Written Opinion for PCT/US/2008/083069 / MS 321999.02 mailed Jun. 24, 2010, 6 pages.
International Search Report and Written Opinion for PCT/US2008/081456 / MS 321449.02 mailed Mar. 31, 2009, 12 pages.
International Search Report and Written Opinion for PCT/US2008/083862 / MS 321998.02 mailed Mar. 31, 2009, 11 pages.
International Search Report and Written Opinion for PCT/US2009/037920 mailed Nov. 30, 2009, 11 pages.
International Search Report and Written Opinion for PCT/US2009/039316 / MS 323384.02 mailed Jan. 18, 2010, 11 pages.
International Search Report and Written Opinion for PCT/US2009/045558 mailed Nov. 30, 2009, 11 pages.
Jalbert, Peter, "Real Time Collaboration with Google Docs and Spreadsheets," Jan. 23, 2008, 5 pages.
Japanese Final Rejection in Application 2010-536967, mailed Oct. 9, 2013, 6 pgs.
Japanese Final Rejection in Application 2012-508556, mailed May 7, 2014, 6 pgs.
Japanese Notice of Allowance in Application 2010-533160, mailed Jan. 14, 2014, 4 pgs.
Japanese Notice of Allowance in Application 2010536967, mailed Mar. 5, 2014, 4 pgs.
Japanese Notice of Allowance in Application 2010-538018, mailed Mar. 15, 2013, 6 pgs.
Japanese Notice of Allowance in Application 2011-507506, mailed Nov. 20, 2013, 4 pgs.
Japanese Notice of Allowance in Application 2011-508530, mailed Nov. 29, 2013, 4 pgs.
Japanese Notice of Rejection in Application 2010-533160, mailed Aug. 20, 2013, 4 pgs.
Japanese Notice of Rejection in Application 2010-536967, mailed Feb. 8, 2013, 6 pgs.
Japanese Notice of Rejection in Application 2011-507506, mailed May 21, 2013, 6 pgs.
Japanese Notice of Rejection in Application 2011508530, mailed Jun. 18, 2013, 6 pgs.
Japanese Notice of Rejection in Application 2011516385, mailed Jul. 9, 2013, 6 pgs.
Japanese Notice of Rejection in Application 2012-508556, mailed Oct. 21, 2013, 7 pgs.
Japanese Notice of Rejection mailed Dec. 28, 2012, in Application No. 2010-533160, 8 pages.
Koch, Michael, "Design Issues and Model for a Distributed Multi-User Editor" (pp. 1-21), from Computer Supported Cooperative Work, *An International Journal*, 3(3-4), 19995, pp. 359-378.
La Fontaine, Robin, Monsell EDM Ltd., Merging XMLFiles: a new approach providing intelligent merge of XML data sets, Presented at XML Europe 2002, http://www.deltaxml.com/dxml/93/version/default/part/AttachmentData/data/merging-xml-files.pdf, 21 pgs.
Lloyd, Zach et al., "Collaboration Goes One Level Deeper", obtained online at: http://googledocs.blogspot.in/2008/03/collaboration-goes-one-level-deeper.html, published Mar. 19, 2008, 2 pgs.

Lu et al., "Merging Retrieval Results in Hierarchical Peer-to-Peer Networks" SIGIR '04, Jul. 25-29, 2004, 2 pages.
McKechan et al., "Design Considerations for Creditor: A Collaborative Report Writing Editor," accessed May 16, 2008, http://userpages.umbc.edu/~jcampbel/Group01/McKechan_paper_iwces3.pdf, 10 pgs.
Mendoza et al., "A Flexible Distribution Service for a Co-authoring Environment on the Web," IEEE Computer Society, Proceedings of Sixth Mexican International Conference on Computer Science (ENC '05) © 2005, 8 pages.
Microsoft Corporation, Compare and Merge Mechanisms, © 2007, http://msdn2.microsoft.com/en-us/library/ek8hk7e2(VS.80,d=printer).aspx, 1 page.
Miller et al.; "Interactive Simultaneous Editing of Multiple Text Regions"; www.co-ode.org/resources/papers/k-cap2007-seidenberg.pdf; Jun. 2001; 15 pages.
Murray, Katherine et al., "Compare and Combine Documents in Word 2007", Microsoft Office Word 2007 Inside Out, obtained online on Jul. 11, 2012 at: http://office.microsoft.com/en-us/word-help/compare-and-combine-documents-in-word-2 . . . , 2012 Microsoft Corporation, 5 pgs.
Ohst et al., "Difference Tools for Analysis and Design Documents" copyright 2003, 10 pages.
Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.
PCT International Search Report and Written Opinion in Application PCT/US2010/032309, mailed Dec. 1, 2010, 9 pgs.
PCT International Search Report for PCT/US2009/062364 dated May 31, 2010, 11 pgs.
Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, http://cims.clayton.edu/jpreston/PhD/Research/Preston%20-%20CSCW%20Demo%20Extended%20Abstract.pdf, pp. 1-2.
Russian Notice of Allowance in Application 2010118615, mailed Jul. 1, 2013, 6 pgs.
Russian Notice of Allowance in Application 2010122968, mailed Nov. 6, 2012, 27 pgs.
Russian Notice of Allowance in Application 2010123793, mailed Apr. 13, 2012, 7 pgs.
Russian Notice of Allowance in Application 2010144042, mailed Feb. 27, 2013, 7 pgs.
Russian Notice of Allowance in Application 2010145165, mailed Jun. 20, 2013, 6 pgs.
Russian Notice of Allowance in Application 2010153320, mailed Apr. 17, 2013, 23 pgs.
Russian Notice of Allowance in Application 2011143794, mailed Apr. 11, 2014, 21 pgs.
Samiei et al., "EzMail: Using Information Vizualization Techniques to Help Manage Email", Proceedings of the 8th National Conference on Information Vizualization, 2004, 6 pgs.
Seidenberg et al; "A Methodology for Asynchronous MultiUser Editing of Semantic Web Ontologies"; www.xmpp.org/extensions/xep-0058.html; Mar. 28, 2006; 8 pages.
Shchepin, "XEP-0058: Multi-User Text Editing", http://groups.csail.mit.edu/uid/projects/simuledit/usenix01.pdf, Oct. 9, 2007, 5 pages.
Shepler et al., "Network File 1-15 Systems (NFS)," Version 4, Apr. 1, 2003, retrieved from http://rsync.tools.ietf.org/html/rfc3530 on Mar. 7, 2012, 275 pgs.
Shiro Sakata, "Development and Evaluation on an in-house multi-media desktop conference system", Apr. 1990, IEEE Journal on selected areas in communications, vol. 8, Apr. 1990.
Synchronous Collaborative Text Document Editing Online: MoonEdit, reviewed Sep. 13, 2007, http://www.masternewmedia.org/news/2005/02/20/synchronous_collaborative_text_document-editing.htm, pp. 1-4.
Taiwan Notice of Allowance in Application 99108780, mailed Oct. 21, 2013, 4 pgs.

(56) References Cited

OTHER PUBLICATIONS

Taiwan Search Report and Office Action in Application 97142418, mailed Feb. 21, 2012, 13 pgs.
Taiwanese Notice of Allowance in Application 097139413, mailed Jun. 27, 2014, 4 pgs.
Taiwanese Notice of Allowance in Application 97142418, mailed Aug. 16, 2012, 4 pgs.
Taiwanese Notice of Allowance in Application 98117528, mailed Jul. 7, 2014, 4 pgs.
Taiwanese Office Action and Search Report in Application 099108780, mailed Jun. 19, 2013, 5 pgs.
Taiwanese Search Report in Application 097139413, mailed Mar. 17, 2014, 13 pgs.
Taiwanese Search Report in Application 097144208, mailed Feb. 8, 2014, 13 pgs.
Taiwanese Search Report in Application 098117528, mailed Mar. 20, 2014, 10 pgs.
Tanebaum, Andrew S., "Moderne Betriebssysteme", 2003 Pearson, pp. 786-787.
Tanenbaum, Andrew S., "Modern Operating Systems", 2nd Edition, Prentice Hall, New Jersey, 2001, pp. 735-737.
Tichy, Walter F., RCS—A System for Version Control, Jan. 3, 1991, http://www.svlug.org/teams/rcs.pdf, 20 pgs.
Tyson, Herb, "Microsoft Word 2007 Bible", Wiley Publishing Company, Inc. 2007, Indianapolis, IN, USA, pp. 807-808, 4 pgs in entirety.
US Final Office Action for U.S. Appl. No. 11/938,082, mailed Jun. 29, 2010, 30 pgs.
US Final Office Action for U.S. Appl. No. 11/957,010, mailed Aug. 18, 2010, 26 pgs.
US Final Office Action for U.S. Appl. No. 12/044,744, mailed Nov. 22, 2010, 14 pgs.
US Final Office Action for U.S. Appl. No. 12/145,536, mailed Apr. 26, 2011, 32 pgs.
US Non-Final Office Action for U.S. Appl. No. 11/938,082, mailed Dec. 28, 2009, 20 pgs.
US Non-Final Office Action for U.S. Appl. No. 11/951,973, mailed Jan. 19, 2011, 11 pages.
US Non-Final Office Action for U.S. Appl. No. 11/957,010, mailed Mar. 18, 2010, 24 pgs.
US Non-Final Office Action for U.S. Appl. No. 12/044,744, mailed Jul. 26, 2010, 15 pgs.
US Non-Final Office Action for U.S. Appl. No. 12/044,744, mailed Mar. 25, 2011, 16 pgs.
US Non-Final Office Action for U.S. Appl. No. 12/111,174, mailed Jun. 8, 2011, 42 pgs.
US Non-Final Office Action for U.S. Appl. No. 12/117,025, mailed Sep. 21, 2010, 13 pgs.
US Non-Final Office Action for U.S. Appl. No. 12/145,536, mailed Nov. 8, 2010, 28 pgs.
US Notice of Allowance for U.S. Appl. No. 11/938,082, mailed Jan. 4, 2011, 18 pgs.
US Notice of Allowance for U.S. Appl. No. 12/117,025, mailed Dec. 28, 2011, 11 pgs.
US Notice of Allowance for U.S. Appl. No. 12/117,025, mailed Apr. 14, 2011, 10 pgs.
U.S. Appl. No. 11/951,973, Notice of Allowance mailed Jun. 21, 2011, 9 pgs.
U.S. Appl. No. 11/957,010, Notice of Allowance mailed Mar. 12, 2014, 9 pgs.
U.S. Appl. No. 11/957,010, Office Action mailed Jan. 27, 2012, 25 pgs.
U.S. Appl. No. 11/957,010, Office Action mailed Aug. 12, 2013, 28 pgs.
U.S. Appl. No. 11/957,010, Office Action mailed Aug. 17, 2011, 26 pgs.
U.S. Appl. No. 12/044,744, Final Office Action mailed Aug. 30, 2011, 17 pgs.
U.S. Appl. No. 12/044,744, Notice of Allowance mailed May 7, 2012, 12 pgs.
U.S. Appl. No. 12/044,744, Notice of Allowance mailed Jun. 21, 2012, 8 pgs.
U.S. Appl. No. 12/044,744, Office Action mailed Dec. 30, 2011, 17 pgs.
U.S. Appl. No. 12/111,174, Notice of Allowance mailed Nov. 19, 2012, 2 pgs.
U.S. Appl. No. 12/111,174, Notice of Allowance mailed Dec. 4, 2012, 2 pgs.
U.S. Appl. No. 12/111,174, Notice of Allowance mailed Apr. 12, 2012, 11 pgs.
U.S. Appl. No. 12/111,174, Notice of Allowance mailed Aug. 29, 2012, 11 pgs.
U.S. Appl. No. 12/111,174, Office Action mailed Nov. 21, 2011, 20 pgs.
U.S. Appl. No. 12/117,025, Notice of Allowance mailed Sep. 15, 2011, 9 pgs.
U.S. Appl. No. 12/117,040, Notice of Allowance mailed Dec. 6, 2012, 14 pgs.
U.S. Appl. No. 12/117,040, Notice of Allowance mailed Mar. 29, 2012, 11 pgs.
U.S. Appl. No. 12/117,040, Notice of Allowance mailed Jun. 21, 2012, 9 pgs.
U.S. Appl. No. 12/117,040, Notice of Allowance mailed Aug. 20, 2012, 14 pgs.
U.S. Appl. No. 12/117,040, Office Action mailed Oct. 4, 2011, 15 pgs.
U.S. Appl. No. 12/145,536, Office Action mailed Mar. 12, 2012, 52 pgs.
U.S. Appl. No. 12/276,874, Final Office Action mailed Aug. 3, 2011, 15 pgs.
U.S. Appl. No. 12/276,874, Office Action mailed Oct. 26, 2011, 18 pgs.
U.S. Appl. No. 12/276,874, Office Action mailed Feb. 22, 2011, 15 pgs.
U.S. Appl. No. 12/276,874, Office Action mailed Mar. 28, 2013, 24 pgs.
U.S. Appl. No. 12/276,874, Office Action mailed Apr. 26, 2012, 20 pgs.
U.S. Appl. No. 12/276,874, Office Action mailed May 30, 2014, 25 pgs.
U.S. Appl. No. 12/276,874, Office Action mailed Sep. 10, 2013, 24 pgs.
U.S. Appl. No. 12/276,874, Office Action mailed Sep. 27, 2012, 22 pgs.
U.S. Appl. No. 12/432,817, Notice of Allowance mailed May 2, 2012, 6 pgs.
U.S. Appl. No. 12/432,817, Notice of Allowance mailed Aug. 6, 2012, 5 pgs.
U.S. Appl. No. 12/432,817, Office Action mailed Jan. 25, 2012, 27 pgs.
U.S. Appl. No. 12/432,817, Office Action mailed Sep. 12, 2011, 25 pgs.
U.S. Appl. No. 13/079,605, Notice of Allowance mailed Oct. 22, 2012, 9 pgs.
U.S. Appl. No. 13/079,605, Notice of Allowance mailed Nov. 19, 2012, 2 pgs.
U.S. Appl. No. 13/079,605, Notice of Allowance mailed Dec. 5, 2012, 2 pgs.
U.S. Appl. No. 13/079,605, Notice of Allowance mailed Apr. 20, 2012, 9 pgs.
U.S. Appl. No. 13/079,605, Notice of Allowance mailed Jun. 28, 2012, 9 pgs.
U.S. Appl. No. 13/079,605, Office Action mailed Dec. 5, 2011, 31 pgs.
U.S. Appl. No. 13/495,659, Office Action mailed Oct. 25, 2013, 8 pgs.
U.S. Appl. No. 13/495,659, Office Action mailed Nov. 21, 2012, 7 pgs.
U.S. Appl. No. 13/495,659, Office Action mailed Jul. 5, 2013, 8 pgs.
U.S. Appl. No. 13/495,659, Office Action mailed Jul. 9, 2014, 8 pgs.
U.S. Appl. No. 13/539,473, Amendment and Response filed Jan. 11, 2013, 15 pgs.

(56) References Cited

OTHER PUBLICATIONS

U.S. Appl. No. 13/539,473, Amendment and Response filed Apr. 25, 2014, 15 pgs.
U.S. Appl. No. 13/539,473, Amendment and Response filed Sep. 3, 2013, 13 pgs.
U.S. Appl. No. 13/539,473, Notice of Allowance mailed Jul. 9, 2014, 9 pgs.
U.S. Appl. No. 13/539,473, Office Action mailed Oct. 11, 2012, 23 pgs.
U.S. Appl. No. 13/539,473, Office Action mailed Oct. 25, 2013, 17 pgs.
U.S. Appl. No. 13/539,473, Office Action mailed Apr. 2, 2013, 26 pgs.
U.S. Appl. No. 13/760,224, Office Action mailed Jun. 6, 2014, 14 pgs.
U.S. Appl. No. 11/957,010, Notice of Allowance mailed Jun. 10, 2014, 6 pgs.
U.S. Appl. No. No. 12/117,025, Notice of Allowance mailed Jan. 8, 2014, 11 pgs.
U.S. Appl. No. 12/117,025, Notice of Allowance mailed Nov. 22, 2013, 13 pgs.
U.S. Appl. No. 12/117,025, Notice of Allowance mailed Feb. 20, 2014, 10 pgs.
U.S. Appl. No. 12/117,025, Notice of Allowance mailed Apr. 14, 2014, 11 pgs.
U.S. Appl. No. 12/117,025, Notice of Allowance mailed Jul. 21, 2011, 10 pgs.
U.S. Appl. No. 12/117,025, Office Action mailed Oct. 31, 2012, 11 pgs.
U.S. Appl. No. 12/117,025, Office Action mailed Jul. 23, 2013, 12 pgs.
U.S. Appl. No. 12/145,536, Notice of Allowance mailed Nov. 23, 2012, 18 pgs.
U.S. Appl. No. 12/145,536, Office Action mailed Aug. 1, 2011, 37 pgs.
U.S. Appl. No. 11/938,082, filed Nov. 9, 2007, Confirmation No. 3133.
U.S. Appl. No. 11/951,973, filed Dec. 6, 2007, Confirmation No. 9364.
U.S. Appl. No. 11/957,010, filed Dec. 14, 2007, Confirmation No. 8535.
U.S. Appl. No. 12/044,744, filed Mar. 7, 2008, Confirmation No. 7862.
U.S. Appl. No. 12/111,174, filed Apr. 28, 2008, Confirmation No. 6839.
U.S. Appl. No. 12/117,025, filed May 8, 2008, Confirmation No. 8234.
U.S. Appl. No. 12/117,040, filed May 8, 2008, Confirmation No. 8262.
U.S. Appl. No. 12/145,536, filed Jun. 25, 2008, Confirmation No. 3462.
Venolia, Gina et al., "Understanding Sequence and Reply Relationships Within Email Conversations: A Mixed-Model Vizualization", Apr. 2003, Proceedings of the SIGCHI Conference on Human Factors in Computing Systems, Ft. Lauderdale, FL, USA, Apr. 5-10, 2003, 8 pgs.
Wilde, Erik, "Multi-User Multimedia Editing with the MultimETH System," Swiss Federal Institute of Technology, CH 8092, Zurich, (at least as early as Oct. 10, 2007), http://dret.net/netdret/docs/wilde-tikrep18.pdf, pp. 1-9.
Willden, Andrew, "Track Changes in Word 2007," Fall 2007, 2 pages.
Williams, Tim, "Version Control on the Cheap: A User-Friendly, Cost-Effective Revision Control System for SAS", 10 pgs., no date.
ZEND Corporation, The PHP Company, "Team Development With Zend Studio for Eclipse", White Paper, Jan. 2008, 17 pgs.
Australian Second Office Action in Application 2009241535, mailed May 16, 2014, 4 pgs.
Israeli Office Action in Application 208040, mailed Dec. 25, 2013, 8 pgs.
Japanese Notice of Allowance in Application 2011516385, mailed Feb. 13, 2014, 7 pgs.
Australian Notice of Allowance in Application 2009318022, mailed Jun. 5, 2014, 2 pgs.
European Office Action Communication, in Application EP 10770166.6, mailed Jul. 17, 2014, 1 page.
U.S. Appl. No. 13/539,473, Notice of Allowance mailed Sep. 4, 2014, 8 pgs.
U.S. Appl. No. 13/760,224, Amendment and Response filed Sep. 8, 2014, 11 pgs.
U.S. Appl. No. 13/539,473, Supplemental Notice of Allowance mailed Sep. 30, 2014, 2 pgs.
U.S. Appl. No. 12/276,874, Amendment and Response filed Sep. 30, 2014, 12 pgs.
Taiwanese Notice of Allowance in Application 97144208, mailed Sep. 5, 2014, 4 pgs.
Australian Notice of Allowance in Application 2009241535, mailed Aug. 7, 2014, 2 pgs.
U.S. Appl. No. 13/495,659, Amendment and Response filed Oct. 9, 2014, 8 pgs.
Taiwanese Office Action and Search Report in Application 98139984, mailed Sep. 16, 2014, 12 pages.
U.S. Appl. No. 13/539,473, Notice of Allowance mailed Nov. 14, 2014, 8 pgs.
U.S. Appl. No. 13/539,473, Amendment filed Nov. 24, 2014, 8 pgs.
U.S. Appl. No. 13/495,659, Office Action mailed Nov. 20, 2014, 7 pgs.
Preston, Jon A, et al., "An efficient synchronous collaborative editing system deploying dynamic locking of varying granularity in generalized document trees", Nov. 17-20, 2006, pp. 1-10.
Taiwanese Notice of Allowance in Application 98139984, mailed Jan. 27, 2015, 4 pgs.
U.S. Appl. No. 13/495,659, Amendment and Response filed Feb. 23, 2015, 10 pgs.
Malaysian Adverse Report in Application PI 2010004653, mailed Jan. 30, 2015, 3 pgs.
European Extended Search Report in Application 09770643.6, mailed Mar. 16, 2015, 6 pgs.
Israeli Office Action in Application 212007, mailed Jan. 31, 2015, 6 pgs. (partially in English).
Korean Notice of Preliminary Rejection in Application 10-2010-7012783, mailed Feb. 5, 2015, 4 pgs.
European Communication in Application 09770643.6, mailed Apr. 2, 2015, 1 page.
Malaysian Adverse Report in Application PI 2010005579, mailed Mar. 31, 2015, 3 pgs.
Korean Office Action in Application 10-2015-7002346, mailed Mar. 31, 2015, 7 pgs.
U.S. Appl. No. 13/859,631, Office Action mailed Apr. 29, 2015, 32 pgs.
Venolia, G. D. et al., "Understanding Sequence and Reply Relationships within Email Conversations: A Mixed-Model Visualization", abbreviated paper submitted to CHI 2-3, 2003, 4 pgs.
U.S. Appl. No. 13/760,224, Notice of Allowance mailed Dec. 8, 2014, 11 pgs.
U.S. Appl. No. 12/276,874, Office Action mailed Dec. 4, 2014, 26 pgs.
U.S. Appl. No. 13/539,473, USPTO Response after Amendment after Allowance mailed Dec. 10, 2014, 2 pgs.
Korean Office Action in Application 10-2010-700797, mailed Nov. 28, 2014, 5 pgs.
Korean Office Action in Application 10-2010-7012220, mailed Nov. 28, 2014, 7 pgs.
Canadian Office Action in Application 2718106, mailed Sep. 14, 2015, 6 pgs.
Korean Notice of Preliminary Rejection in Application 10-2015-7019793, mailed Sep. 11, 2015, 11 pgs. (with English translation).
Canadian Office Action in Application 2720732, mailed Jun. 5, 2015, 6 pgs.
Korean Notice of Preliminary Rejection in Application 10-2010-7029113, mailed May 21, 2015, 5 pgs. (with English translation).
Korean Notice of Preliminary Rejection in Application 10-2011-7011228, mailed May 21, 2015, 15 pgs. (with English translation).

(56) References Cited

OTHER PUBLICATIONS

"ACE (editor)", Wikipedia, Mar. 1, 2006, obtained online at https://en.wikipedia.org/wiki/ACE_(editor) on Jun. 23, 2015, 4 pgs.
"Gobby", Wikipedia, Aug. 24, 2014, obtained online at: https://en.wikipedia.org/wiki/Gobby on Jun. 19, 2015, 2 pgs.
"CoWord", Wikipedia, May 15, 2007, obtained online at: https://en.wikipedia.org/wiki/CoWord on Jun. 19, 2015, 2 pgs.
U.S. Appl. No. 14/474,481, Office Action mailed Jul. 8, 2015, 26 pgs.
U.S. Appl. No. 13/495,659, Office Action mailed Jun. 29, 2015, 9 pgs.
Korean Final Rejection in Application 1020107012220, mailed Jun. 30, 2015, 4 pgs.
Japanese Appeal Decision to Grant Patent in Application 2012-508556, mailed Jul. 10, 2015, 4 pgs.
Korean Final Notice of Rejection in Application 10-2015-7002346, mailed Aug. 19, 2015, 18 pgs.
Taiwanese Search Report in application 103135218, mailed Aug. 26, 2015, 1 page.
Israel Office Action in Patent Application 212007, Mailed Date: Mar. 31, 2015, 3 Pages.
European Communication in Application 08848473.8, mailed Mar. 8, 2016, 1 page.
Taiwan Office Action and Search Report in Application 103126243, mailed Mar. 1, 2016, 5 pgs.
Canadian Office Action in Application 2718106, mailed Mar. 17, 2016, 5 pgs.
Malaysian Notice of Allowance in Application PI2010004653, mailed Nov. 30, 2015, 2 pgs.
Canadian Office Action in Application 2724679, mailed Mar. 23, 2016, 5 pgs.
European Notice of Allowance in Application 09770643.6, mailed Feb. 22, 2016, 8 pgs.
Malaysian Adverse Report in Application PI2011001841, mailed Mar. 15, 2016, 3 pgs.
Canadian Notice of Allowance in Application 2756863, mailed Mar. 16, 2016, 1 page.
Korean Office Action in Application 1020117025682, mailed Mar. 14, 2016, 5 pgs.
Chinese Notice on Reexamination in Application 200980147769.3, mailed Apr. 5, 2016, 10 pgs.
Canadian Office Action in Application 2,666,340, mailed Apr. 21, 2016, 13 pgs.
Korean Final Rejection in Application 10-2010-7029113, mailed Mar. 31, 2016, 12 pgs.
Malaysian Adverse Report in Application PI 2010001575, mailed Jul. 31, 2015, 3 pgs.
Malaysian Adverse Report in Application PI 2010001887, mailed Jul. 31, 2015, 3 pgs.
Malaysian Adverse Report in Application PI 2010002084, mailed Jul. 31, 2015, 3 pgs.
Canadian Office Action in Application 2724679, mailed Oct. 14, 2015, 3 pgs.
Korean Office Action in Application 10-2015-7019912, mailed Sep. 11, 2015, 6 pgs.
U.S. Appl. No. 14/474,481, Amendment and Response filed Oct. 8, 2015, 16 pgs.
U.S. Appl. No. 13/859,631, Amendment and Response filed Oct. 29, 2015, 15 pgs.
U.S. Appl. No. 13/859,631, Office Action mailed Dec. 8, 2015, 34 pgs.
Taiwanese Notice of Allowance in Application 103135218, mailed Nov. 30, 2015, 4 pgs.
Malaysian Notice of Allowance in Application PI 2010005579, mailed Oct. 30, 2015, 2 pgs.
Korean Notice of Preliminary Rejection in Application 1020157025969, mailed Nov. 17, 2015, 7 pgs.
Korean Notice of Preliminary Rejection in Application 1020157025970, mailed Nov. 11, 2015, 11 pgs.
Brinck et al., "A Collaborative Medium for the Support if Conversational Props", Nov. 1992 CSCW 92 Proceedings, pp. 171-178.
Farella et al., "Multi-Client Cooperation and Wireless Pda Interaction in Immersive Virtual Environment", http://www-micrel.deis.unibo.it/~farella/doc/Farella115def.pdf—(Publicly known at least as early as Aug. 2006).
Geyer et al., "A Team Collaboration Space Supporting Capture and Access of Virtual Meetings", Proceedings of the 2001 International ACM Siggroup Conference on Supporting Group Work, ACM, pp. 188-196.
http://www.geimaginationcubed.com, 5 pages (Publicly known at least as early as Mar. 2005).
Kolland et al., "Information Sharing in Collaborative Environments, Enabling Technologies: Infrastructure for Collaborative Enterprises", 1994, pp. 140-154.
Leung et al., "Creating a multiuser 3-D virtual environment", Date: May 2001, on page(s): 9-16, vol. 18, Issue: 3, http://ieeexplore.ieee.org/xpl/abs_free.jsp?arNumber=924884.
Roseman et al., "TeamRooms: Network Places for Collaboration, Proceeding of the 1996 ACM Conference on Computer Supported Cooperative Work", pp. 325-333.
Roussel, Nicolas, "Mediascape: a Web-based Mediaspace", http://citeseer.ist.psu.edu/cache/papers/cs/25847/http:zSzzSzwww-ihm.lri.frzSzzCz7erousselzSzpublicationszSzmultimedia.pdf/roussel99mediascape.pdf—(Publicly known at least as early as Aug. 2006).
PCT International Search Report in International Application No. PCT/US2007/083024, mailed Apr. 29, 2008, 11 pgs.
Chinese First Office Action for Application No. 200780042038.3 mailed Jun. 23, 2010, 20 pgs.
Chinese Second Office Action for Application No. 200780042038.3 mailed Apr. 28, 2011, 10 pgs.
Australian Office Action for Application No. 2007324103 mailed May 27, 2011, 2 pgs.
Chinese Notice of Allowance for Application No. 200780042038.3 mailed Aug. 25, 2011, 4 pgs.
Australian Notice of Acceptance in Application No. 2007324103 mailed Sep. 14, 2011, 3 pgs.
Russian Notice of Allowance for Application No. 2009117840/08 mailed Feb. 7, 2012, 22 pgs.
Japanese Office Action for Application No. 2009-537263 mailed Feb. 21, 2012, 8 pgs.
Japanese Notice of Allowance for Application No. 2009-537263 mailed Jun. 22, 2012, 6 pgs.
European Search Report for Application No. PCT/US2007083024 mailed Mar. 28, 2013, 8 pgs.
Korean Notice of Preliminary Rejection for Application No. 10-2009-7010393 mailed Feb. 28, 2014, 16 pgs.
Korean Notice of Allowance received for Patent Application 10-2009-7010393, mailed May 20, 2014, 2 pages.
Canadian Office Action Issued in Patent Application No. 2666340, Mailed Nov. 28, 2014, 5 pages.
Canadian Office Action Issued in Patent Application No. 2666340, mailed Sep. 14, 2015, 6 pages.
U.S. Appl. No. 11/599,599, Office Action mailed Jun. 11, 2009, 15 pgs.
U.S. Appl. No. 11/599,599, Amendment and Response filed Aug. 27, 2009, 10 pgs.
U.S. Appl. No. 11/599,599, Notice of Allowance mailed Dec. 7, 2009, 13 pgs.
U.S. Appl. No. 12/713,582, Office Action mailed Dec. 24, 2013, 17 pgs.
U.S. Appl. No. 12/713,582, Amendment and Response mailed Mar. 24, 2014, 10 pgs.
U.S. Appl. No. 12/713,582, Notice of Allowance mailed Feb. 13, 2015, 17 pgs.
European Communication in Application 07863665.1, mailed Apr. 16, 2013, 1 page.
Malaysian Notice of Allowance in Application PI 20091514, mailed Oct. 30, 2007, 3 pgs.
Notice of Allowance Issued in Korean Patent Application No. 10-2010-7029113, Mailed Date: Dec. 31, 2015, 2 pages.

(56) References Cited

OTHER PUBLICATIONS

U.S. Appl. No. 14/474,481, Office Action mailed Jan. 15, 2016, 25 pgs.
U.S. Appl. No. 13/544,310, Office Action mailed Jan. 15, 2016, 10 pgs.
European extended Search Report in Application 08848473.8, mailed Feb. 18, 2016, 11 pgs.
Ruixuan Li et al., "P2P-based Locking in Real-Time Collaborative Editing Systems", Computer Supported Cooperative Work in Design, 2007,CSCWD, 11th Intl. Conf. on IEEE, PI, Apr. 1, 2007, pp. 24-29.
Malaysian Notice of Allowance in Application PI 2010001887, mailed Jan. 15, 2016, 2 pgs.
Korean Office Action in Application 10-2011-7011228, mailed Dec. 31, 2015, 4 pgs.
Korean Final Rejection in Application 10-2015-7025970, mailed May 23, 2016, 5 pgs.
Korean Notice of Preliminary Rejection in Application 10-2015-7019912, mailed Mar. 31, 2016, 10 pgs.
U.S. Appl. No. 13/544,310, Amendment and Response filed Jun. 4, 2016, 11 pgs.
U.S. Appl. No. 13/859,631, Amendment and Response filed Jun. 3, 2016, 15 pgs.
Korean Office Action in Application 10-2015-7025969, mailed Jun. 29, 2016, 7 pgs.

\* cited by examiner

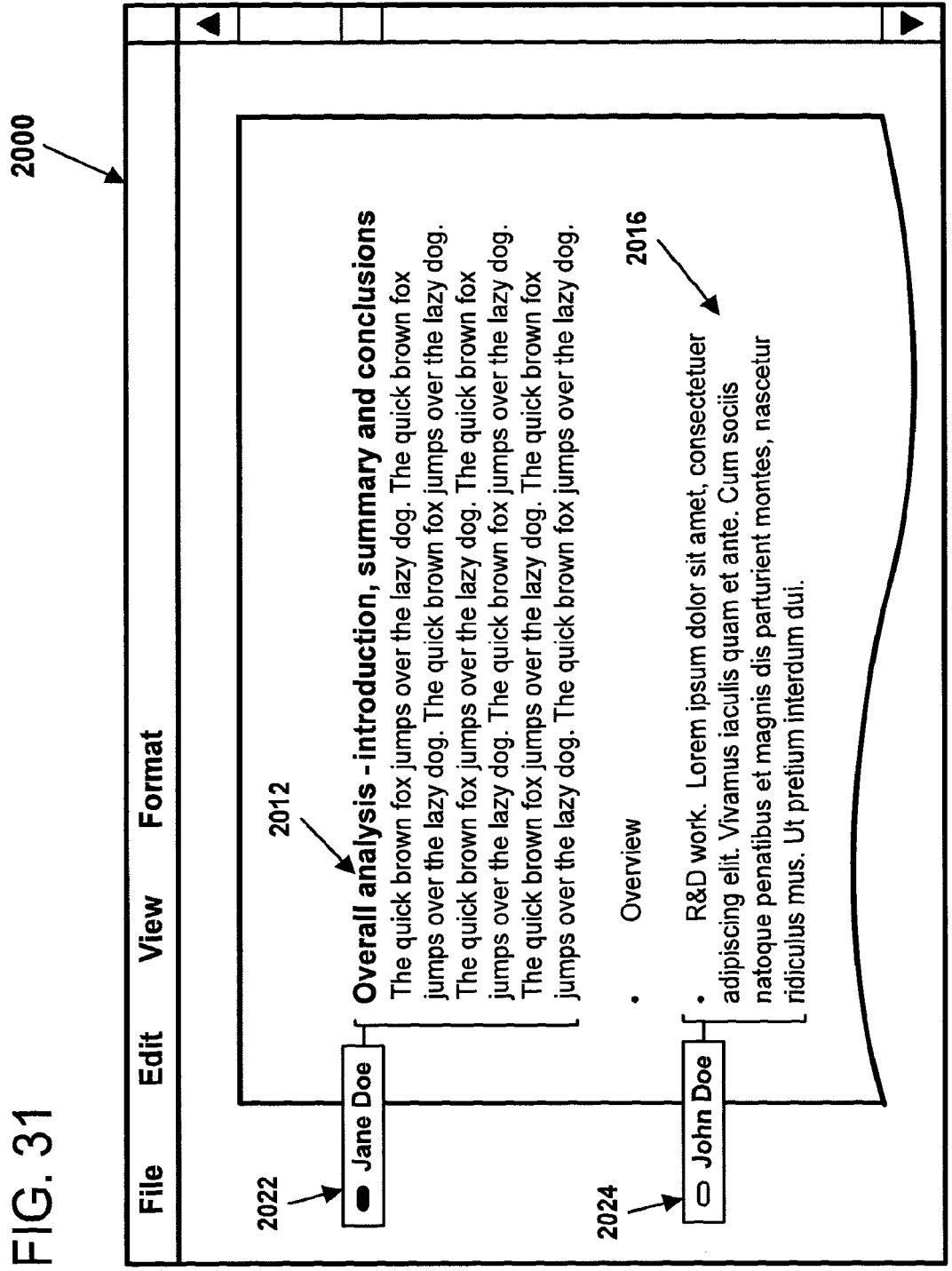

COLLABORATIVE AUTHORING

RELATED APPLICATIONS

This application is a continuation of U.S. patent application Ser. No. 13/539,473 (now U.S. Pat. No. 8,990,150), filed Jul. 1, 2012, entitled "Collaborative Authoring," which application is a continuation of U.S. patent application Ser. No. 13/079,605 (now U.S. Pat. No. 8,352,418), filed Apr. 4, 2011, entitled "Client Side Locking," which application is a continuation of U.S. patent application Ser. No. 11/938,082 (now U.S. Pat. No. 7,941,399), filed Nov. 9, 2007, entitled "Collaborative Authoring," the complete disclosures of which are hereby incorporated herein by reference.

BACKGROUND

Traditional collaborative editing tends to be performed serially. Users take turns accessing a document, editing the document, and storing their edits. The accessing user may place a lock on the file to inhibit other users from editing the document when the accessing user is editing the document. The iterative editing process can cause delays since each user may wait for a turn at editing the document. In addition, the iterative editing process may be difficult to manage. For example, each user may need to keep track of who is editing which portions of the document, which version of the document is the most recent, and when the user will have a turn.

In other types of traditional collaborative editing, each user can edit a different copy of a document. Subsequently, all of the edited copies may be merged into a single document. This large scale merge also may cause delays, lead to numerous editing conflicts, and/or be difficult to manage. For example, the user responsible for merging the documents may be required to track the relationship between the documents. The user also may be responsible for resolving conflicts among two or more of the edited copies.

It is with respect to these and other considerations that the present disclosure has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A collaborative authoring application provides an authoring environment in which two or more users can edit a document concurrently. Each user edits a copy of the document, periodically sends updates to a master copy of the document, and periodically receives updates from the master copy of the document. The authoring environment generally inhibits the users from providing conflicting editing instructions to the master copy of the document. In other embodiments, the authoring environment can inhibit editing conflicts if the users edit the document at different times.

According to aspects of the disclosure, each document being authored can be divided into one or more data units. Each user can generate a content lock about one or more of the data units. Generating a content lock about a data unit inhibits other users from editing the locked data unit. In one embodiment, content locks can grow and/or shrink automatically as the user edits the document.

According to other aspects of the disclosure, the authoring environment synchronizes both content and metadata among the user copies and the master copy of the document. In general, the authoring environment synchronizes metadata automatically and synchronizes content only at the request of one of the users. In one embodiment, the metadata includes content locks.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIGS. 27-31 illustrate changes to an exemplary user interface of a first authoring application as a first user and a second user collaboratively author a document in accordance with the principles of the present disclosure.

DETAILED DESCRIPTION

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the invention is defined by the appended claims and their equivalents.

Figure 1:
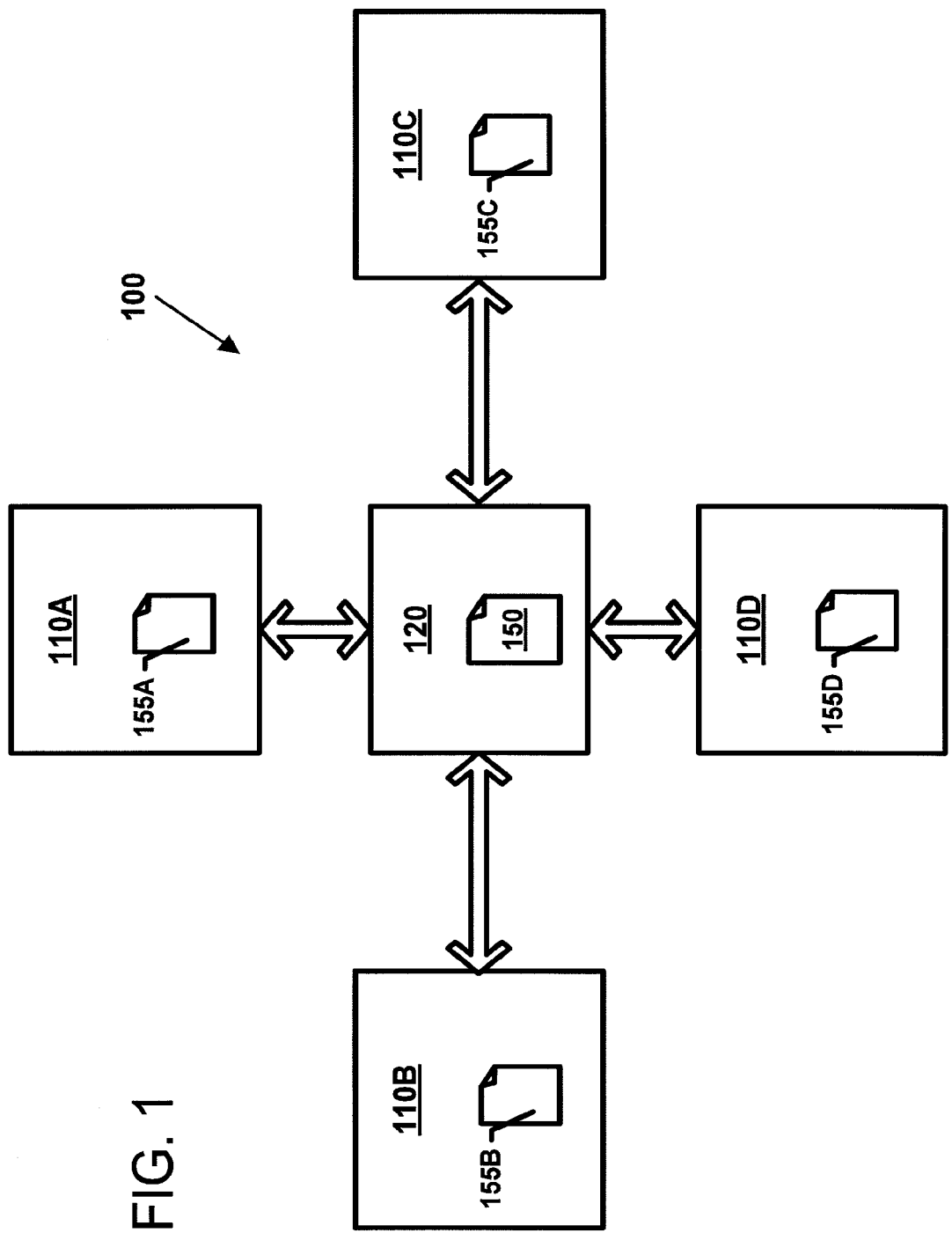
FIG. 1 is a schematic block diagram illustrating an example authoring system having features that are examples of inventive aspects of the disclosure.

Embodiments of the present disclosure provide an environment in which multiple users can collaboratively author a document. FIG. 1 illustrates an example authoring system 100 having features that are examples of inventive aspects of the disclosure. The authoring system 100 includes a storage device 120 storing a master copy of a document 150. In one embodiment, the storage device 120 can include a computing device. In another embodiment, the storage device 120 can include one or more storage devices (e.g., a network of computing devices).

The authoring system 100 also includes at least one user computing device 110 that is communicatively coupled to the storage device 120. Each of the user computing devices 110 can edit the document 150 by creating a user copy 155 of the document 150 and editing the user copy 155. The user copies 155 of the document 150 are synchronized when the user computing devices 110 periodically send to the storage device 120 updates to be shared with the other user computing devices and periodically obtain from the storage device 120 updates from other user computing devices.

As the term is used herein, a user computing device 110 includes any computing device that obtains a user copy of a document to be authored from a master copy of the document. The user computing device 110 can be different from the storage device 120 or can include a different user account implemented on the storage device 120. In one embodiment, a computing device that acts as a storage device 120 for one document may act as a user computing device 110 for a different document and vice versa.

In the example shown, four user computing devices 110A, 110B, 110C, and 110D are communicatively coupled to the storage device 120. In other embodiments, however, any number of computing devices 110 may be coupled to the storage device 120. In the example shown, each user computing device 110A, 110B, 110C, 110D can send to the storage device 120 updates generated by the user of the user computing device and can request from the storage device 120 updates generated by the users of the other user computing devices. In one embodiment, the storage device 120 can be a server computing device and the user computing devices 110A, 110B, 110C, 110D can be client computing devices.

Figure 2:
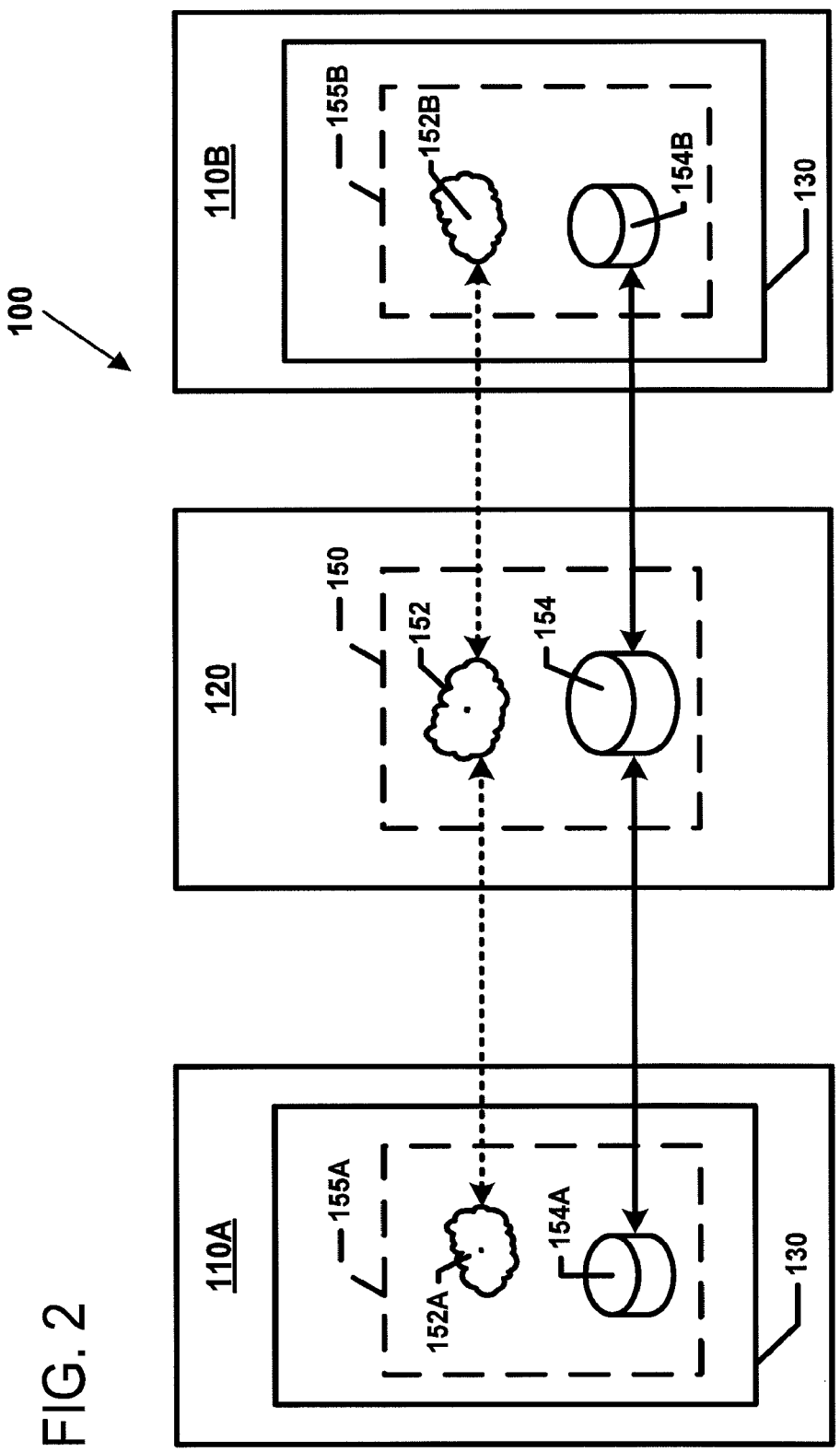
FIG. 2 is a schematic block diagram illustrating the authoring system of FIG. 1 in which a document stored on first computing device can include content and metadata in accordance with the principles of the present disclosure.

As shown in FIG. 2, the document 150 stored on the storage device 120 can include content 152 and metadata 154. Authoring applications 130 on the user computing devices 110 process and manipulate the content and metadata of the user copies 155 of the document 150. In some embodiments, metadata 154 can be stored separately from content 152. For example, content 152 can be stored in the document 150 and metadata 154 can be stored in a table (see FIG. 7) separate from the document 150. In other embodiments, however, the metadata 154 can be stored within the document 150.

In general, the user computing devices 110 can synchronize updates to the content 152 separately from updates to the metadata 154. In general, metadata updates 154 are automatically synchronized among the storage device 120 and user computing devices 110, whereas content updates 152 from each user computing device 110 are synchronized at the request of the respective user.

Figure 3:
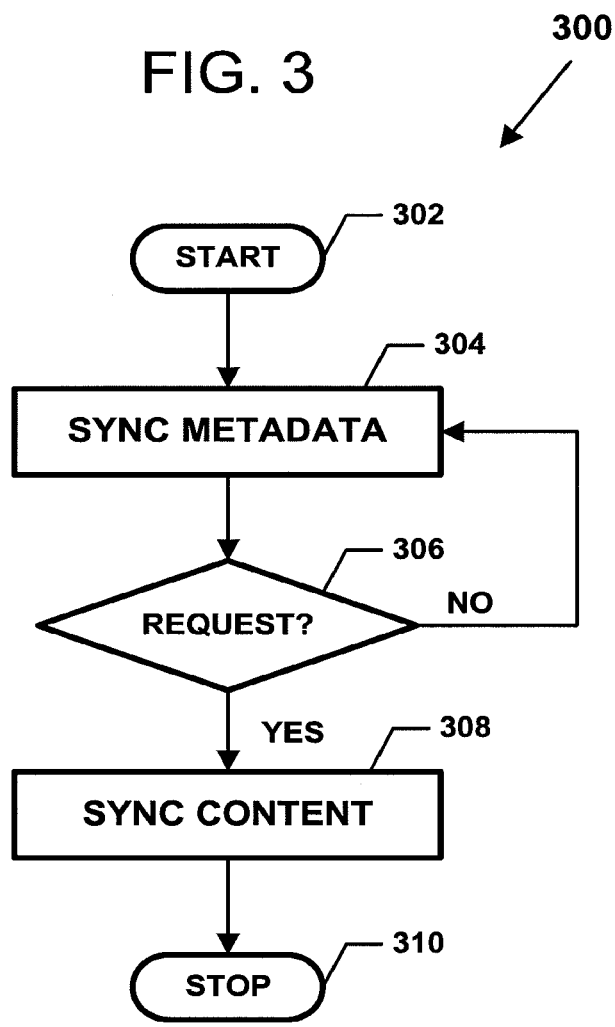
FIG. 3 is a flowchart illustrating an exemplary synchronization process by which an authoring system can synchronize a copy of a document stored on a user computing device with the master copy of the document in accordance with the principles of the present disclosure.

FIG. 3 is a flowchart illustrating an exemplary synchronization process 300 by which an authoring system 100 can synchronize a copy 155 of a document stored on a user computing device 110 with the master copy 150 of the document stored on the storage device 120. The synchronization process 300 initializes and begins at a start module 302 and proceeds to a first update operation 304.

The first update operation 304 synchronizes the metadata of the copy 155 with the metadata of the document 150 without requiring any interaction with the user. For example, the first update operation 304 can provide an exchange of metadata between the storage device 120 and the user computing device 110 at periodic time intervals. In one embodiment, the first update operation 304 provides for an exchange of metadata every few seconds. In other embodiments, however, the first update operation 304 can provide for the exchange of metadata to occur in shorter or longer time intervals.

A request module 306 determines whether a request to synchronize content has been received. For example, the request module 306 can determine whether a user of one of the user computing devices 110 has requested to share content changes with other users. In another embodiment, the request module 306 can determine whether a user of one of the user computing devices 110 has requested to view content changes made by other users.

If the request module 306 determines that no request to synchronize content has been made, then the synchronization process 300 cycles back to the first update operation 304 and begins again. If the request module 306, however, determines that a request to synchronize content has been received, then the synchronization process 300 proceeds to a second update operation 308, which provides an exchange of content between the storage device 120 and the user computing device 110. The synchronization process 300 completes and ends at a stop module 310.

As the term is used herein, content updates 152 refer to any addition, deletion, and/or revision made to the substantive content of a document. For example, content updates for a word processing document can include added paragraphs (i.e., or sections thereof), deleted paragraphs (i.e., or section thereof), and/or revised paragraphs (i.e., or sections thereof).

In another embodiment, content updates for a presentation document can include added, deleted, and/or revised pictures, text, animations, sounds, and other such data objects.

As the term is used herein, metadata updates 154 refer to any addition, deletion, and/or revision made to metadata of the document. Non-limiting examples of document metadata include content locks, presence information, and other such data. As will be discussed herein, content locks inhibit editing of content within the lock by users that do not own the lock. Presence information indicates which users have indicated an intention to edit the document as will be discussed in greater detail herein.

Referring to FIGS. 4-9, content locks inhibit editing conflicts by indicating which portions of a document have been claimed by another user. In some embodiments, the content locks can prevent (i.e., bar) a user from editing a portion of a document that has been claimed by another user. In other embodiments, however, the user can choose to break the content lock and edit the portion of the document. In such cases, the lock can warn the user that conflicts may arise when editing the locked section.

Figure 4:
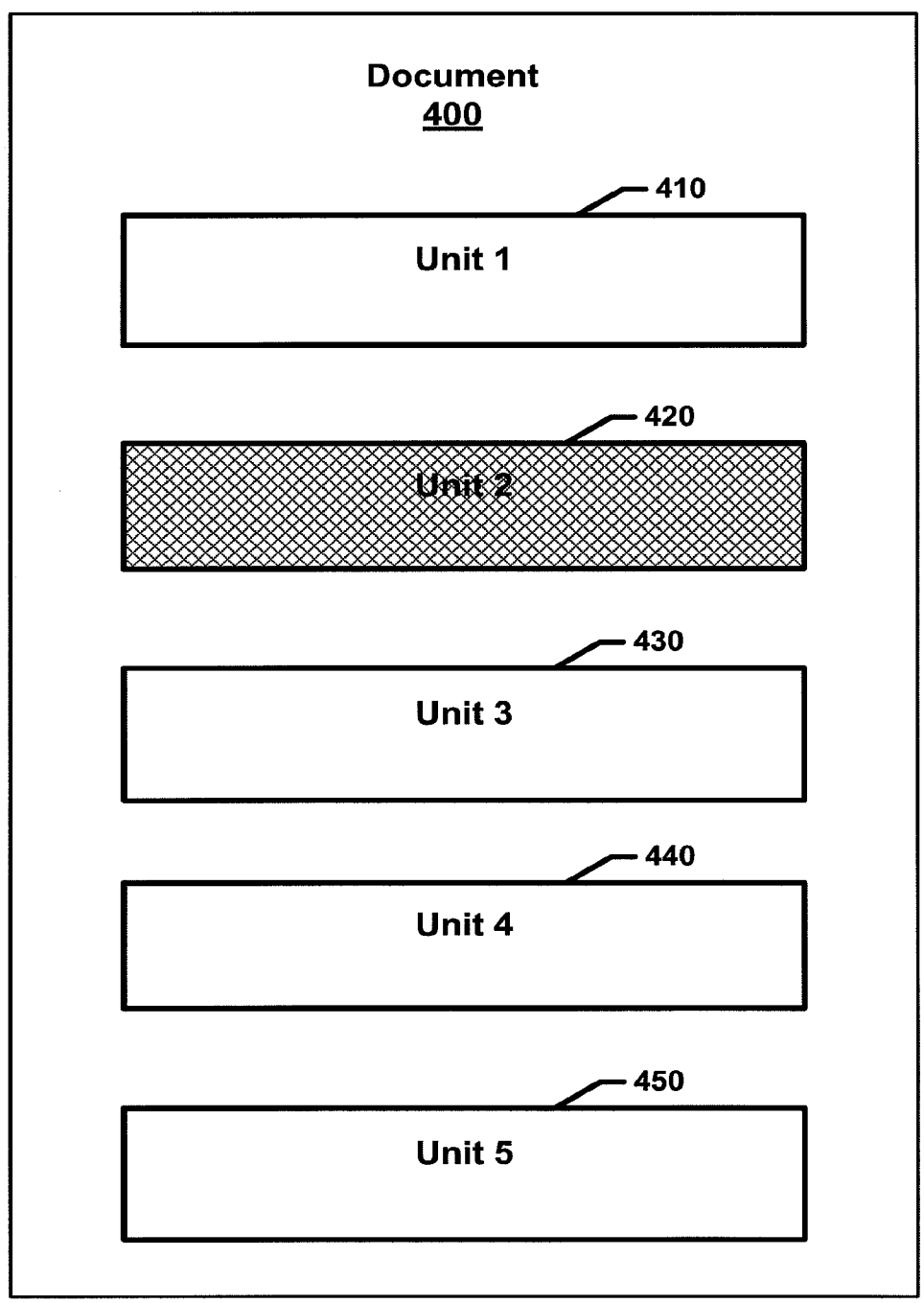
FIG. 4 is a schematic block diagram of a document having five units of data, the second of which is locked, in accordance with the principles of the present disclosure.

For example, FIG. 4 is a schematic block diagram of a document 400 having five units of data 410, 420, 430, 440, 450. In one embodiment, the document 400 is a word processing document and the units of data 410-450 are paragraphs of text. In another embodiment, the document 400 is a presentation document and the first unit of data 410 is a title or subject heading, the second unit of data 420 is a picture or other data object, and the remaining units of data 430, 440, 450 are blocks of text.

A first user can generate a lock about one or more of the units of data 410-450 of the document 400. In the example shown in FIG. 4, the second unit of data 420 has been locked by the first user, as indicated by the cross-hatching. By generating the content lock, the first user has indicated the first user intends to edit the unit of data 420. For example, the user can generate the lock when the user is actively editing the unit of data 420. In another embodiment, the user can generate the lock and then edit the unit of data 420 at a later time. As noted above, the authoring application managing the document 400 may prevent a user other than the first user from editing the locked data unit 420.

In general, a content lock generated by a first user is displayed to all other users who access the document during the life of the lock. In one embodiment, the first user also can view the content lock. Locks can be displayed using different types of indicia. For example, in one embodiment, the background of a locked unit of data may be colored, shaded, or patterned (e.g., see data unit 420 of FIG. 4). In another embodiment, the content (e.g., text, picture, shape, or other data object) of the locked unit may be colored, shaded, or patterned. In yet another embodiment, a box, bracket, or symbol can be displayed adjacent the locked unit of data to indicate the lock.

A content lock may be generated around one or more units of data within a document. In some embodiments, the content lock can be generated implicitly without express instruction from the user. For example, an authoring application may generate a content lock about a data unit when a user positions a cursor within, highlights, or otherwise selects the data unit. In another embodiment, an authoring application may generate a content lock about a data unit when the user begins editing the data unit. In another embodiment, an authoring application may generate a content lock about a data unit when a user saves edits made to the data unit. In some embodiments, the authoring application may generate content locks around multiple, interdependent data units within the document even if only one of the data units is claimed by a user. In other embodiments, a user may explicitly define a content lock about one or more data units.

Figure 5:
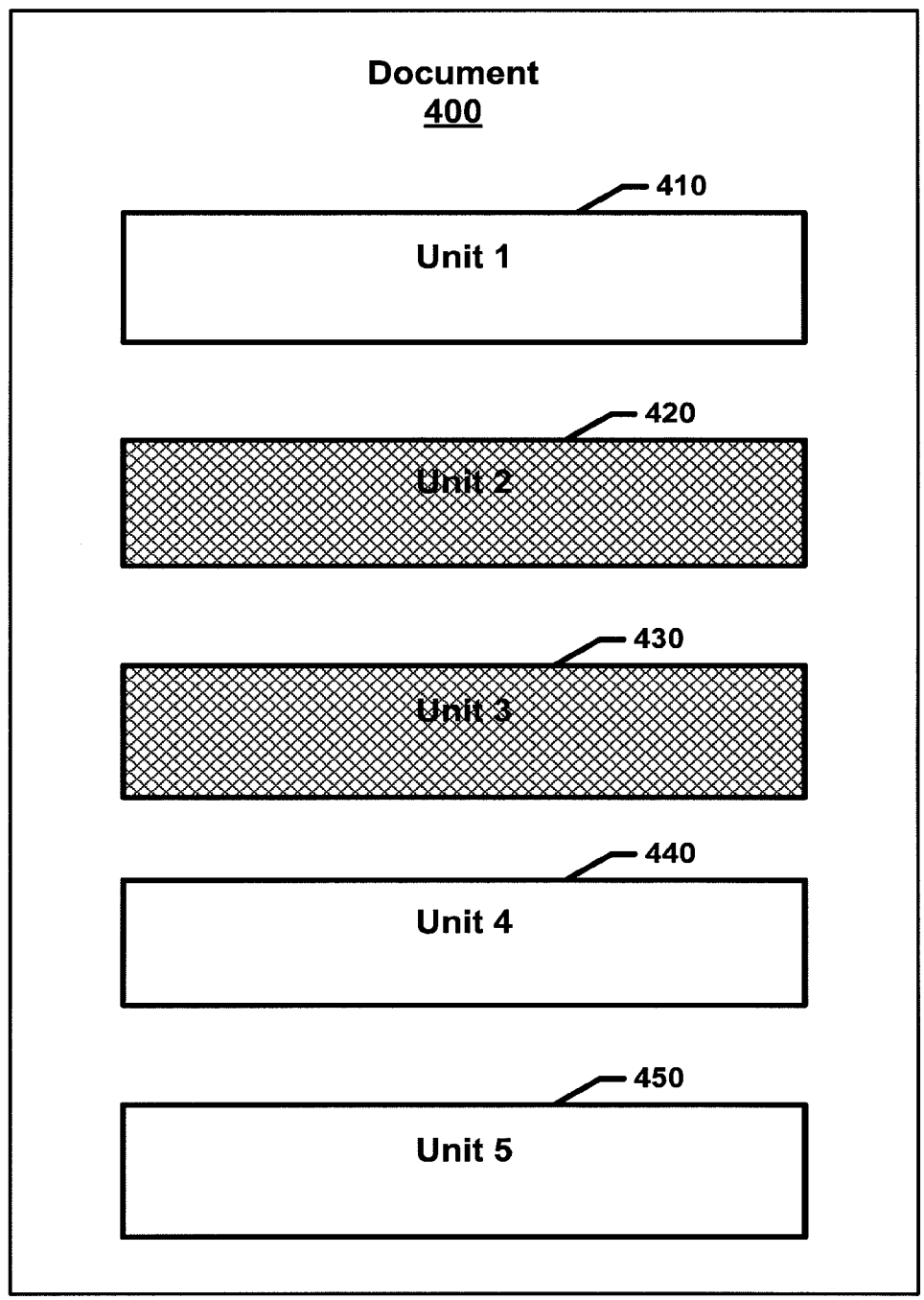
FIG. 5 is a schematic block diagram of the document of FIG. 4 in which a content lock has been added to the third data unit in accordance with the principles of the present disclosure.
Figure 6:
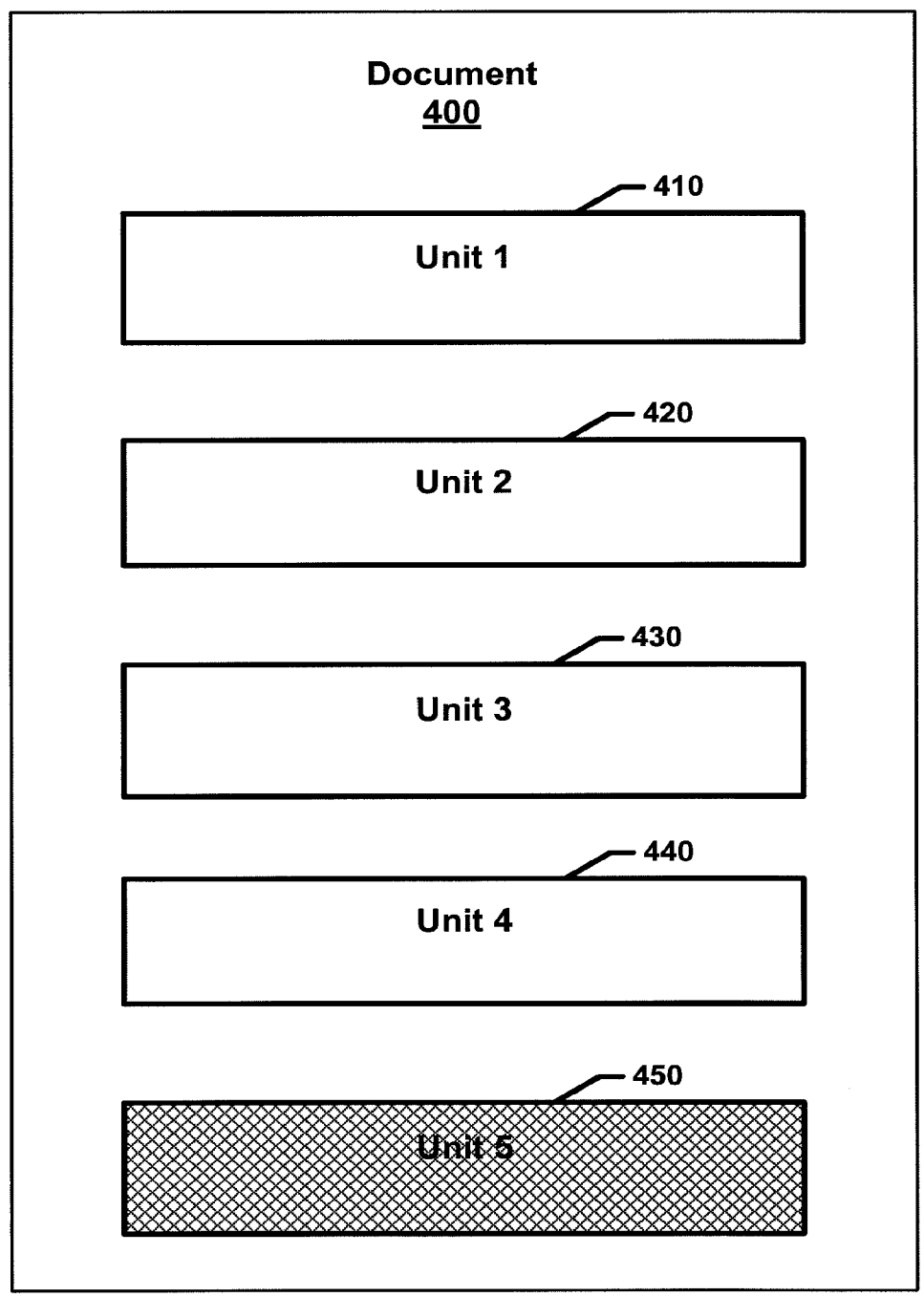
FIG. 6 is a schematic block diagram of the document of FIG. 4 in which the content locks on the second and third data units have been released and a new content lock has been added to the fifth data unit in accordance with the principles of the present disclosure.

In some embodiments, a content lock can grow to include additional units of data within the document and/or shrink to release one or more units of data within the document. In one embodiment, the content lock can grow to include only contiguous units of data. For example, as shown in FIG. 5, the content lock (e.g., see cross-hatching) around the second data unit 420 can expand to include the third data unit 430 if the user selects or edits the third data unit 430. A content lock or portion thereof generally can be released at the discretion of the user who generated the content lock. In some embodiments, the user who generated the content lock releases the content lock by selecting or editing another data unit.

In one embodiment, the user must indicate the user has finished editing the data unit before the authoring application will release the lock. For example, the authoring application may release the lock only after the user has provided instructions to store the document. In another embodiment, the authoring application may release a lock after the user selects or begins editing a remote data unit, such as the fifth data unit 450 of FIG. 6. In another embodiment, the authoring application only releases a lock after both movement to a non-contiguous data unit and a finalization act (e.g., instructions to store the document). In other embodiments, a content lock can be released explicitly by an administrator or another user.

Figure 7:
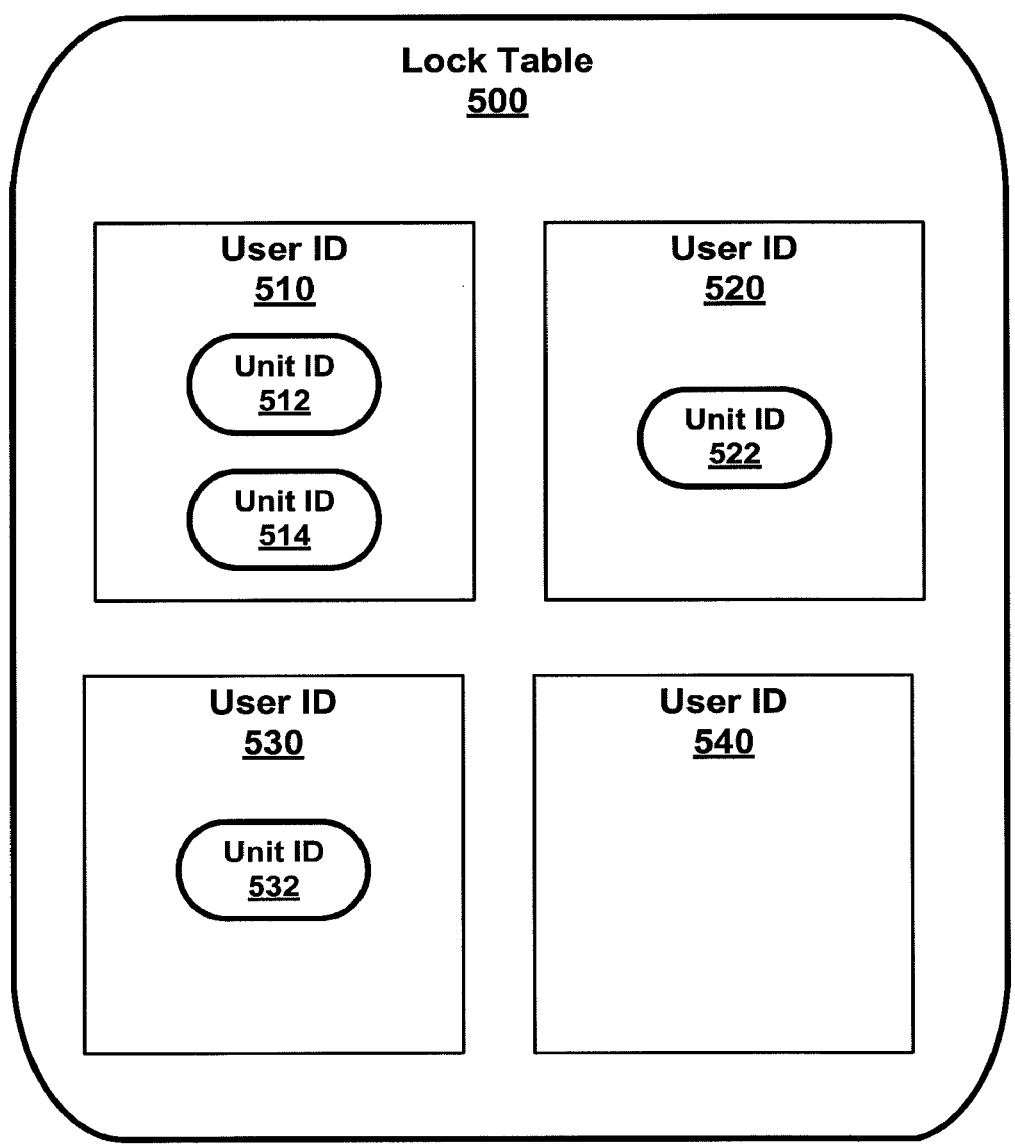
FIG. 7 is a schematic block diagram of a lock table in accordance with the principles of the present disclosure.

Referring to FIG. 7, lock metadata can be stored in a variety of different formats. For example, the lock metadata of FIG. 7 is stored in a table format 500. The lock table 500 of FIG. 7 includes a list of users, each of whom is identified with a user identifier (e.g., an identification number) that is uniquely assigned to the user. Data units to be locked are identified with unit identifiers (e.g., identification numbers) that are uniquely assigned to each data unit within a document. The lock table 500 associates the unit identifiers of the one or more data units to be locked with the user identifiers of the users who own the locks.

For example, in the lock table 500, data units 512 and 514 are associated with a first user 510. Other users, therefore, are inhibited from editing data units 512 and 514. Data unit 522 is associated with user 520. Other users, including the first user 510, therefore, are inhibited from editing data unit 522. The fourth user 540 has not locked any portion of the document and so is not associated with any unit identifiers. In other embodiments, however, lock metadata can be stored in a different format or within the document. For example, the lock table 500 can be arranged by unit identifier instead of by user identifier.

Presence metadata also can be stored in a variety of formats. For example, presence metadata can be stored in the lock table 500 of FIG. 7. In another embodiment, however, presence metadata can be stored in a separate table or in a different format. Presence metadata includes the user identifier of each user that is currently accessing the document or that has staked a claim (e.g., generated a content lock) on a data unit of the document. For example, a metadata table, such as the lock table 500, can store the user identifier of each user having a claim to at least one data unit of the document. Like lock metadata, presence metadata can be synchronized automatically.

Figure 8:
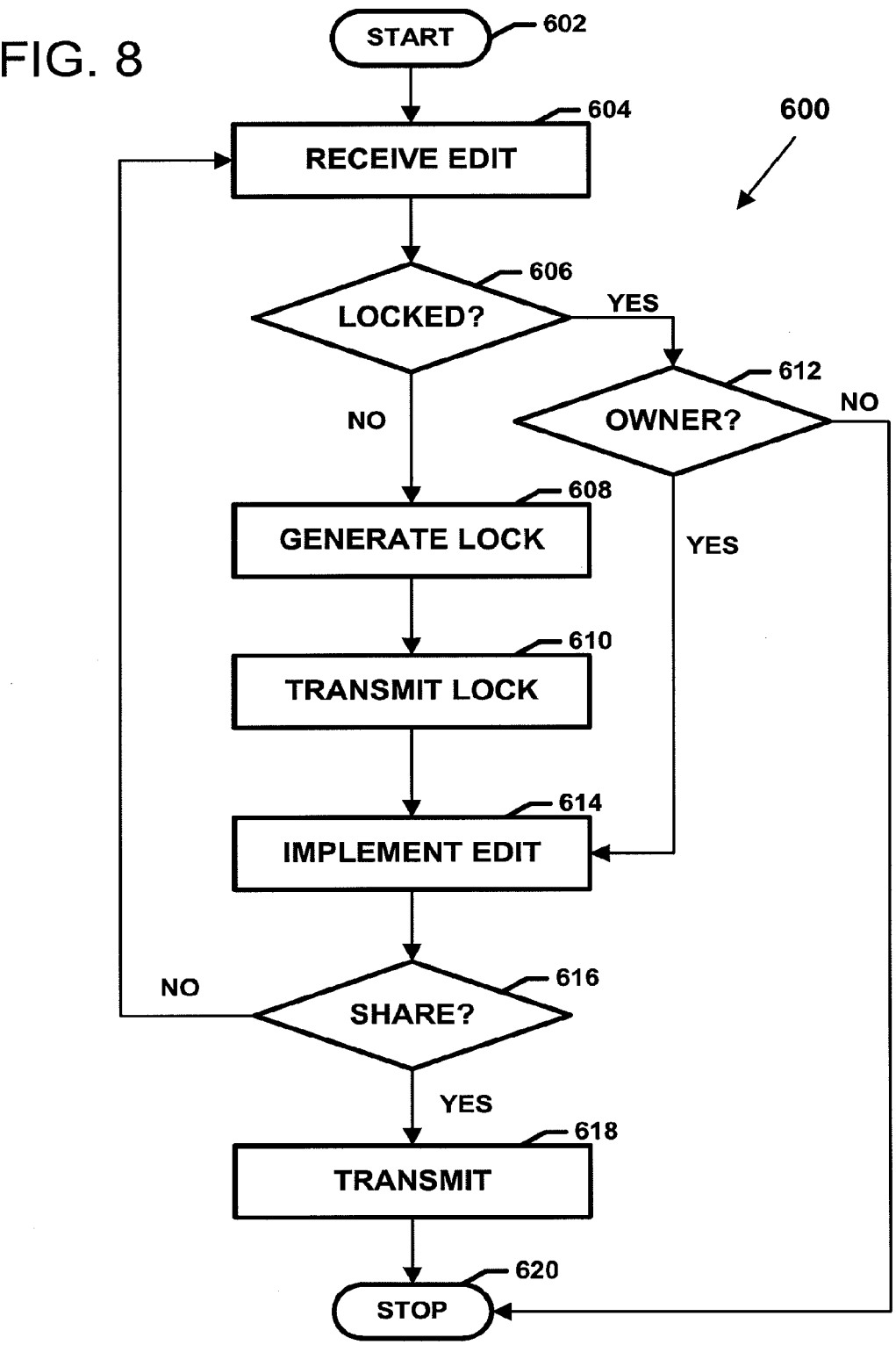
FIG. 8 is a flowchart illustrating an example synchronization processes implemented by an authoring application to share updates made by a user of the authoring application with other users in accordance with the principles of the present disclosure.
Figure 9:
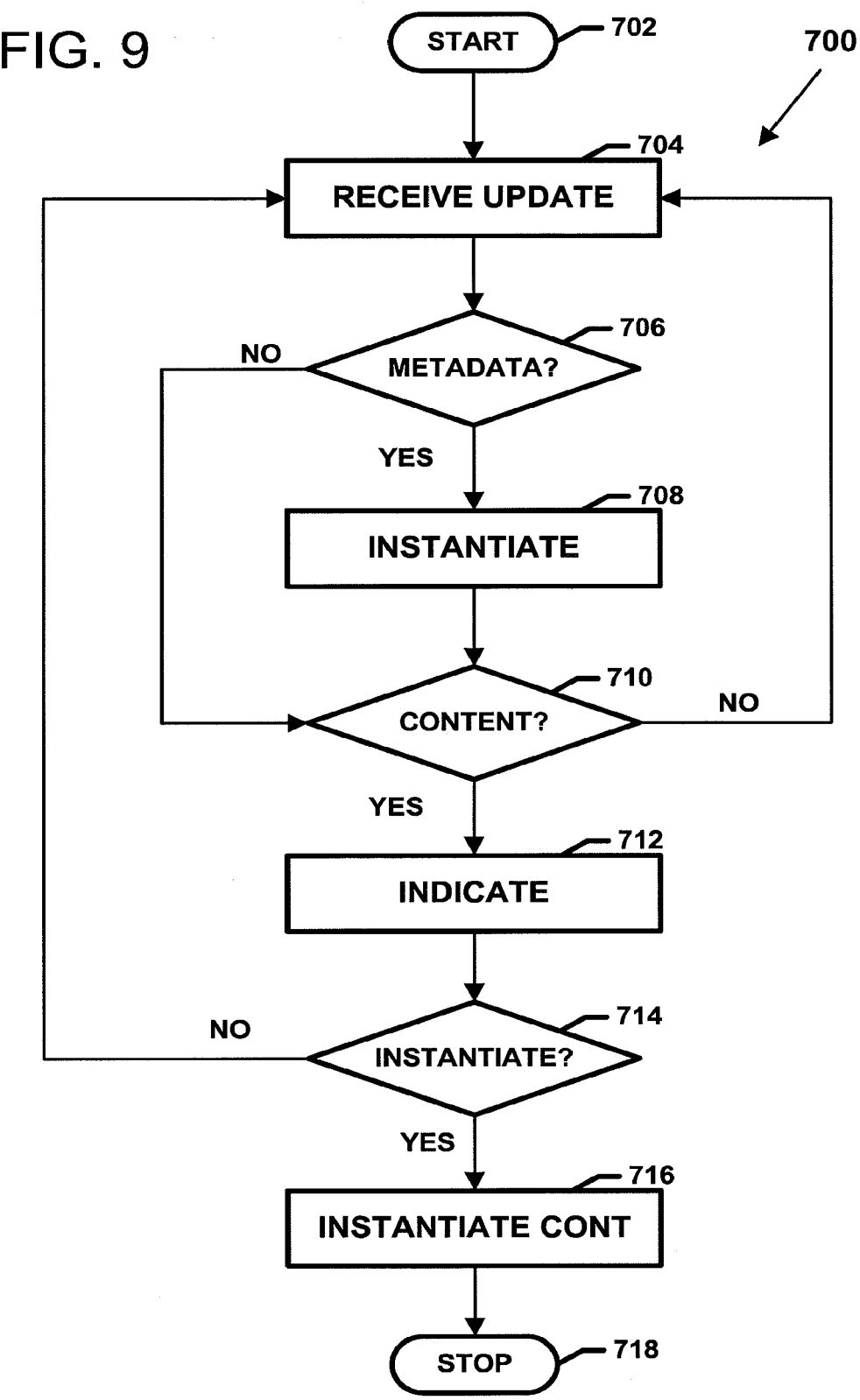
FIG. 9 is a flowchart illustrating another example synchronization process implemented by an authoring application to instantiate updates made by other users into the document being edited with the authoring application in accordance with the principles of the present disclosure.

FIGS. 8 and 9 are flowcharts illustrating example synchronization processes 600, 700 by which content and locks can be synchronized among multiple computing devices.

The first synchronization process 600 is implemented by an authoring application to share with other users updates made by a first user with the authoring application. The second synchronization process 700 is implemented by an authoring application to instantiate updates made by other users into the document being edited with the authoring application.

The first synchronization process 600 of FIG. 8 initializes and begins at a start module 602 and proceeds to a receive operation 604. The receive operation 604 receives an instruction from the first user to perform an editing operation on one or more data units within a document. Non-limiting examples of editing operations include adding, editing, and/or deleting data units (e.g., text, drawings, pictures, shapes, headings, etc.) or portions thereof, adding and/or deleting formatting of the data units, rearranging a sequence of the data units, and other such operations.

A first determination module 606 checks if the data unit on which the editing operation is to be performed is locked. For example, the first determination module 606 can access a lock table, such as the lock table 500 of FIG. 7, to determine whether a unit identifier assigned to the data unit is associated with any user. In another embodiment, the first determination module 606 can otherwise determine whether the data unit is locked.

If the first determination module 606 determines the data unit is not locked, then a generate operation 608 creates a content lock on the data unit. For example, in one embodiment, the generate operation 608 can add an entry to the lock table 500 of FIG. 7 associating the unit identifier of the data unit with the user identifier of the first user. A transmit operation 610 sends lock metadata indicating the existence of the newly generated lock to the device storing the master copy of the document. For example, the transmit operation 610 can send the lock metadata from a user computing device, such as computing device 110A of FIG. 1, to a storage device, such as storage device 120. In one embodiment, the lock metadata includes instructions that describe incremental edits (e.g., delta states) to the lock metadata. An implement operation 614 performs the editing operation on the data unit.

Alternatively, if the first determination module 606 determines the data unit is locked, then a second determination module 612 obtains ownership information for the lock. In one embodiment, if the second determination module 612 determines the lock is owned by another user, then the synchronization process 600 completes and ends at a stop module 620 without performing the editing operation. In another embodiment (not shown), the synchronization process 600 may enable the first user to choose to break the lock and then proceed to generate operation 608. However, if the second determination module 612 determines the lock is owned by the first user, then the synchronization process 600 proceeds to the implement operation 614 discussed above. In another embodiment (not shown), the synchronization process 600 can determine whether the lock on any data units should be released.

A third determination operation 616 determines whether the first user has provided an instruction (either explicitly or implicitly) to share content changes to the data unit resulting from implementing the editing operation. For example, the third determination operation 616 may determine whether the first user has provided an instruction to store the document. In another embodiment, the third determination operation 616 may determine whether the first user has selected a "share changes" button or other such indicia. In another embodiment, the third determination operation 616 may determine an auto-save feature has been implemented by the application. If the third determination operation 616 determines instructions to share have not been provided, then the synchronization process 600 cycles back to the receive operation 604 and begins again.

If the determination operation 616 determines instructions to share have been provided, however, then the synchronization process 600 proceeds to a transmit operation 618, which sends content updates to the device storing the master copy of the document. Content updates indicate changes made to the content of the document by the editing operation. For example, the transmit operation 618 can send the content updates from a user computing device 110A of FIG. 1 to a storage device 120. In one embodiment, content updates include a newly generated version of the document. In another embodiment, content updates indicate incremental edits (e.g., delta states) to the content between the current user copy of the document and the master copy of the document. The synchronization process 600 completes and ends at the stop module 620 as discussed above.

The second synchronization process 700 of FIG. 9 initializes and begins at a start module 702 and proceeds to a receive operation 704. The receive operation 704 receives an update based on changes made to the document by other users. The update can include changes to the content and/or metadata of the document. In one embodiment, the receive operation 704 can poll the device storing the master copy of the document and request updates. In another embodiment, the device storing the master copy can push changes to the authoring application.

A first determination module 706 determines whether the update includes any changes to the metadata of the document. For example, the first determination module 706 can determine whether any other user has established a new lock or released a lock on a data unit. In another embodiment, the first determination module 706 can determine whether another user has accessed the document.

If the first determination module 706 determines a metadata update has been received, then an implement operation 708 automatically instantiates the received metadata updates. For example, the implement operation 708 can cause the authoring application to update a lock table, such as lock table 500 of FIG. 7, based on the metadata update. However, if the first determination module 706 determines no metadata update has been received, then the second synchronization process 700 proceeds to a second determination module 710.

The second determination module 710 determines whether the update includes any changes to the content of the document. For example, the second determination module 710 can determine whether any data units have been added, deleted, revised, or moved. If the second determination module 710 determines a content update has not been received, then the second synchronization process 700 cycles back to the receive operation 704 to begin again. However, if the second determination module 710 determines a content update has been received, then the second synchronization process 700 proceeds to an indicate operation 712.

The indicate operation 712 alerts the first user that a content update is available for viewing. For example, the indicate operation 712 can display a graphic, text box, numerical indicia, or other message indicating the availability of the content update. In one embodiment, the indicate operation 712 provides information to the user indicating how many updates are available. Other information about the updates (e.g., user who made the updates, timestamp, etc.) also may be indicated.

A third determination module 714 determines whether the authoring application has received instructions from the first user (either explicitly or implicitly) to view and/or instantiate the content updates. For example, the third determination module 714 can determine whether the user has selected a view option (e.g., via a button, menu, or other interface tool) of the authoring application. In another embodiment, the third determination module 714 may determine the user has selected an auto-instantiate option. If the third determination module 714 determines the authoring application has not received such instructions from the first user, then the second synchronization process 700 cycles back to the receive operation 704 and begins again.

If the third determination module 714 determines the authoring application has received instructions from the first user, then an instantiate operation 716 displays the content updates to the first user. For example, in one embodiment, the instantiate operation 716 can merge the available content updates into the first user's copy of the document. In another embodiment, the instantiate operation 716 can annotate the first user's copy of the document to indicate which content has changed. Additional annotations can indicate which users made which changes. In one embodiment, the instantiate operation 716 performs conflict resolution between the user copy and the updates. The second synchronization process 700 completes and ends at a stop module 718.

Figure 10:
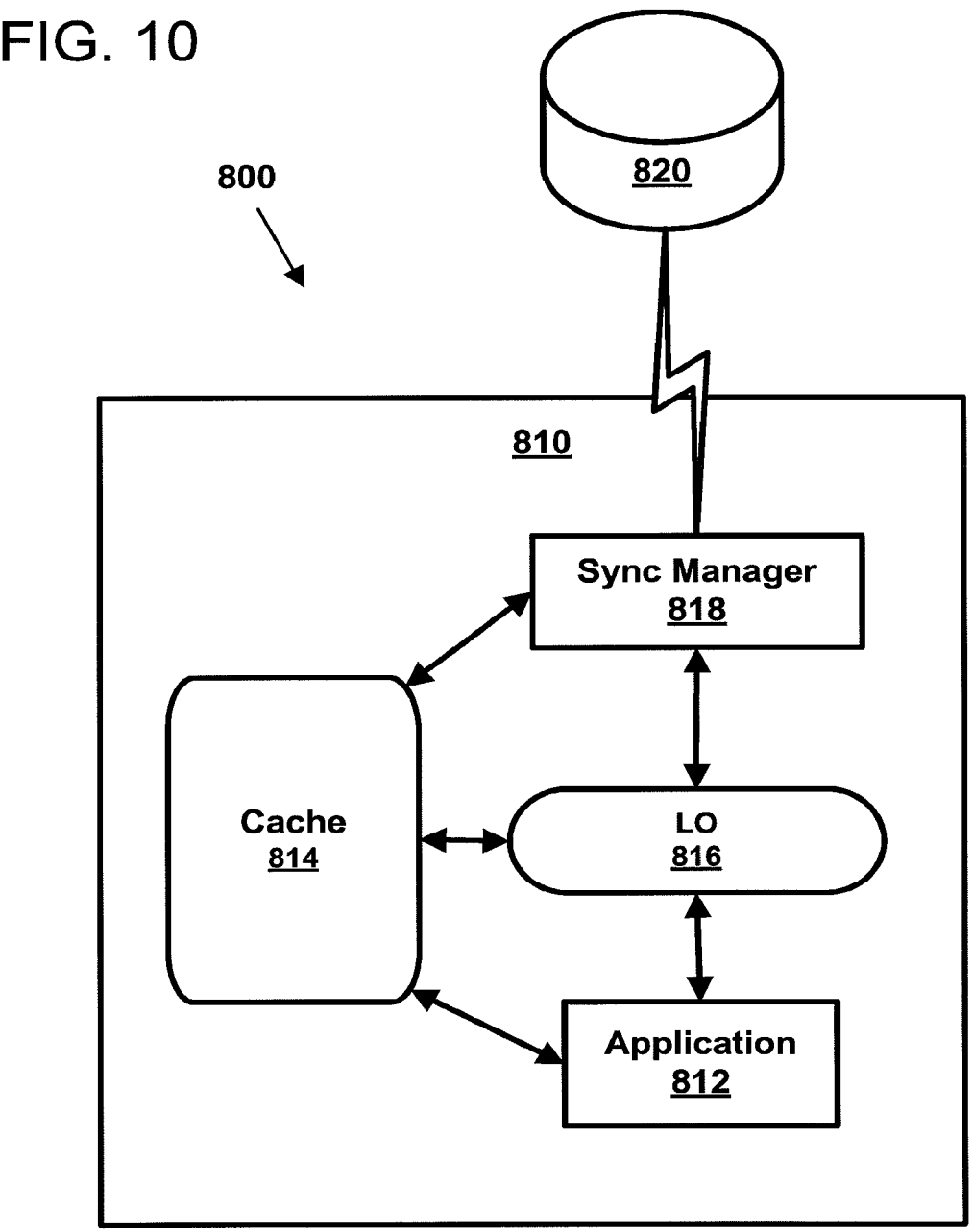
FIG. 10 is a schematic block diagram of an authoring environment including a first computing device on which a master copy of a document to be authored is to be stored in accordance with the principles of the present disclosure.
Figure 11:
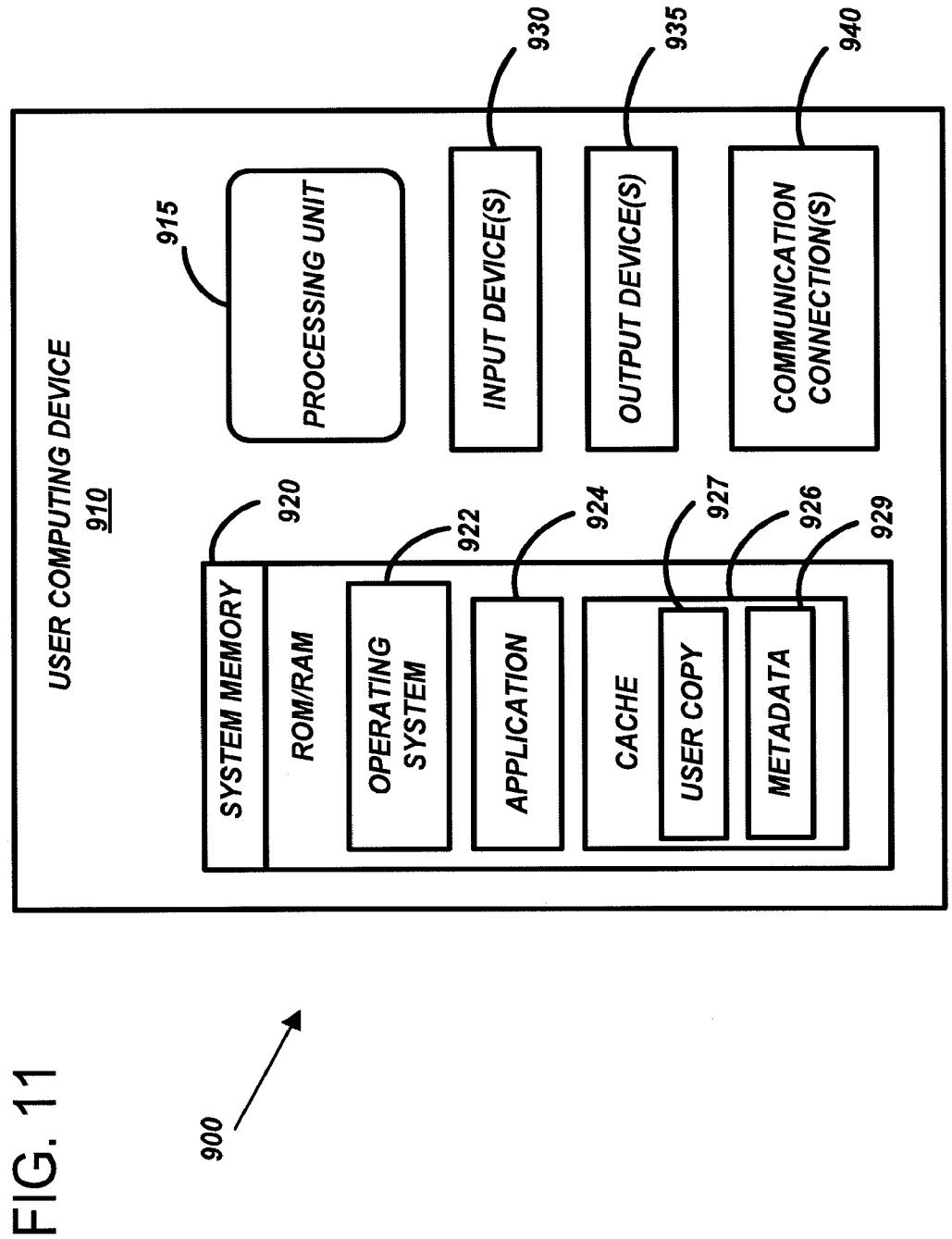
FIG. 11 is a schematic block diagram of a user computing system configured to implement an authoring environment in accordance with the principles of the present disclosure.
Figure 12:
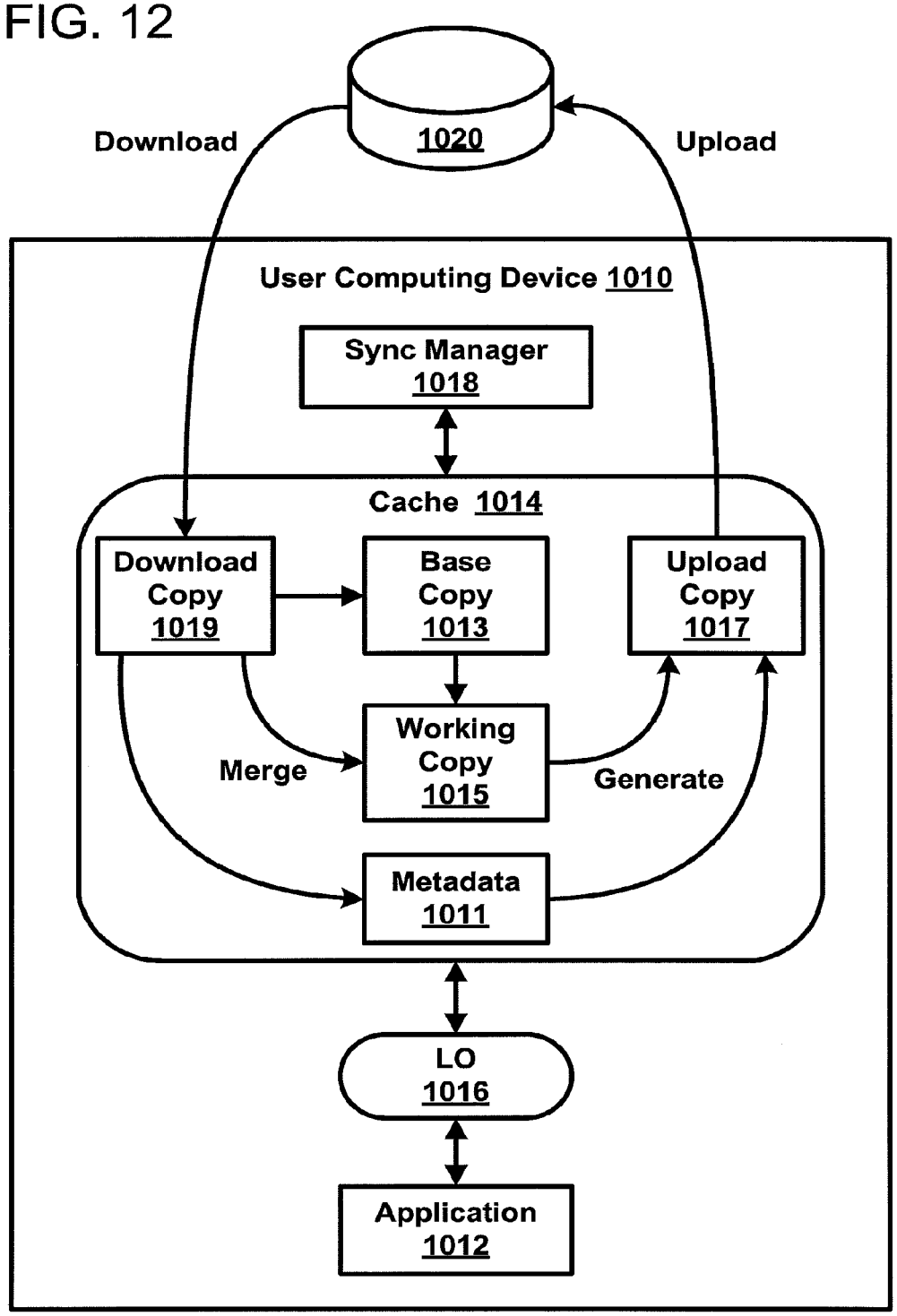
FIG. 12 is a schematic block diagram of an authoring system illustrating a synchronization cycle implemented by the authoring application on the user computing device in accordance with the principles of the present disclosure.

FIGS. 10-12 provide greater detail in how synchronization between the user copy and the master copy of the document is implemented by a user computing device. FIG. 10 is a schematic block diagram of an authoring system 800 including a storage device 820 on which a master copy of a document to be authored is to be stored. The authoring system 800 also includes at least one user computing device 810 communicatively coupled to the storage device 820.

The user computing device 810 includes an authoring application 812 configured to provide an authoring environment in which a user can create and/or manipulate a document to be authored. The user computing device 810 also includes a cache 814, a layer object ("LO") 816, and a synchronization manager ("sync manager") 818. The cache 814 stores a user copy of the document to be authored. The cache 814 also stores the metadata, including lock and presence metadata, associated with the document. Updates to the content and metadata of the document also can be stored in the cache 814.

The layer object 816 provides an interface between the authoring application 812 and the cache 814. The layer object 816 also provides an interface between the authoring application 812 and the sync manager 818. The sync manager 818 communicates with the storage device 820 and provides an interface between the storage device 820 and the cache 814. For example, the sync manager 818 can send updates to and obtain updates from the storage device 820 and the cache 814.

In general, an authoring environment having features that are examples of inventive aspects in accordance with the principles of the disclosure can be implemented on a user computing device (e.g., a personal computer, a server computer, a notebook computer, a PDA, a Smartphone, or any other such computing device). A non-limiting embodiment of a user computing system 900 configured to implement an authoring environment is described herein with reference to FIG. 11.

In FIG. 11, the exemplary computing system 900 for implementing the principles of the disclosure includes a user computing device, such as user computing device 910. In a basic configuration, the user computing device 910 typically includes at least one processing unit 915 for executing applications and programs stored in system memory 920. Depending on the exact configuration and type of computing device 910, the system memory 920 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 920 typically stores an operating system 922, such as the WINDOWS® operating systems from MICROSOFT CORPORATION of Redmond, Wash., suitable for controlling the operation of the computing device 910. System memory 920 also may include a document cache 926 in which a user copy 927 of a document can be stored. Metadata 929 of the document also can be stored within the user cache 926.

The system memory 920 also may store one or more software applications, such as authoring applications 924 for creating and editing documents. One non-limiting example of an authoring application 924 suitable for authoring documents in accordance with the principles of the present disclosure is MICROSOFT® OFFICE WORD authoring software from MICROSOFT CORPORATION of Redmond, Wash. Other non-limiting examples of authoring applications include POWERPOINT® presentation software and VISIO® drawing and diagramming software, both also from MICROSOFT CORPORATION of Redmond, Wash.

Computing device 910 also may have input device(s) 930, such as a keyboard, mouse, pen, voice input device, touch input device, etc., for entering and manipulating data. Output device(s) 935, such as a display screen, speakers, printer, etc., also may be included. These output devices 935 are well known in the art and need not be discussed at length herein.

The computing device 910 also may contain communication connections 940 that allow the device 910 to communicate with other computing devices, for example, the storage device 820 of FIG. 10, over a network in a distributed computing environment (e.g., an intranet or the Internet). By way of example, and not limitation, communication device media 940 includes wired media such as a wired network or direct-wired connection, and wireless media, such as acoustic, RF, infrared and other wireless media.

FIG. 12 is a schematic block diagram of an authoring system 1000 illustrating the synchronization cycle implemented by the authoring application on the user computing device. The authoring system 1000 includes a storage device 1020 on which the document to be authored is to be stored and a user computing device 1010. The user computing device 1010 includes an authoring application 1012, a cache 1014, a layer object 1016, and a sync manager 1018. The cache 1014 of the user computing device 1010 is configured to store a base copy 1013 of the document to be authored, a working copy 1015, an upload copy 1017, and a download copy 1019. The cache 1014 also is configured to store metadata 1011 of the document.

Figure 13:
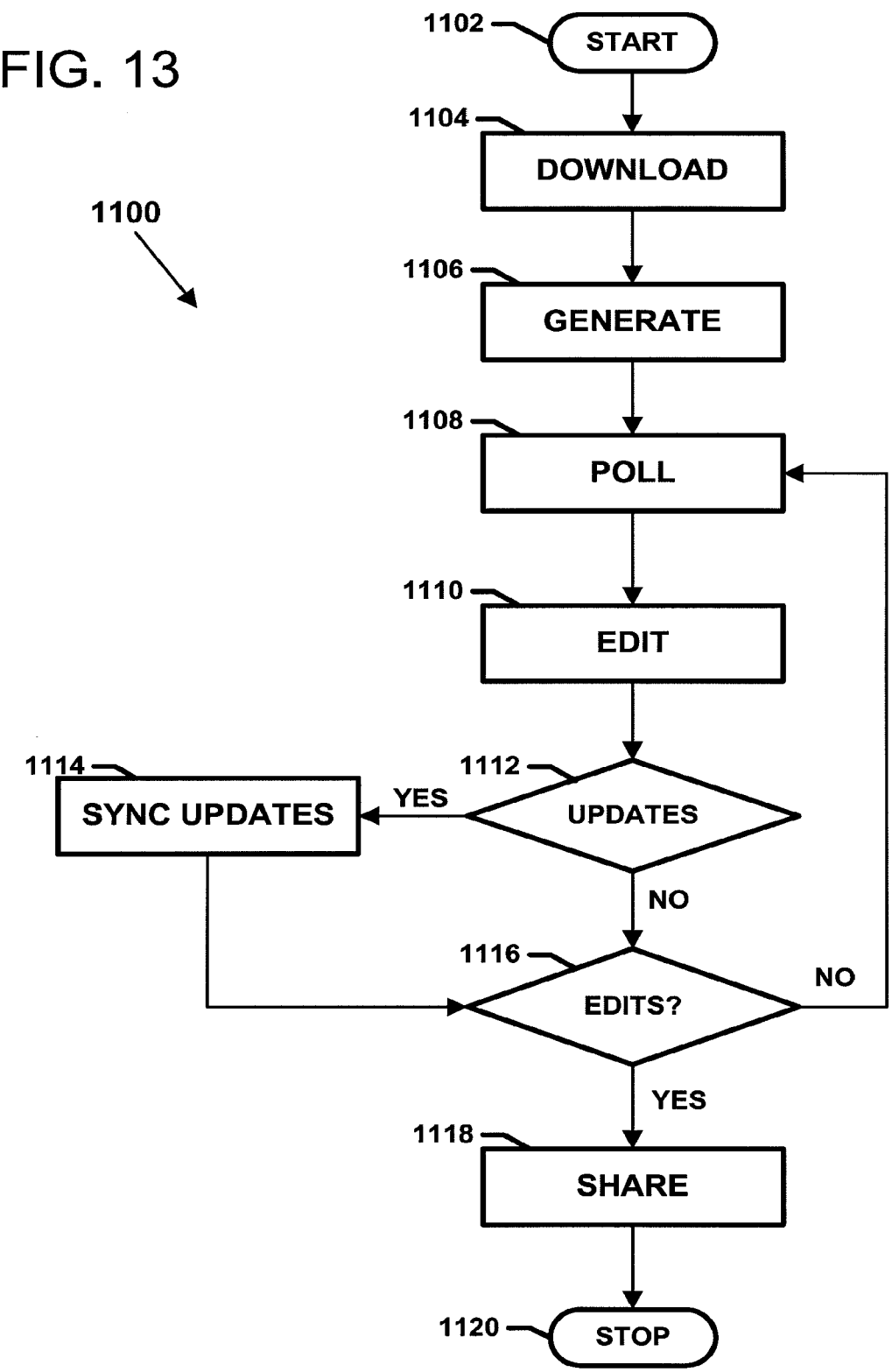
FIG. 13 is a flowchart illustrating an operational flow for another exemplary synchronization process by which a user computing system can send and receive updates while editing a document in accordance with the principles of the present disclosure.

FIG. 13 is a flowchart illustrating an operational flow for an exemplary synchronization process 1100 by which a user computing system, such as user computing device 1010, can send and receive updates while authoring a document. The synchronization process 1100 initializes and begins at a start module 1102 and proceeds to an obtain operation 1104. The obtain operation 1104 causes the sync manager 1018 of the user computing device 1010 to obtain from the storage device 1020 a download copy 1017 of the document to be authored. The download copy 1017 of the document reflects the state of the master copy of the document at the time the document is obtained from the storage device 1020. For example, the obtain operation 1104 can cause the sync manager 1018 to pull from the storage device 1020 a copy of the most recent version of the master copy of the document.

A generate operation 1106 creates a base copy 1013 and a working copy 1015 of the document based on the download copy 1017. The working copy 1015 of the document can be manipulated by the authoring application 1012 to allow the user to edit the document. Accordingly, the working copy 1015 reflects the current state of the document as edited by the user of the authoring application 1012. The base copy 1013 reflects the state of the document at the time just before the user begins editing the document. In one embodiment, the layer object 1016 generates the base copy 1013 of the document and the working copy 1015 and provides the working copy 1015 to the authoring application 1012.

To obtain content updates generated by other users, a poll operation 1108 causes the sync manager 1018 to contact the storage device 1020 periodically to obtain an updated download copy 1017 of the document being authored. The download copy 1017 reflects the state of the master copy of the document at the time of download. The master copy is stored on storage device 1020 and may include changes made by other users since the base copy 1013 was generated. The sync manager 1018 stores any updated download copy 1017 of the document in the cache 1014.

An edit operation 1110 receives any instructions provided by the user to the authoring application 1012 to perform an editing operation on the document. The application 1012 makes the edits to the working copy of the document 1015. The authoring application 1012 also makes metadata changes as appropriate when implementing the editing operations.

At a first determination module 1112, the layer object 1016 checks the cache 1014 to determine whether any updates have been received during the poll operation 1108 (i.e., whether an updated download copy 1017 is available in the cache 1014). In one embodiment, the first determination module 1112 is performed at periodic intervals regardless of whether the user has edited the working copy of the document. In different embodiments, the first determination module 1112 can be performed, e.g., every few seconds, milliseconds, or minutes.

If the layer object 1016 determines a new download copy 1017 is not available, then the synchronization process 1100 proceeds to a second determination module 1116, which will be discussed in greater detail below. If the layer object 1016 determines a new download copy 1017 is available, however, then the synchronization process 1100 proceeds to a sync operation 1114. In one embodiment, the sync operation 1114 automatically instantiates any metadata updates found in the download copy 1017 without requiring any interaction with the user of the authoring application 1012. For example, the layer object 1016 may automatically instantiates any lock metadata reflected in the download copy 1017 into the working copy 1015 of the document.

In some embodiments, the sync operation 1114 does not automatically instantiate any content updates from the download copy 1017 into the working copy 1015. Rather, the sync operation 1114 only instantiates content updates when the user of the authoring application 1012 provides instructions to integrate the content updates. In other embodiments, however, the sync operation 1114 automatically instantiates the content updates. In one embodiment, the sync operation 1114 causes the layer object 1016 to merge the updated download copy 1017 with the working copy 1015 when instructions to integrate are provided. In one embodiment, the sync operation 1114 is the same as the second synchronization process 700 shown in FIG. 9. In other embodiments, however, other synchronization processes can be used to integrate the updates with the working copy 1015 of the document. The synchronization process 1100 proceeds from the sync operation 1114 to the second determination module 1116.

The second determination module 1116 determines whether the user made any changes to the working copy 1015 of the document or to the metadata 1011 of the document during the edit operation 1110. If the second determination module 1116 determines that no edits (i.e., neither content nor metadata) have been made, then the synchronization process 1100 cycles back to the poll operation 1108 and begins again. If the second determination module 1116 determines the user has made content edits (e.g., revising a data unit of the document) and/or metadata edits (e.g., locking a data unit of the document), however, then a share operation 1118 synchronizes the edits with the storage device 1020.

The share operation 1118 causes the sync manager 1018 of the user computing device 1010 to send automatically to the storage device 1020 any changes to the metadata of the document without requiring any interaction from the user of the authoring application 1012. In one embodiment, the share operation 1118 does not cause the sync manager 1018 to send content updates to the storage device 1020 automatically. Rather, the sync manager 1018 only sends content updates to the storage device 1020 when instructed to do so by the layer object 1016. Automatically pushing only metadata may enhance the user experience by increasing update efficiency, reduce network bandwidth usage, and provide conflict inhibition without requiring auto-syncing of content. In other embodiments, however, the share operation 1118 automatically pushes content as well as metadata. In one embodiment, the share operation 1118 is the same as the first synchronization process 600 of FIG. 8. In other embodiments, however, other synchronization processes can be utilized.

For example, when the user wishes to share content revisions made by the user, the user will instruct the authoring application 1012 to submit the revisions to the storage device 1020 for integration with the master copy of the document. In one embodiment, the authoring application 1012 will instruct the layer object 1016 to generate an upload copy 1019 of the document. Generally, the layer object 1016 generates the upload copy 1019 based on the working copy 1015. The sync manager 1018 attempts to push the upload copy 1019 to the storage device 1020. The synchronization process 1100 completes and ends at a stop module 1120.

In some embodiments, the share operation 1118 cannot send content updates to the storage device 1020 until all previous content updates received from the storage device 1020 have been instantiated into the working copy 1015 of the document. In such embodiments, the upload copy 1019 can be generated by merging the working copy 1015 of the document with the most recently obtained download copy 1017. In one embodiment, the sync manager 1018 polls the storage device 1020 for an updated download copy 1017 when the layer object 1016 attempts to generate an upload copy 1019.

If the sync manger 1018 fails to push the upload copy 1019 to the storage device 1020 (e.g., if the upload copy 1019 does not reflect the most recent changes instantiated into the master copy), then the sync manager 1018 retry with a revised update document 1019. For example, the sync manager 1018 may obtain a new download copy 1017 from the storage device 1020 and the layer object 1016 may generate a new upload copy from the working copy and the new download copy 1017. In one embodiment, the sync manager 1018 will continue to revise and push an upload copy 1019 to the storage device 1020 until successful.

Referring to FIGS. 14-31, the principles of the present disclosure can be better understood by walking through some example applications. FIGS. 14-26 represent changes made to a cache of a storage device, a cache 1214 a first user computing device, and a cache 1234 of a second user computing device during a collaborative authoring session in which a first user and a second user edit a document concurrently. In other embodiments, however, the first and second users can edit the document at different times using the same processes.

Figure 14:
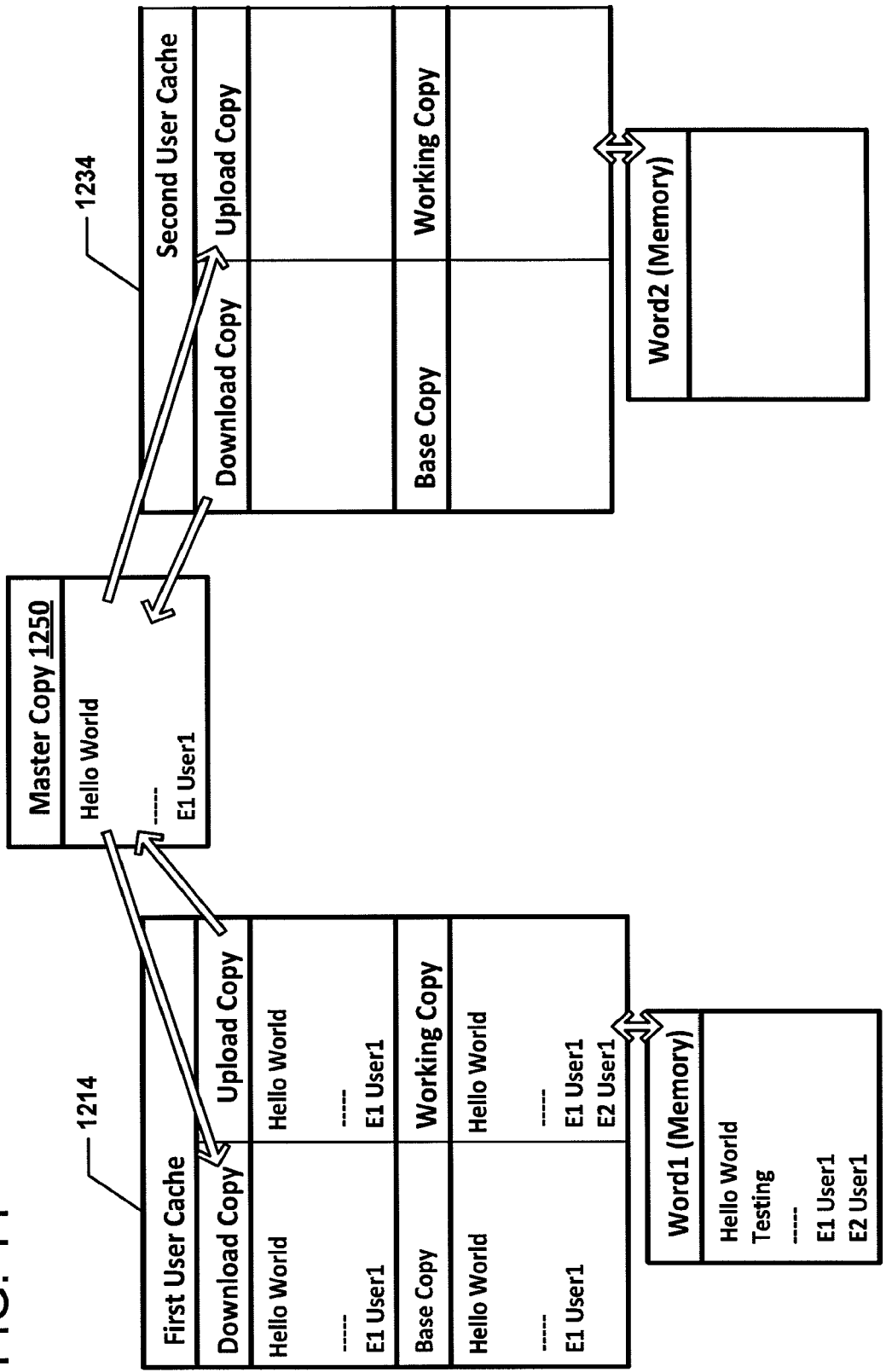
FIGS. 14-26 are schematic block diagrams of the caches stored on a first computing device, a first user computing device, and a second user computing device at different points in time during a collaborative authoring session in which a first user and a second user of the first and second user computing devices edit a document concurrently in accordance with the principles of the present disclosure.

In FIG. 14, the first user has created a document and saved an initial draft of the document to a storage device as a master copy 1250. Alternatively, the first user may have accessed the master copy 1250 of an existing document. The second user has not yet accessed the document.

The master copy 1250 of the document has a corresponding master lock table. For the sake of convenience, in the example shown in FIGS. 14-26, the master lock table is displayed as part of the master copy 1250. In other embodiments, however, the master lock table can be stored separately from the master copy 1250 of the document. Similarly, for ease in understanding, locks associated with each copy of the document (e.g., base copy, working copy, download copy, and upload copy) stored on a user cache 1214, 1234 are shown in FIGS. 14-26 as part of the copy. In other embodiments, however, metadata may be separately stored for each document copy or for each user.

The master copy 1250 of the document includes a first data unit containing the text "Hello World" and a lock E1 on the first data unit. The lock E1 is owned by (i.e., assigned to) the first user. The content and metadata of the master copy 1250 are reflected in the base copy and download copy stored in the cache 1214 of the first user. Because the first user sent the initial draft of the document to the storage device, the upload copy stored in the cache 1214 also reflects the content and metadata of the master copy 1250.

Since sending the initial draft to the storage device, the first user has edited the working copy of the document to include a second data unit containing the text "Testing." A second lock E2 has been added about the second data unit. In one embodiment, the second lock E2 is a new lock assigned to the user. In another embodiment, the second lock E2 is an extension of the first lock E1. For example, a new unit identifier can be assigned to the first user in a metadata table stored in the cache 1214 of the first user. In one embodiment, the first user creates the second lock E2 by moving a cursor to start a new data unit (e.g., paragraph) and typing "Testing." The first lock E1 is not yet released because the first user has not yet indicated editing on the first data unit is final (e.g., by saving after moving the cursor).

Figure 15:
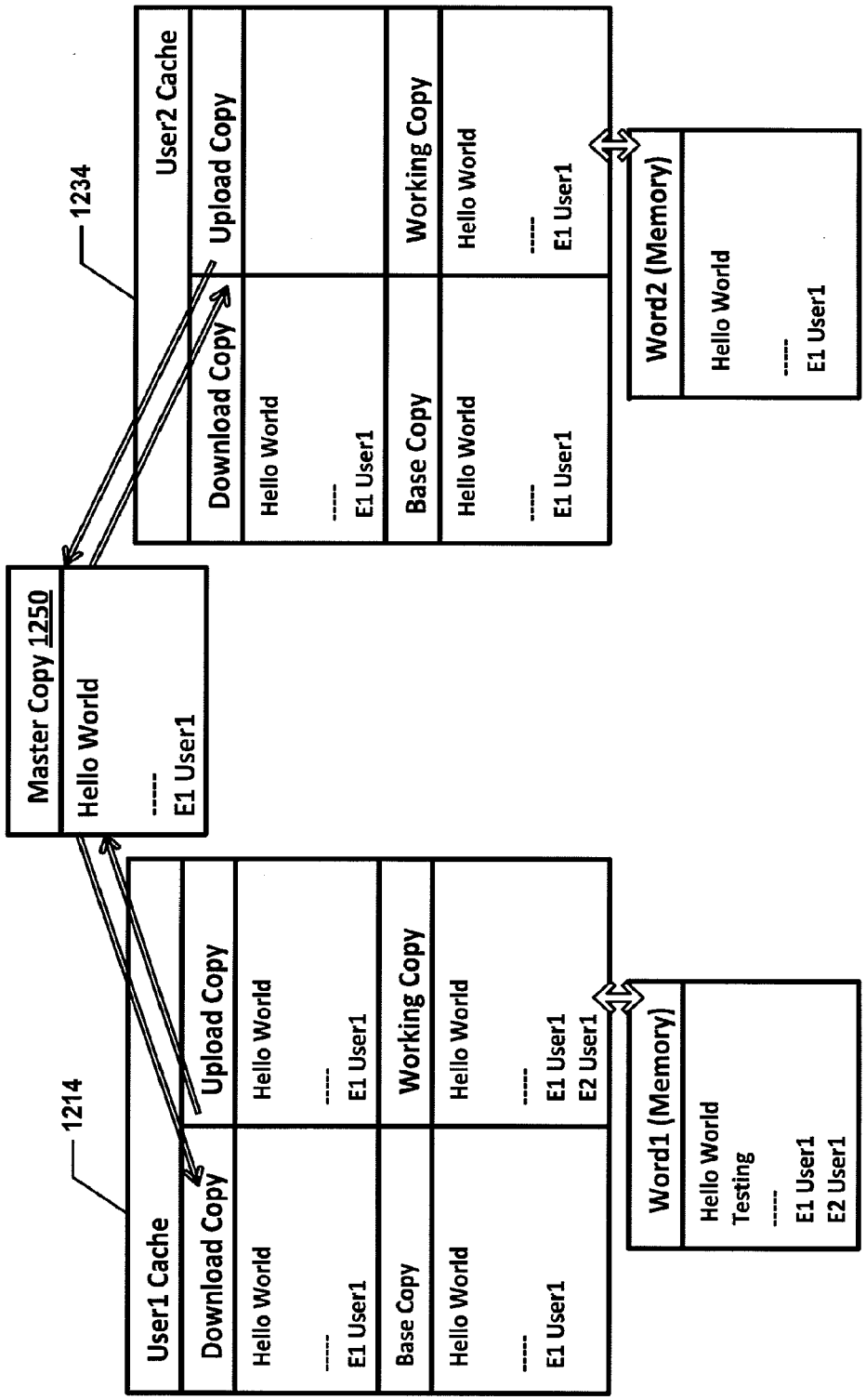

In FIG. 15, the second user accesses the master copy 1250 of the document stored on the storage device. The second user obtains a download copy of the document and stores the download copy into the cache 1234 of the second user. The download copy includes the content and metadata of the master copy 1250. The download copy does not include the most recent content and metadata contained in the working copy of the first user. The layer object of the second user generates a base copy and a working copy of the document based on the download copy. The authoring application utilized by the second user displays the content and any locks of the working copy to the second user.

In some embodiments, the second user can edit the document even before a coauthoring session has been fully established (i.e., before the first and second user computing devices learn of the presence of the other). For example, the second user is allowed to edit the second working copy of the document while the first and second user computing devices exchange greetings (i.e., handshake). Typically, metadata is not exchanged automatically before the first and second computing devices learn of the existence of one another.

Figure 16:
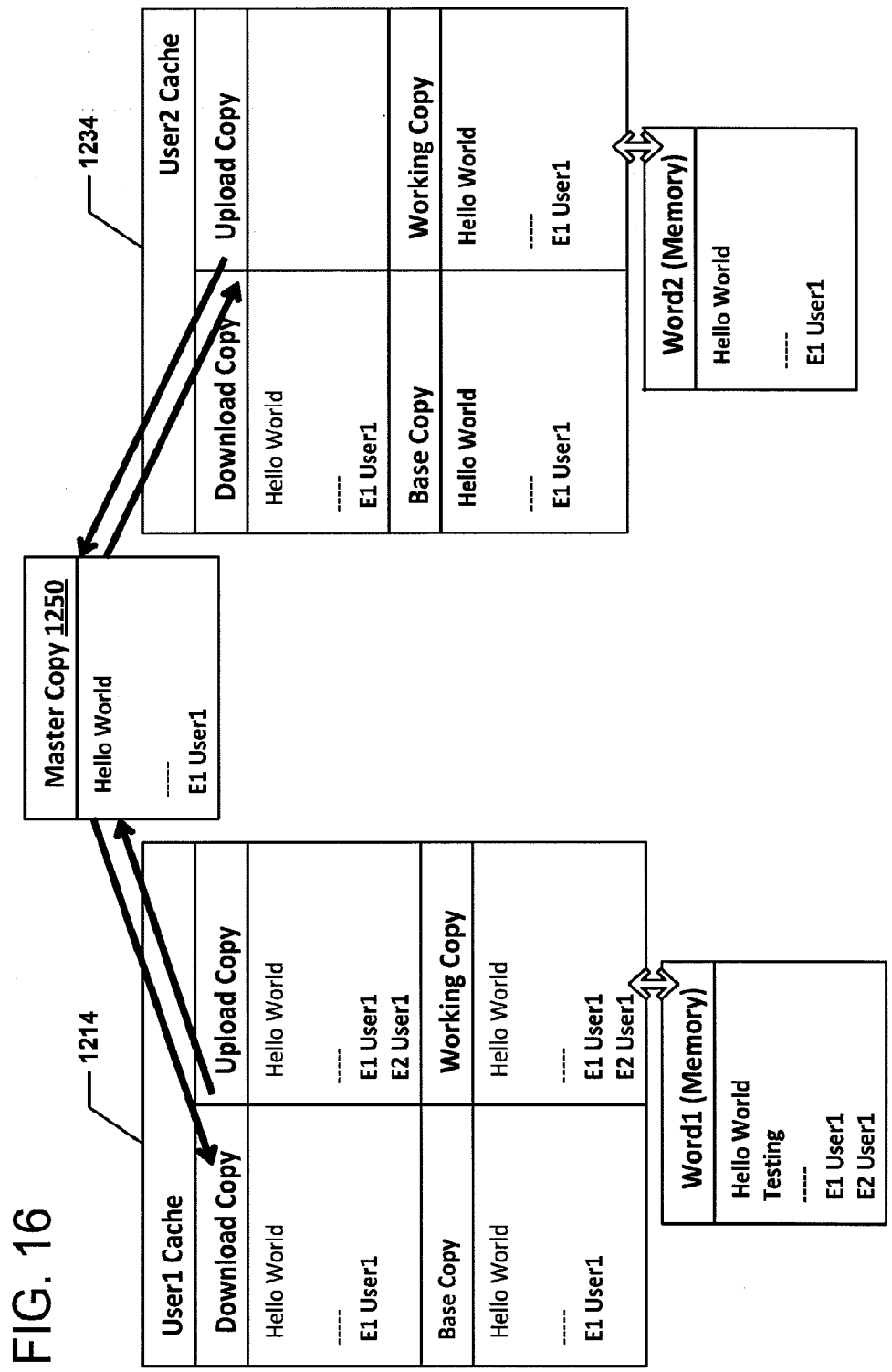

In FIG. 16, the first and second computing devices each have discovered the existence of the other. Accordingly, each of the first and second computing devices has begun transmitting metadata updates automatically to each other. As shown in FIG. 16, the first authoring application provides updated lock metadata (e.g., the second lock) from the lock table of the first user to the storage device 1220 (e.g., via a layer object and sync manager). The authoring application does not provide updated content information to the storage device 1220, however, because no instructions to share content updates have been received from the first user.

Figure 17:
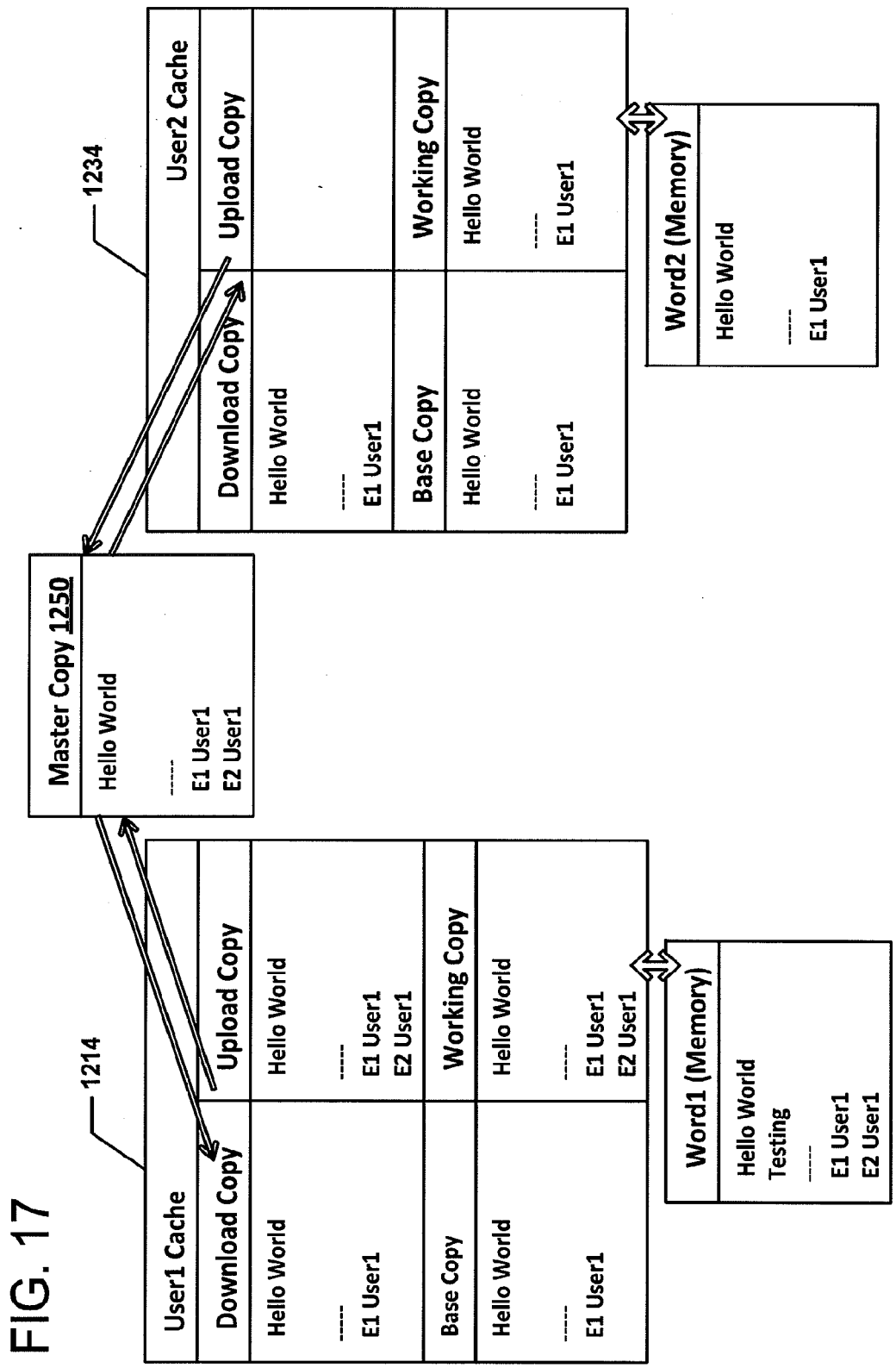
Figure 18:
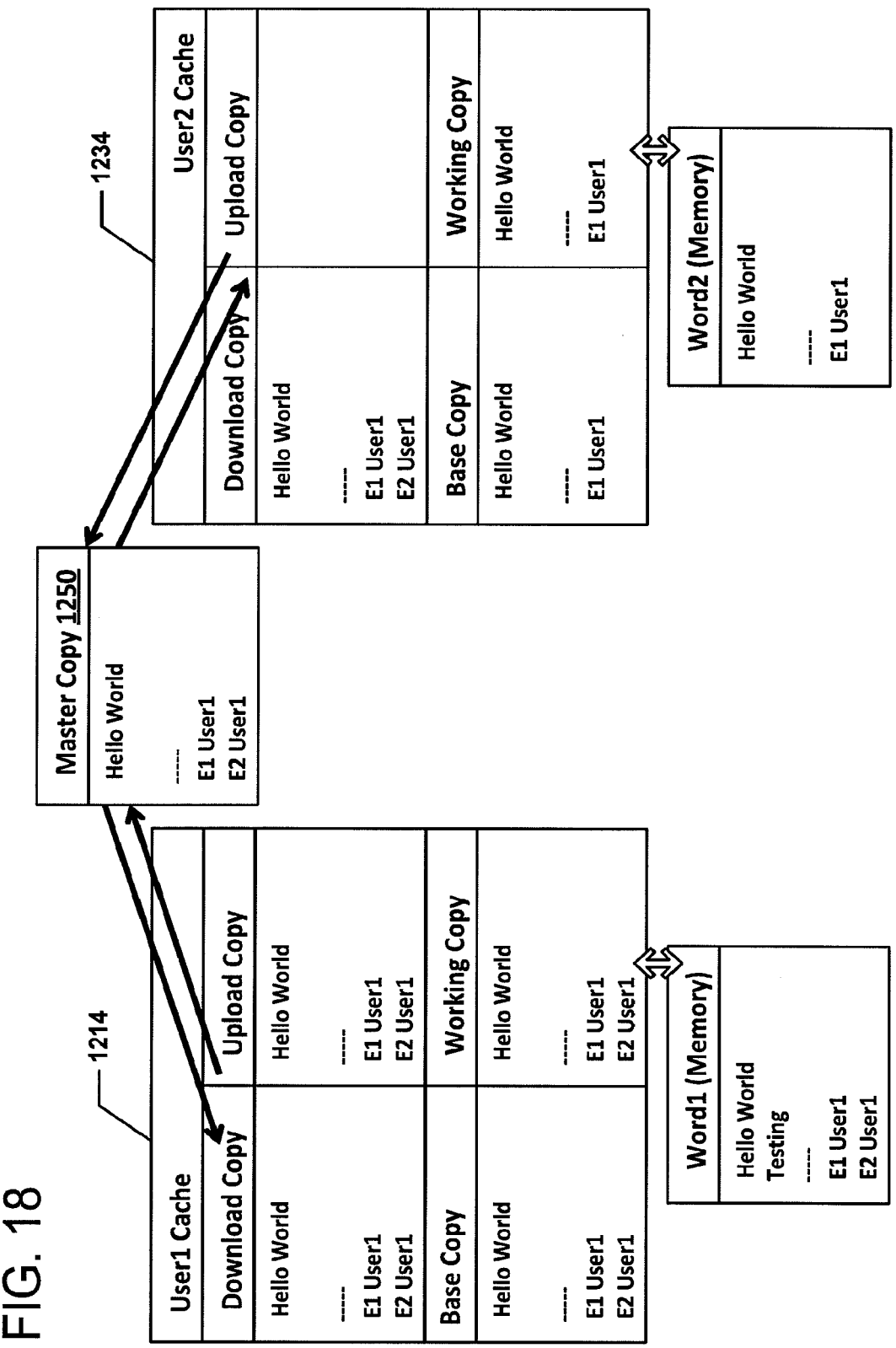

In FIG. 17, the storage device has integrated the updated lock metadata (e.g., the second lock E2) into the master metadata table of the master copy 1250. The lock metadata has not yet been obtained by the second user computing device. In FIG. 18, the second user computing device has polled the storage device and obtained a new download copy of the master copy 1250. A new download copy also has been generated (e.g., via a layer object) on the first cache 1214 based on the upload copy. In another embodiment, the first user computing device also may have polled the storage device and obtained a new download copy of the master copy 1250. Both of the new download copies reflect the updated lock information (e.g., lock E2) from the working copy of the first user.

Figure 19:
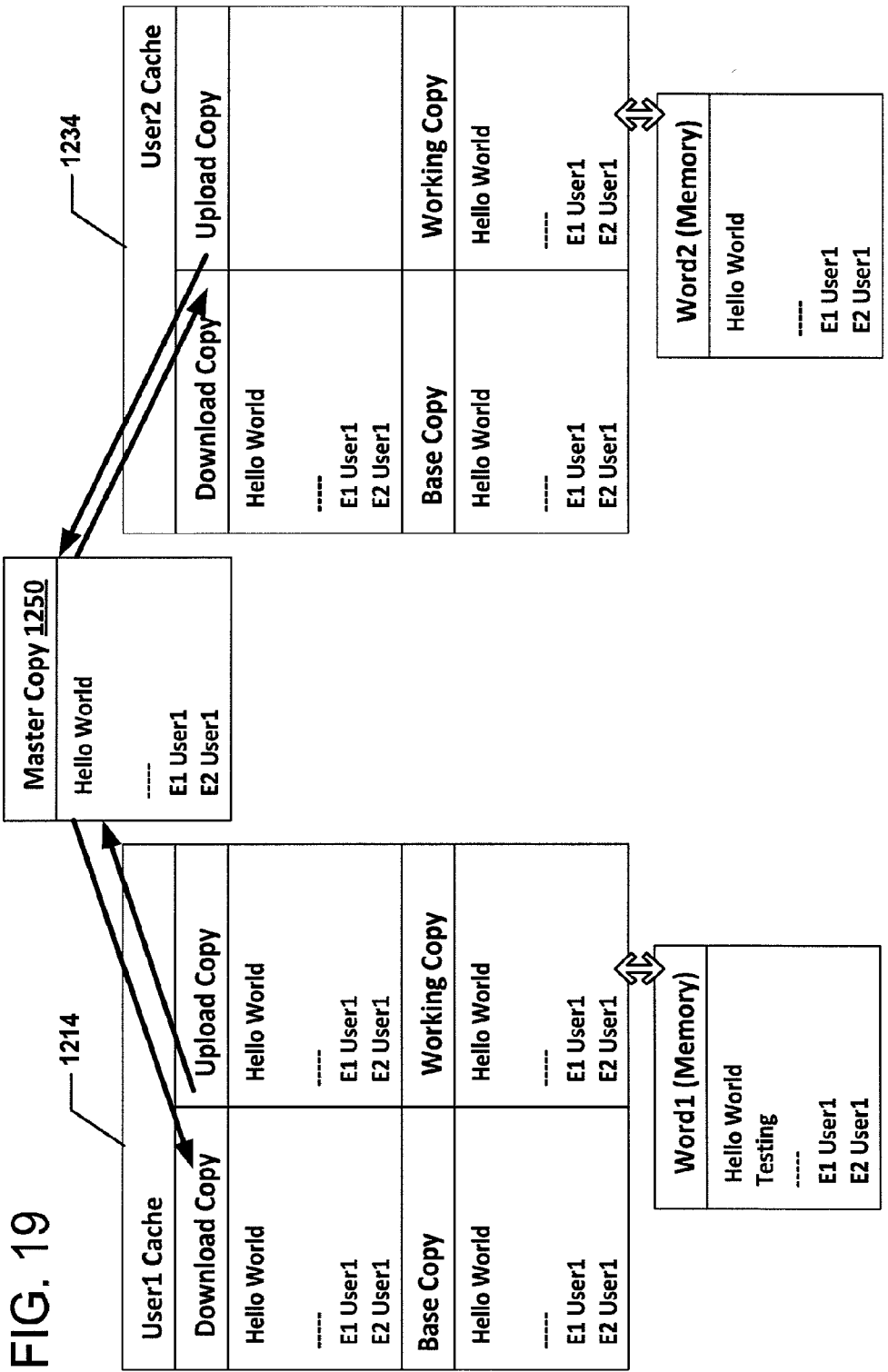

In FIG. 19, the second computing device generates (e.g., via a layer object) a new working copy based on the new download copy. Accordingly, the new working copy of the second computing device contains the second lock E2 on the second data unit. The new working copy does not include the second data unit itself, however. In one embodiment, the working copy of the second user computing device displays a blank/empty data unit and indicates that the blank/empty data unit is locked. In another embodiment, the working copy does not display the second data unit at all and the lock E2 is not indicated to the second user until the second data unit is visible to the second user.

Figure 20:
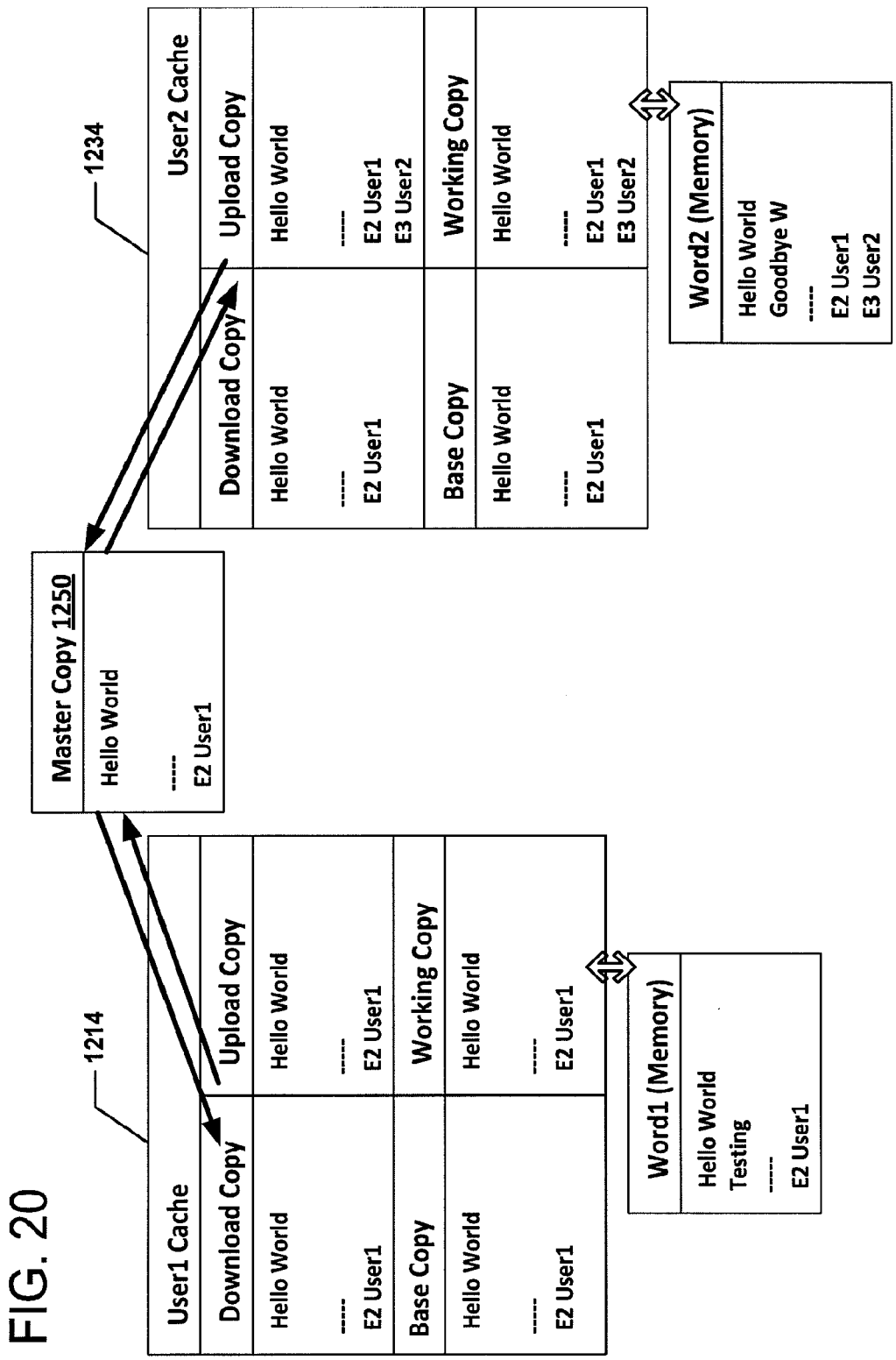

In FIG. 20, the second user adds a third data unit to the document and a third lock E3 around the third data unit (e.g., in the memory of the authoring application). The third data unit contains the text "Goodbye World". The second authoring application generates (e.g., via a layer object) a working copy of the document including the third data unit and the third lock E3. The second authoring application also automatically provides (e.g., via a sync manager) the third lock E3 to the storage device. However, the second authoring application does not provide the third data unit to the storage device.

Also in FIG. 20, the first user releases the first lock E1 after the first user indicates the first user has finished editing the first data unit. For example, the first user can provide instructions to store the document when the cursor of the first user is positioned within the second data unit. In one embodiment, the second data unit may be located remote from the first data unit. In the example shown, the finalization indication provided by the first user does not indicate the first user wishes to share content changes made by the first user. Accordingly, the first authoring application does not generate (e.g., via a layer object) an upload copy containing content changes for distribution to the storage device.

Figure 21:
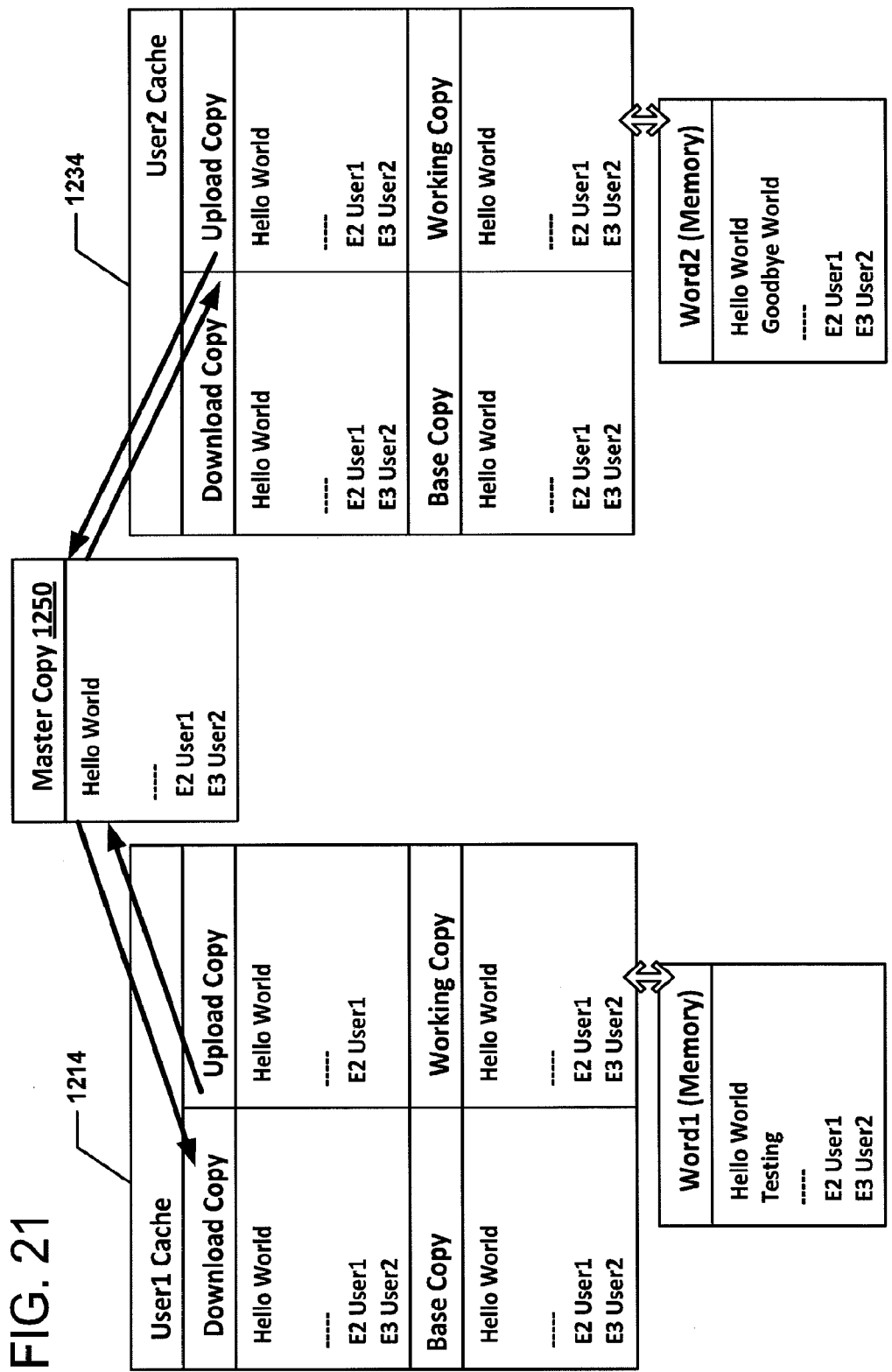

In FIG. 21, the third lock E3 has been stored in the master lock table of the master copy 1250 of the document on the storage device. The first user computing device subsequently polls (e.g., via a sync manager) the storage device to check for updates. The first user computing device obtained (e.g., via a sync manager) a new download copy of the document from the storage device based on the master copy 1250. The new download copy contains the third lock E3. The first authoring application automatically instantiates (e.g., via a layer object) the third lock E3 into the working copy of the first authoring application. As noted above, the third lock E3 optionally may be displayed to the first user using the user interface of the first authoring application.

Figure 22:
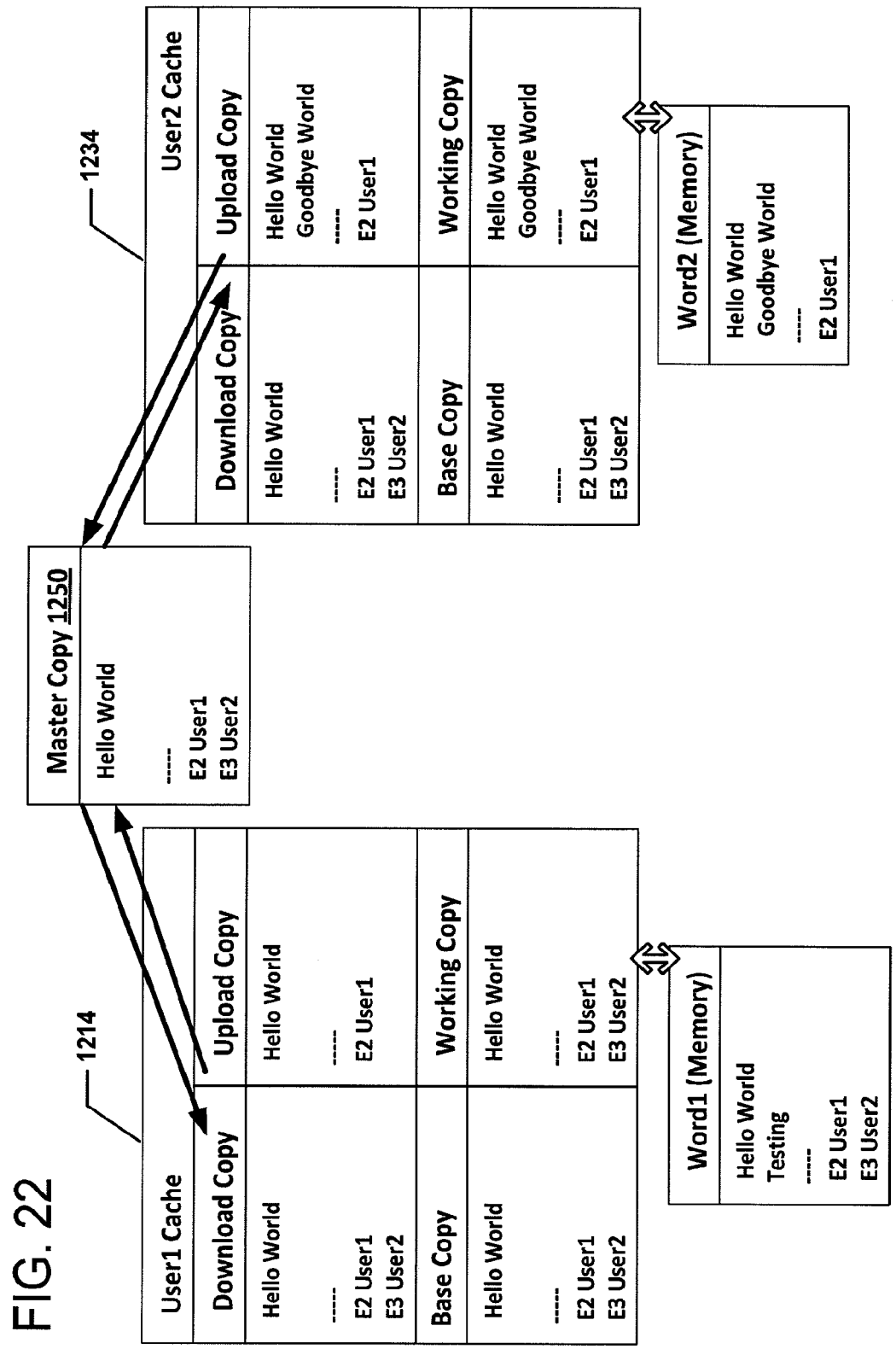

In FIG. 22, the second user releases the third lock E3 when the second user indicates the second user has finished editing the third data unit. The third lock E3 is removed from the metadata table of the second user. In the example block diagram shown in FIG. 22, the third lock E3 is removed from the metadata tables corresponding to the working copy of the second authoring application.

In the example shown in FIG. 22, the finalization indication provided by the second user indicates the second user wishes to share content changes with other users. For example, the second user may remove a cursor from the third data unit and then provide instructions to store the document. Accordingly, the second authoring application may generate an upload copy containing the content changes based on the working copy. In one embodiment, the upload copy also can be based on any content updates (e.g., in this case none) found in the download copy that had not yet been instantiated into the working copy. In the example shown, the upload copy includes the third data unit including the phrase "Goodbye World."

Figure 23:
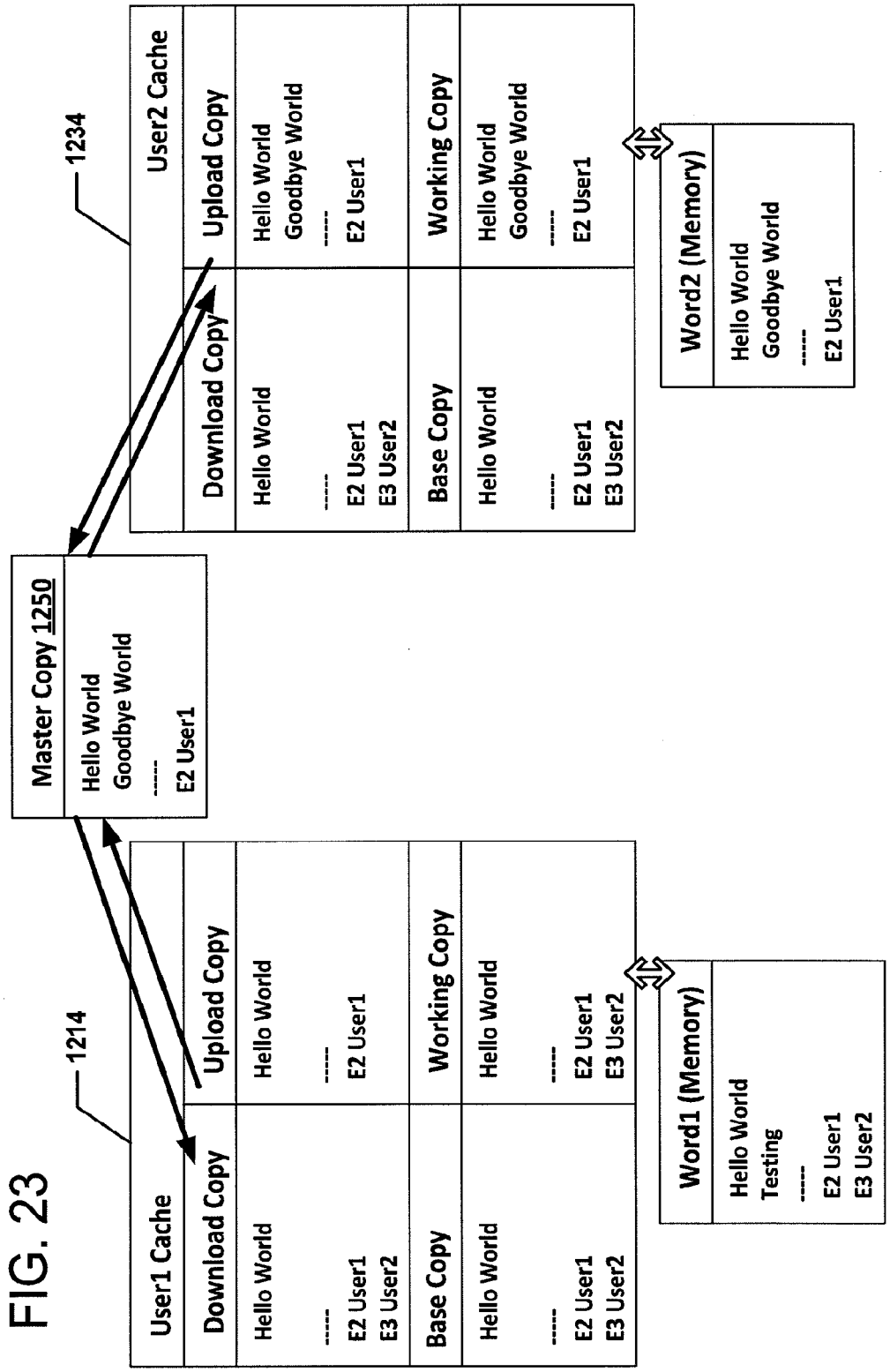
Figure 24:
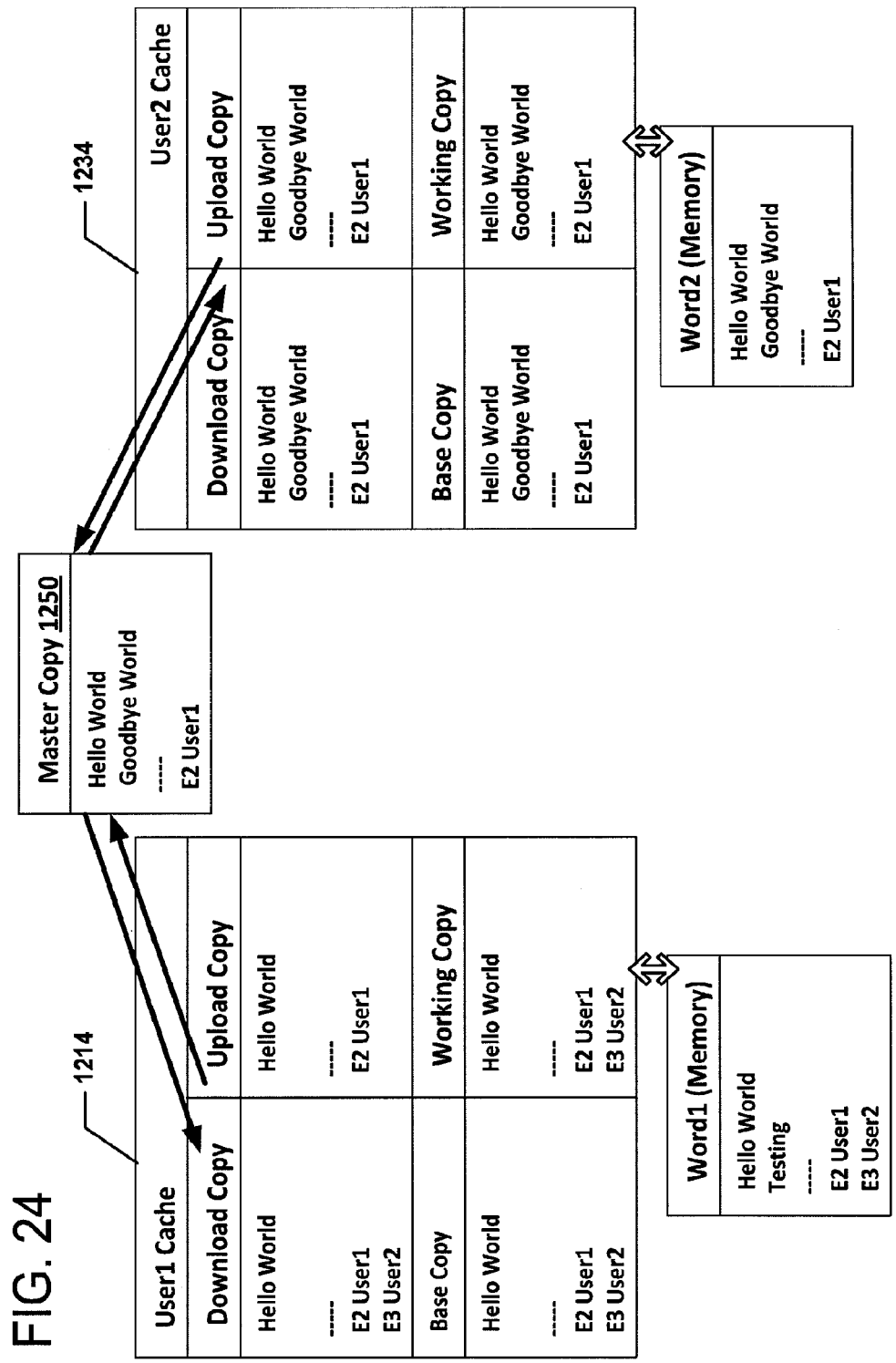

In FIG. 23, the storage device obtains the third data unit from the upload copy of the second user computing device and merges the third data unit into the master copy 1250 of the storage device. The lock table associated with the master copy 1250 indicates the third lock E3 has been released. As shown in FIG. 24, upon a successful push to the storage device, the second authoring application copies (e.g., via a layer object) the upload copy to the download copy and the base copy of the second cache 1234.

Figure 25:
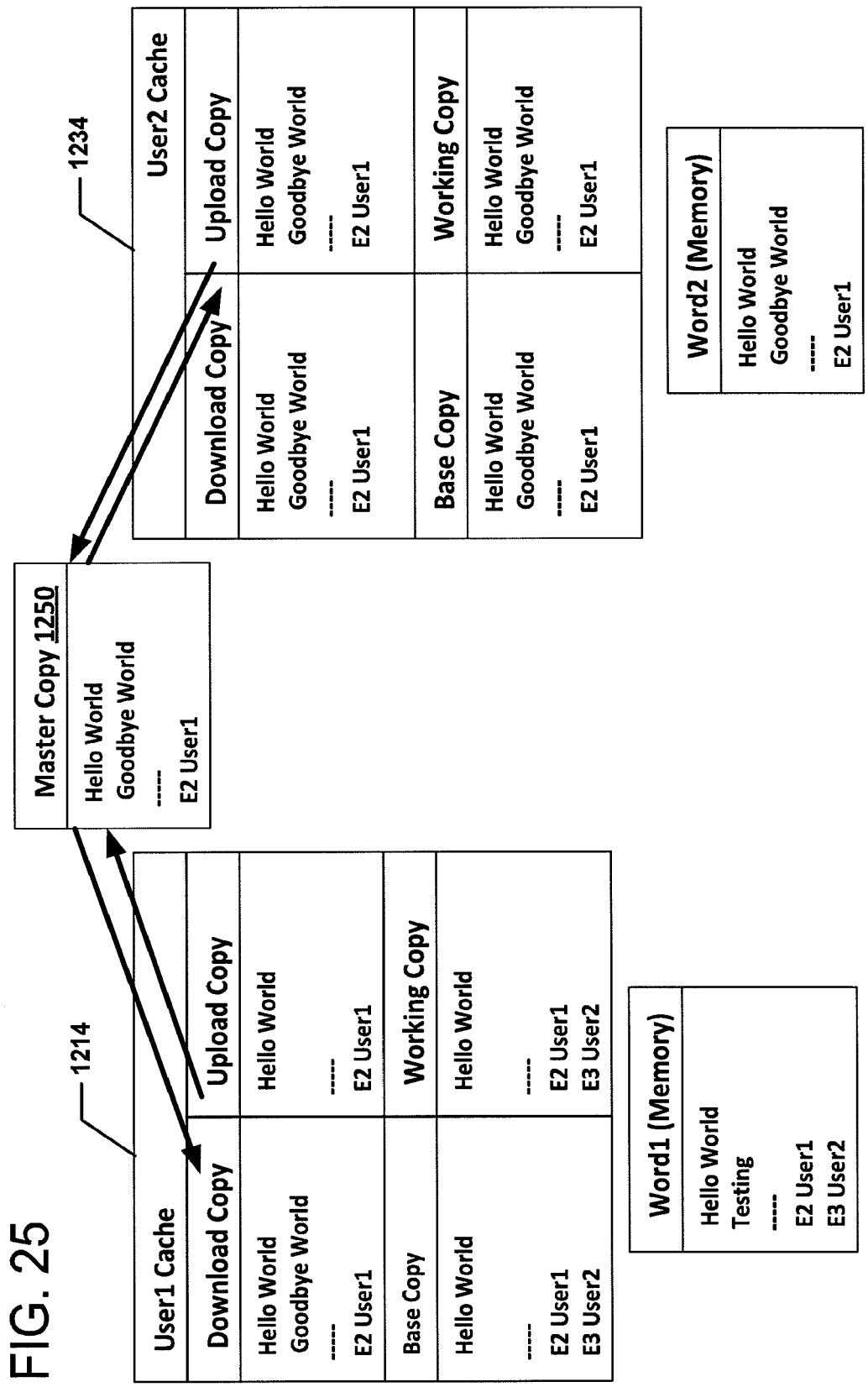

In FIG. 25, the first user computing device obtains (e.g., via a sync manager) a new download copy of the master copy 1250 of the document. The first authoring application determines (e.g., via a layer object) the new download copy has been obtained and determines the new download copy includes content changes. The authoring application automatically merges any new locks (none in this case) into the working copy of the cache 1214. The user interface of the first authoring application may indicate content updates are available for viewing.

Figure 26:
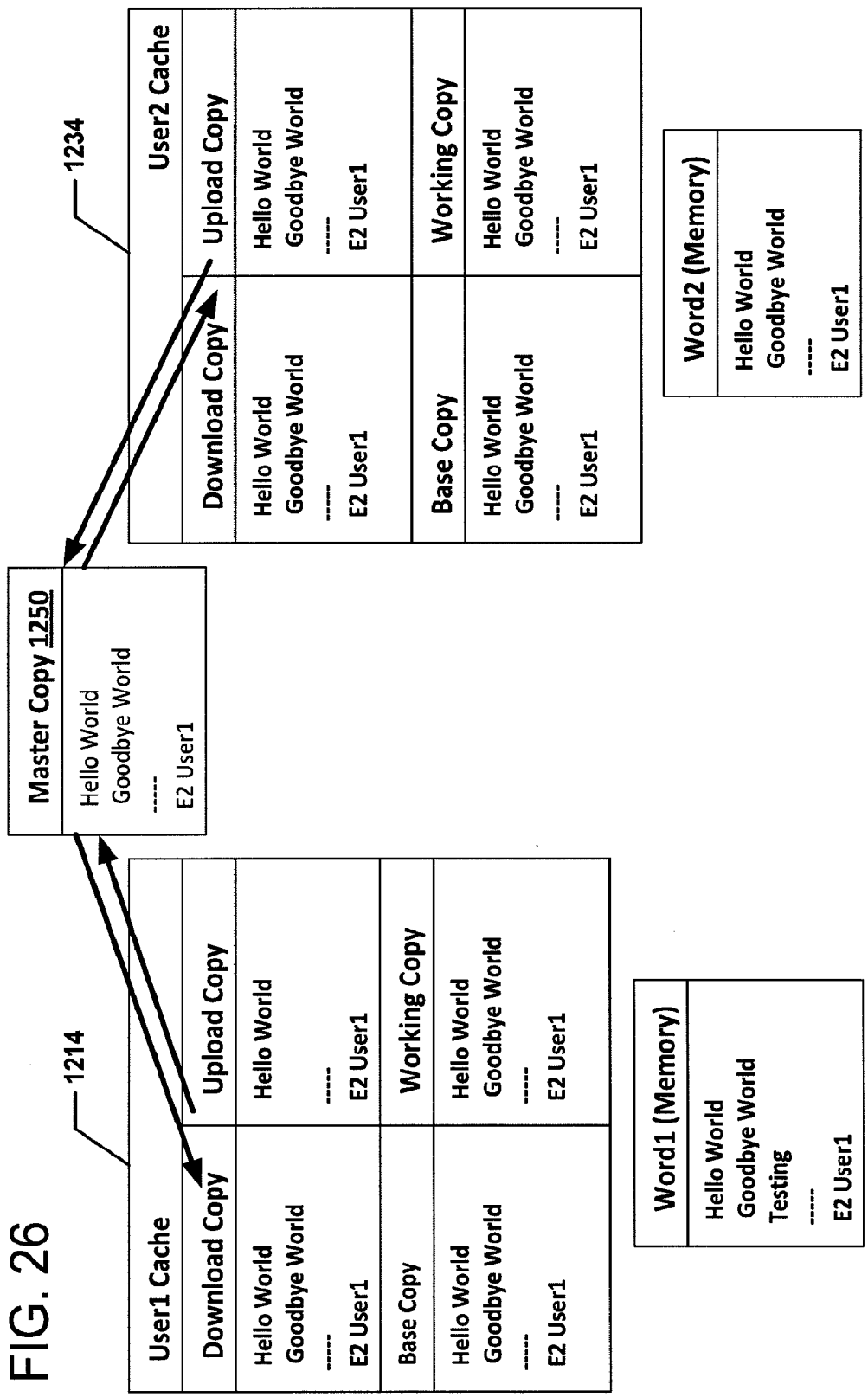
Figure 27:
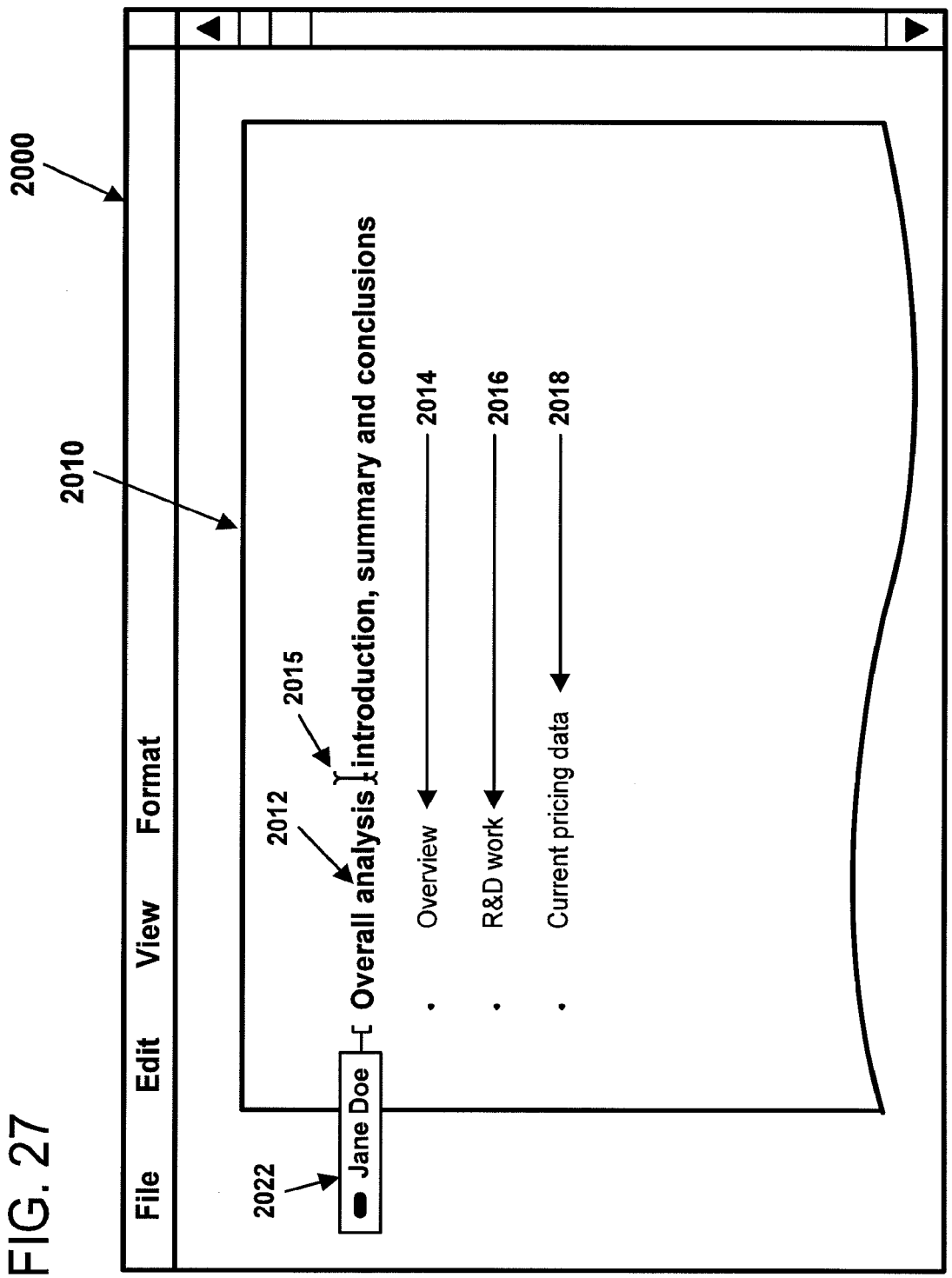

In FIG. 26, the first user chooses to instantiate the content updates available in the cache 1214 into the working copy of the document. Accordingly, the authoring application merges the download copy stored in the cache 1214 with the working copy of the first authoring application. The third data unit is added to the working copy of the first authoring application and is displayed to the first user. The third lock E3 is released in the metadata table associated with the working copy of the first authoring application. The first user, therefore, may instruct the first authoring application to edit the third data unit.

Referring now to FIGS. 27-31, the user experience during the coauthoring session is described in detail below. FIGS. 27-31 illustrate changes to an exemplary user interface 2000 of a first authoring application as a first user and a second user collaboratively author a document 2010. The first user, Jane Doe, edits the document 2010 using the first authoring application and the second user, John Doe, edits the document 2010 using a different authoring application.

The document 2010 includes a first data unit 2012, a second data unit 2014, a third data unit 2016, and a fourth data unit 2018. The first user places a content lock 2022 around the first data unit 2012. For example, in one embodiment, the first user may move her cursor 2015 to the first data unit 2012. In another embodiment, the first user may provide instructions to perform one or more editing operations on the first data unit 2012.

Figure 28:
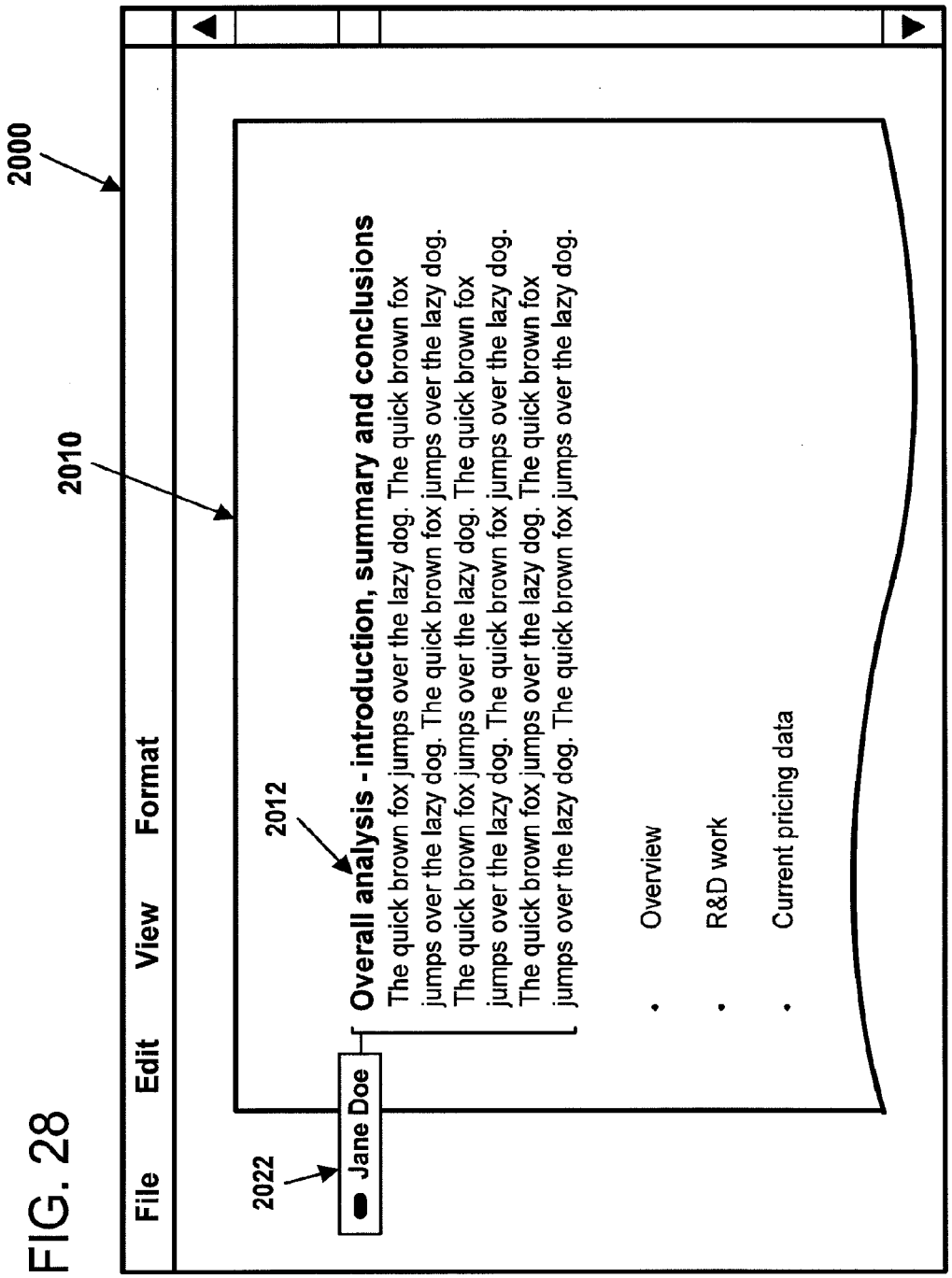

In FIG. 28, the first user has added text to the first data unit 2012. The lock on the first data unit inhibits the second user from editing the first data unit 2012. In one embodiment, the first lock 2022 prevents the second user from editing the first data unit 2012. In another embodiment, the first lock 2022 warns the second user against editing the first data unit 2012, but does not bar editing by the second user. In yet another embodiment, the first lock 2022 merely indicates the first user has expressed an intention to edit the first data unit 2012.

Figure 29:
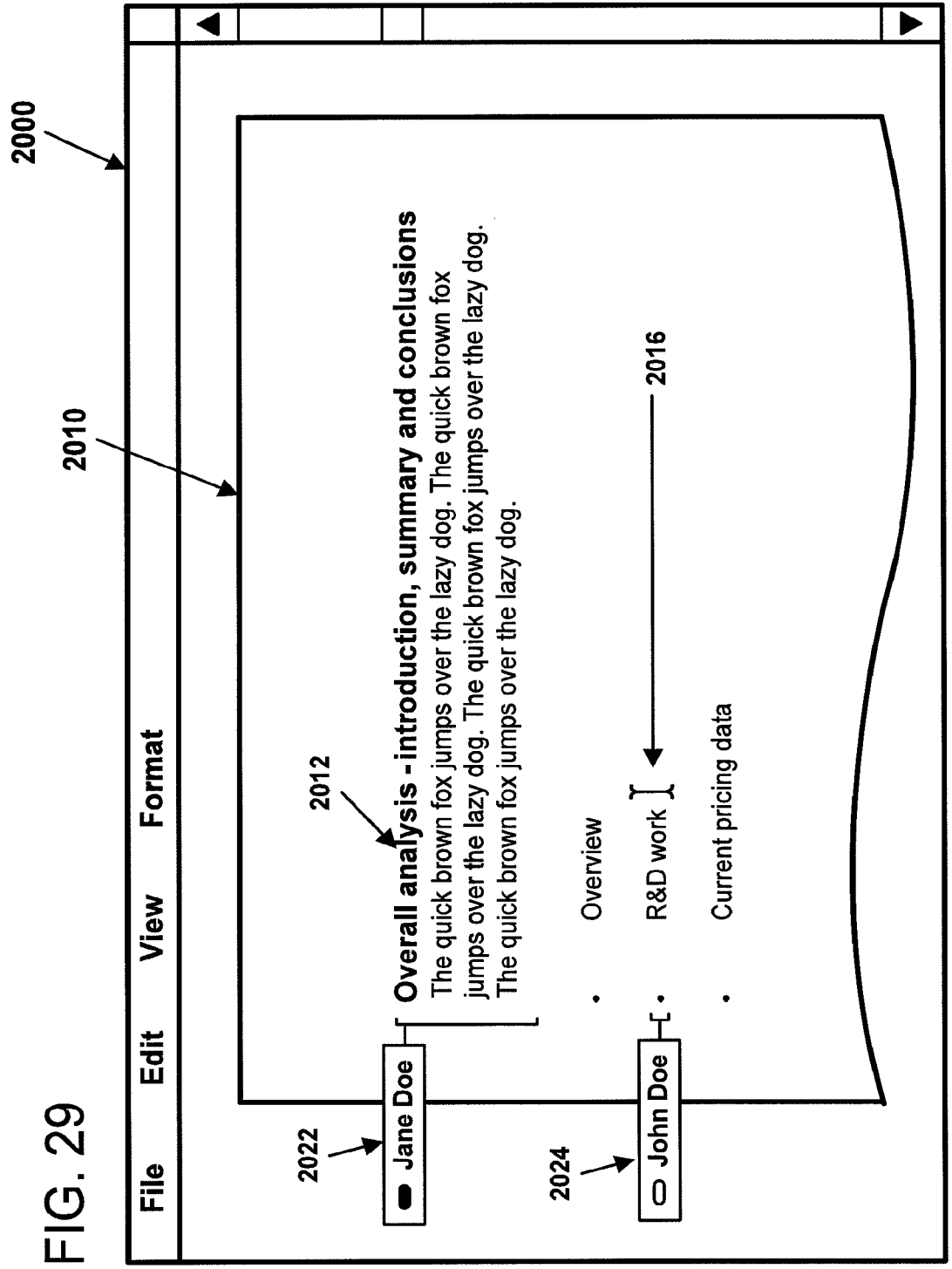

In FIG. 29, the second user has placed a content lock 2024 about the third data unit 2016. Because the second user has chosen to not share his changes, the second lock may be visible on the user interface 2000 of the first authoring application, but any changes made to the third data unit 2016 by the second user are not visible yet. In the example shown, the second lock 2024 is indicated by the user interface 2000 by displaying a bracket indicating the scope of the second lock 2024. The second lock 2024 also can include a nametag indicating the owner of the second lock 2024. In FIG. 29, the nametag includes text identifying the second user and an icon. The icon can further identify a user by color, symbol, or other graphic.

Figure 30:
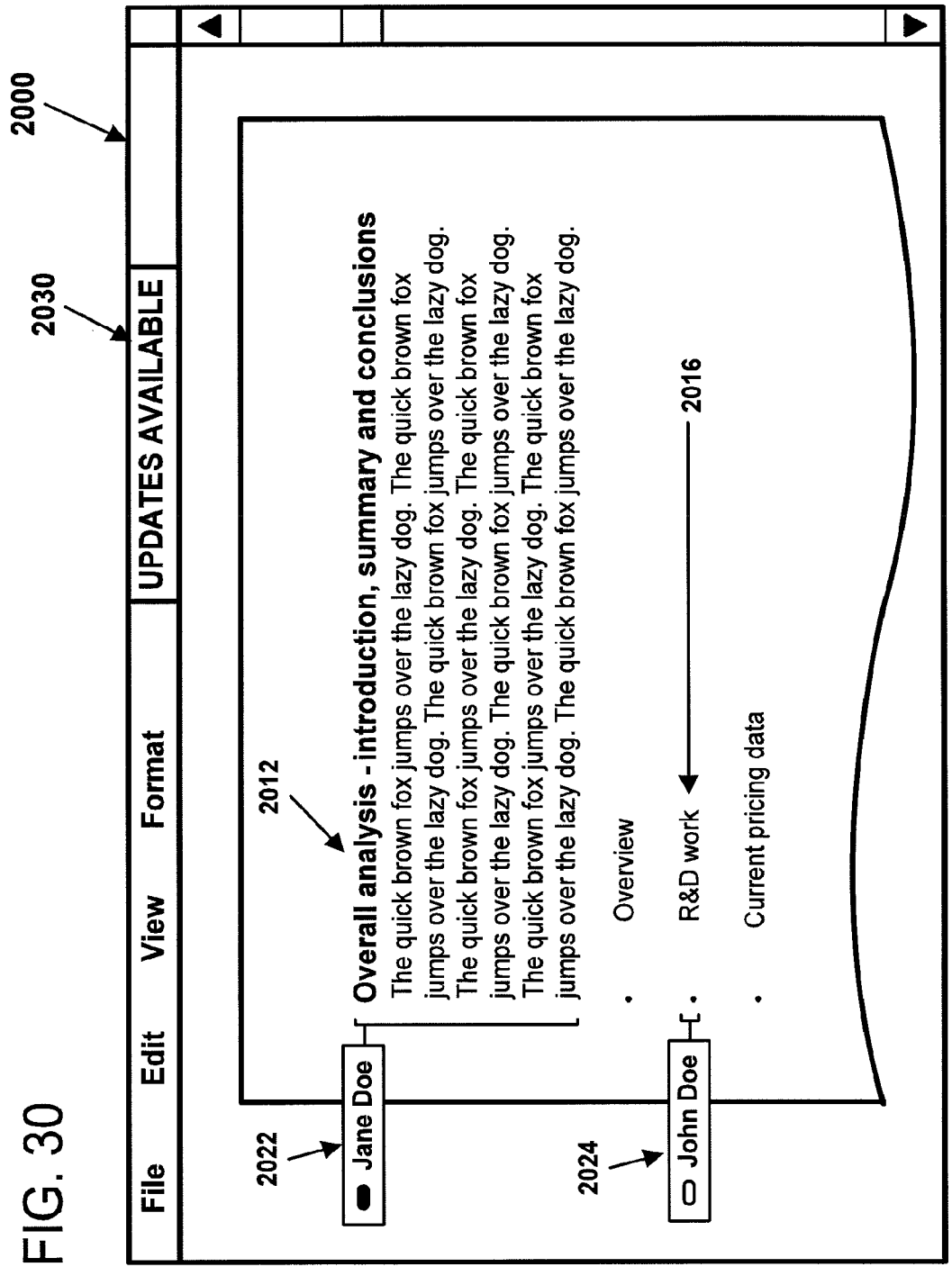

In FIG. 30, the first authoring application receives content updates for the document 2010. The second user has chosen to share content changes with other users and accordingly merged content updates into a master copy of the document 2010 (e.g., via one of the synchronization processes described above). A sync manager of the first authoring application obtained the updates from the master copy of the document 2010 by polling the device storing the master copy.

The user interface 2000 of the first authoring application displays an alert 2030 to the first user indicating the availability of the content update. In the example shown, a text box 2030 appears in the user interface 2000. In another embodiment, the second lock or text within the second lock can change color, pattern, or formatting. In another embodiment, an update counter increments when each new update is available.

The first user can choose to view/instantiate the changes made by the second user or to ignore the content updates. The first user can continue to edit any unlocked data units within the document 2010 while ignoring the content updates. In one embodiment, the first user must instantiate the content updates before merging her updates with the master copy. In FIG. 31, the first user instructs the first authoring application to instantiate the content updates into the document 2010 displayed by the user interface 2000 of the first authoring application. Content changes made by the second user are now visible to the first user.

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

What is claimed is:

1. A method for collaborative authoring of a document at a first computing device, the method comprising:
    allowing the document to be viewed and edited by a first user on the first computing device within a collaborative authoring environment;
    sending a first update from the first computing device to the second computing device indicating that the first user is editing the document at a first location;
    receiving a second update from the second computing device at the first computing device indicating that a second user is editing the document at a second location;
    automatically applying the second update to the document on the first computing device; and
    automatically providing, by the first computing device, a first annotation identifying a name of the second user displayed on the document at the second location, wherein the first annotation indicates that the document is being edited by the second user at the second location.

2. The method of claim 1, further comprising:
    locking at least a portion of the document when the document is being edited by the first user.

3. The method of claim 1, further comprising:
    locking at least a portion of the document when the document is being edited by the second user.

4. The method of claim 1, wherein a master copy of the document is stored at the second computing device.

5. The method of claim 1, further comprising identifying the second user by color.

6. The method of claim 1, wherein the second computing device is a storage device.

7. The method of claim 6, wherein the storage device is a server computing device.

8. The method of claim 1, wherein the second update comprises one of: an addition, a deletion, and a revision to content of the document.

9. The method of claim 1, further comprising:
    receiving a third update from the second computing device at the first computing device indicating that a third user is editing the document at a third location;
    automatically applying the third update to the document on the first computing device; and
    at the first computing device, providing a second annotation identifying a name of the third user displayed on the document at the third location indicating that the document is being edited by the third user at the third location.

10. The method of claim 9, further comprising identifying the second user by a first color and identifying the third user by a second color, wherein the first color is different than the second color.

11. A first computing device comprising:
    a processor; and
    a memory communicatively coupled to the processor, the memory storing computer-readable instructions that when executed by the processor cause the first computing device to:
        receive and display edits from a first user to a document displayed at the first computing device;
        concurrently receive an update from a second computing device, wherein the update includes one or more edits to a first unit of data of the document displayed at the first computing device;
        automatically apply the update to the document; and
        automatically provide an annotation for display on the document at a location associated with the first unit of data, the annotation identifying a name of the second user to indicate editing of the first unit of data by the second user.

12. The first computing device of claim 11, the computer-readable instructions further causing the first computing device to identify the second user by a color.

13. The first computing device of claim 11, wherein the second computing device is a storage device.

14. The first computing device of claim 11, the computer-readable instructions further causing the first computing device to:
    receive one or more edits to a second unit of data of the document from the first user; and
    lock the second unit of data when the one or more edits are received from the first user.

15. The first computing device of claim 11, the computer-readable instructions further causing the first computing device to:
    lock the first unit of data when the update is received from the second computing device.

16. The first computing device of claim 11, wherein a master copy of the document is stored at the second computing device.

17. A first computing device comprising:
a processing unit; and
a memory storing instructions that when executed by the processing unit cause the first computing device to perform the steps of:
   receiving edits to a first portion of a document from a first user in a collaborative authoring environment;
   sending a first update from the first computing device to a second computing device to indicate editing of the first portion of the document by the first user;
   receiving a second update from the second computing device at the first computing device indicating editing of a second portion of the document by a second user;
   automatically applying the second update to the second portion of the document; and
   automatically displaying, by the first computing device, an annotation on the document identifying a name of the second user at a location associated with the second portion of the document to indicate editing of the second portion of the document by the second user.

18. The first computing device of claim 17, wherein the first computing device is further caused to perform a step of:
   locking at least the first portion of the document when the edits are received at the first computing device.

19. The first computing device of claim 17, wherein the first computing device is further caused to perform a step of:
   locking at least the second portion of the document while the second portion is being edited.

20. The first computing device of claim 17, wherein a master copy of the document is stored at the second computing device.

21. The first computing device of claim 17, wherein the first computing device is further caused to perform the steps of:
   receiving a third update from the second computing device at the first computing device indicating editing of a third portion of the document by the second user;
   automatically applying the third update to the document on the first computing device; and
   moving the annotation displayed on the document from the location associated with the second portion of the document to a location associated with the third portion of the document to indicate editing of the third portion of the document by the second user.

* * * * *